United States Patent
Hua et al.

(10) Patent No.: US 10,725,279 B2
(45) Date of Patent: Jul. 28, 2020

(54) SYSTEMS AND METHODS FOR EXTENDED DEPTH-OF-FIELD MICROSCOPY

(71) Applicants: Arizona Board of Regents on Behalf of the University of Arizona, Tucson, AZ (US); Hong Hua, Tucson, AZ (US); Sheng-Huei Lu, Tucson, AZ (US)

(72) Inventors: Hong Hua, Tucson, AZ (US); Sheng-Huei Lu, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 121 days.

(21) Appl. No.: 16/092,071

(22) PCT Filed: Apr. 7, 2017

(86) PCT No.: PCT/US2017/026678
§ 371 (c)(1),
(2) Date: Oct. 8, 2018

(87) PCT Pub. No.: WO2017/177180
PCT Pub. Date: Oct. 12, 2017

(65) Prior Publication Data
US 2019/0162945 A1 May 30, 2019

Related U.S. Application Data

(60) Provisional application No. 62/320,275, filed on Apr. 8, 2016.

(51) Int. Cl.
*G02F 1/01* (2006.01)
*G02F 2/00* (2006.01)
(Continued)

(52) U.S. Cl.
CPC ........... *G02B 21/367* (2013.01); *G02B 13/22* (2013.01); *G02B 21/02* (2013.01); *G02B 21/361* (2013.01);
(Continued)

(58) Field of Classification Search
CPC .... G02B 21/02; G02B 13/22; G02B 27/0075; G02B 21/361; G02B 21/367; G02B 3/02;
(Continued)

(56) References Cited

U.S. PATENT DOCUMENTS 4,417,787 A 11/1983 Danner
4,661,692 A * 4/1987 Kawasaki ............ G02B 21/244
250/201.2
(Continued)

OTHER PUBLICATIONS

International Search Report of PCT/US2017/026678 dated Jul. 31, 2017, 4 pp.
(Continued)

*Primary Examiner* — Philip P. Dang
(74) *Attorney, Agent, or Firm* — Lathrop GPM LLP

(57) ABSTRACT

An extended depth-of field microscope includes (a) a microdisplay having an array of emitters capable of illuminating a sample with structured illumination, (b) an image sensor for capturing an image of the sample, and a microscope objective configured to direct the structured illumination toward the sample and direct light from the sample toward the image sensor, wherein the microscope objective has tunable focal length and is object-space telecentric such that tuning of the focal length does not substantially affect magnification of either one of the image formed on the image sensor and the structured illumination projected into object space.

21 Claims, 23 Drawing Sheets

(51) Int. Cl.
| | |
|---|---|
| *H04N 5/238* | (2006.01) |
| *G02B 21/36* | (2006.01) |
| *G02B 27/00* | (2006.01) |
| *G02B 13/22* | (2006.01) |
| *G02B 21/02* | (2006.01) |
| *G02F 1/29* | (2006.01) |
| *H04N 5/225* | (2006.01) |
| *H04N 5/235* | (2006.01) |

(52) U.S. Cl.
CPC .......... *G02B 27/0075* (2013.01); *G02F 1/29* (2013.01); *H04N 5/2256* (2013.01); *H04N 5/2353* (2013.01); *H04N 5/2354* (2013.01)

(58) Field of Classification Search
CPC .......... G02B 13/18; G02B 27/10; G02F 1/29; G06K 9/36; H04N 5/2353; H04N 5/2256; H04N 5/2354; H04N 5/225; G01N 21/64
See application file for complete search history.

(56) References Cited

U.S. PATENT DOCUMENTS

| | | | | |
|---|---|---|---|---|
| 6,201,899 | B1 | 3/2001 | Bergen | |
| 7,336,430 | B2* | 2/2008 | George | G02B 27/0075 359/626 |
| 7,460,216 | B2* | 12/2008 | Lecomte | G01B 11/162 250/216 |
| 7,977,625 | B2* | 7/2011 | Schwertner | G01B 11/2504 250/252.1 |
| 8,797,645 | B2* | 8/2014 | Schwertner | G02B 21/0024 359/385 |
| 9,052,180 | B2* | 6/2015 | Popescu | G01B 9/02091 |
| 9,068,823 | B2* | 6/2015 | Lee | G06T 7/521 |
| 9,089,289 | B2* | 7/2015 | Gruppetta | A61B 3/12 |
| 9,185,357 | B2* | 11/2015 | Boccara | A61B 5/0066 |
| 9,693,034 | B2* | 6/2017 | Lew | H04N 13/204 |
| 9,784,568 | B2* | 10/2017 | Laguarta Bertran | G02B 21/0016 |
| 9,804,563 | B2* | 10/2017 | Rosen | H04N 1/00827 |
| 9,867,525 | B2* | 1/2018 | Yew | A61B 1/00163 |
| 9,989,765 | B2* | 6/2018 | Jepsen | G02B 5/1842 |
| 10,073,025 | B2* | 9/2018 | Bartels | G01N 15/1434 |
| 2005/0225852 | A1 | 10/2005 | Rondeau et al. | |
| 2008/0062287 | A1 | 3/2008 | Agrawal et al. | |
| 2011/0009163 | A1 | 1/2011 | Fletcher et al. | |
| 2013/0038944 | A1 | 2/2013 | Chang et al. | |
| 2013/0201316 | A1* | 8/2013 | Binder | H04L 67/12 348/77 |
| 2013/0265545 | A1* | 10/2013 | Buckland | A61B 3/13 351/206 |
| 2014/0008549 | A1* | 1/2014 | Theriault | G01N 21/64 250/459.1 |
| 2015/0260978 | A1* | 9/2015 | Cremer | G02B 21/0004 348/79 |
| 2015/0323787 | A1* | 11/2015 | Yuste | G02B 27/0075 348/79 |
| 2016/0000535 | A1 | 1/2016 | Cadent et al. | |

OTHER PUBLICATIONS

Neil et al. (1997) "Method of obtaining optical sectioning by using structured light in a conventional microscope," Opt. Lett., 22:24, pp. 1905-1907.

Hausler et al. (2008) "Microdeflectometry—a novel tool to acquire 3D microtopography with nanometer height resolution," Compiled for submission to Optics Letters on Feb. 15, 2008, 3 pp.

Liu et al. (2011) "Extended depth-of-field microscopic imaging with a variable focus microscope objective," Optics Express, 19:1, 10 pp.

Lu et al. (2015) "Imaging properties of extended depth of field microscopy through single-shot focus scanning," Optics Express, 23:8, 18 pp.

* cited by examiner

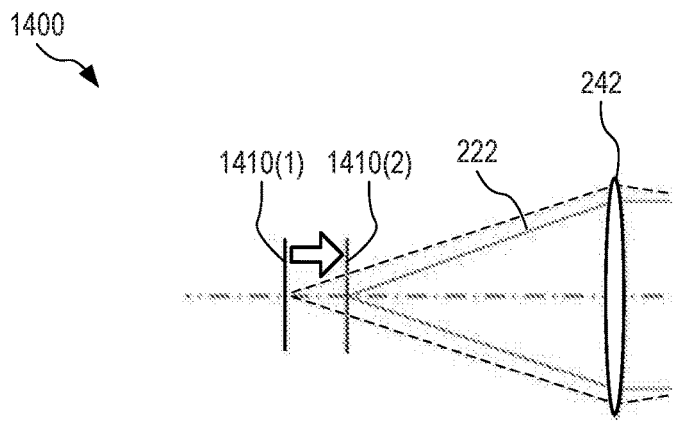
FIG. 14
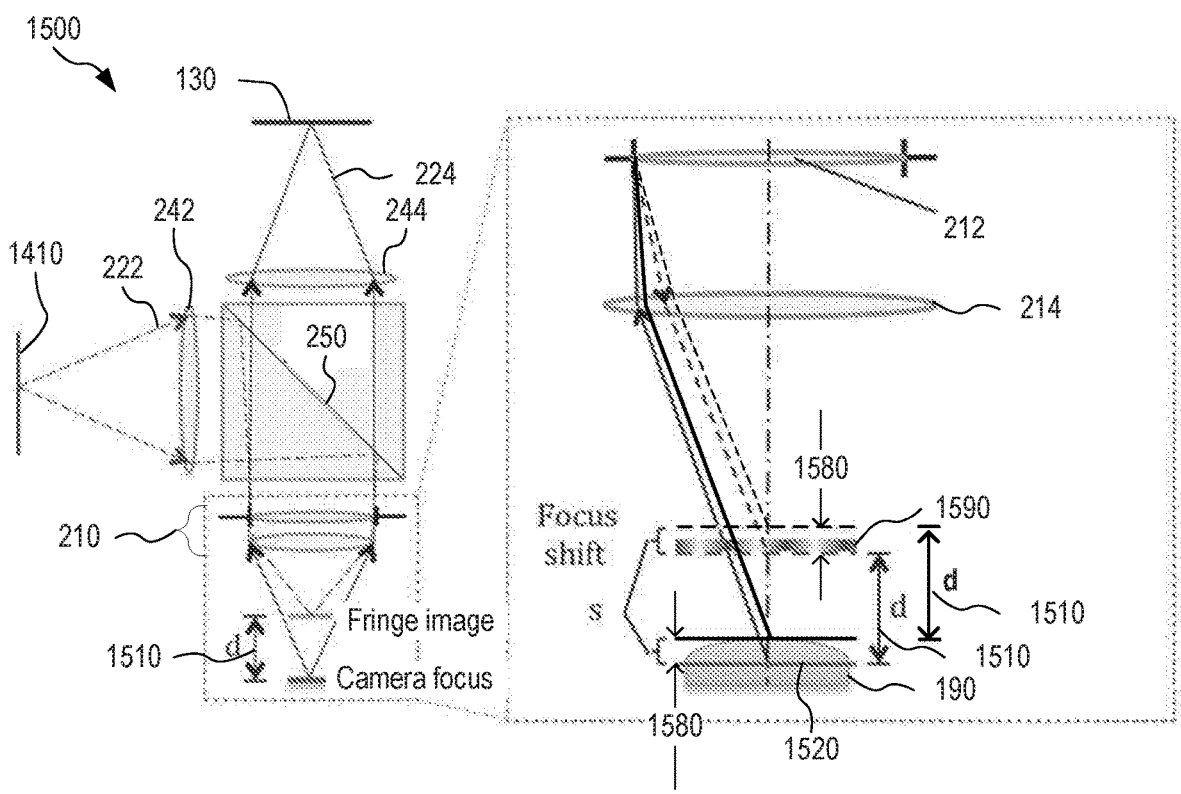
FIG. 15A  FIG. 15B

2100

REPEAT FOR AT LEAST THREE DIFFERENT MODULATION PATTERNS OF THE STRUCTURED ILLUMINATION PHASE SHIFTED FROM EACH OTHER

PROJECT STRUCTURED ILLUMINATION ONTO A SAMPLE THROUGH A MICROSCOPE OBJECTIVE
2110

TUNE FOCAL LENGTH OF THE MICROSCOPE OBJECTIVE WHILE MAINTAINING CONSTANT MAGNIFICATION, TO SCAN, ACROSS A DEPTH RANGE IN OBJECT SPACE, A COMMON FOCAL PLANE ASSOCIATED WITH (A) THE STRUCTURED ILLUMINATION AND (B) AN IMAGE SENSOR FOR CAPTURING AN IMAGE OF THE SAMPLE THROUGH THE MICROSCOPE OBJECTIVE
2120

REPEATEDLY SCAN BACK AND FORTH ACROSS THE DEPTH RANGE AT CONSTANT SCANNING SPEED
2122

WHILE SCANNING THE FOCAL PLANE ACROSS THE DEPTH RANGE, ACQUIRE IMAGE OF THE SAMPLE ILLUMINATED BY THE STRUCTURED ILLUMINATION
2130

EXPOSE THE IMAGE SENSOR FOR AN EXPOSURE TIME THAT EQUALS AN INTEGER NUMBER OF PERIODS OF DEPTH SCANNING
2132

COMBINE THE AT LEAST THREE IMAGES TO GENERATE A SINGLE EXTENDED DEPTH-OF-FIELD IMAGE OF THE SAMPLE
2140

COOPERATIVELY DEMODULATE THE AT LEAST THREE IMAGES THROUGH SQUARE-LAW DEMODULATION TO GENERATE THE SINGLE EXTENDED DEPTH-OF-FIELD IMAGE
2142

FIG. 21

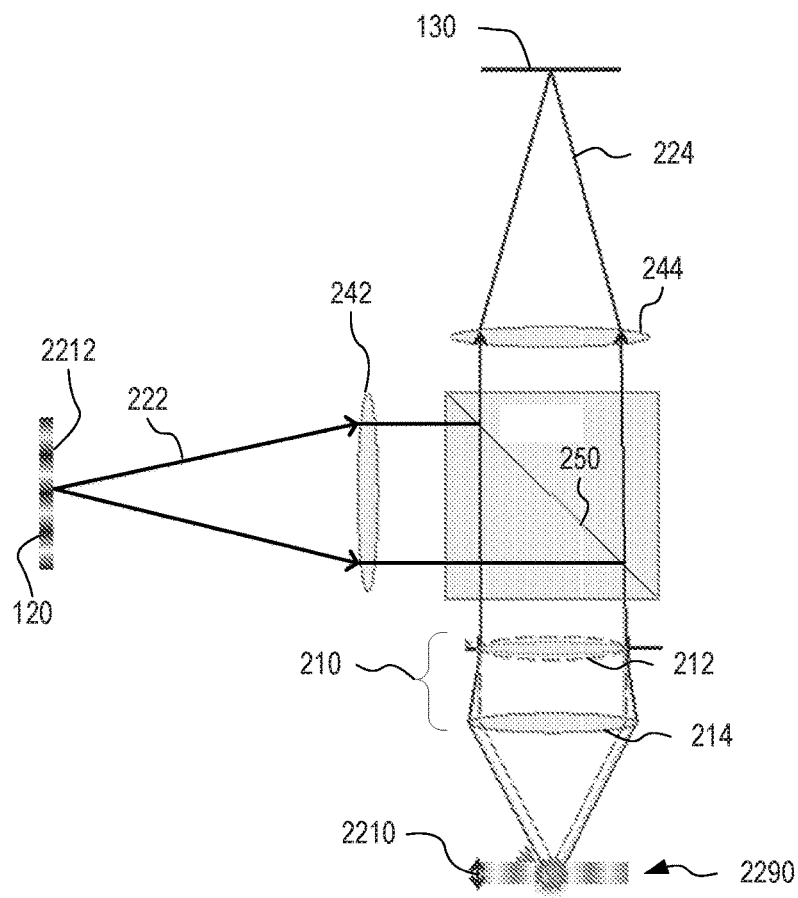
FIG. 22A
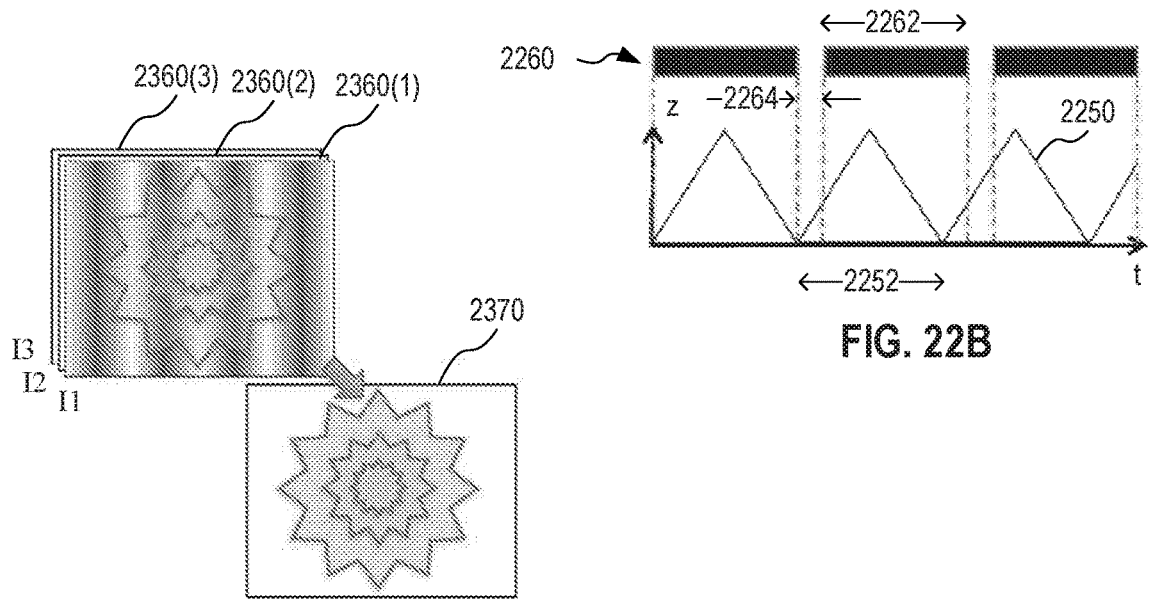
FIG. 23
FIG. 22B

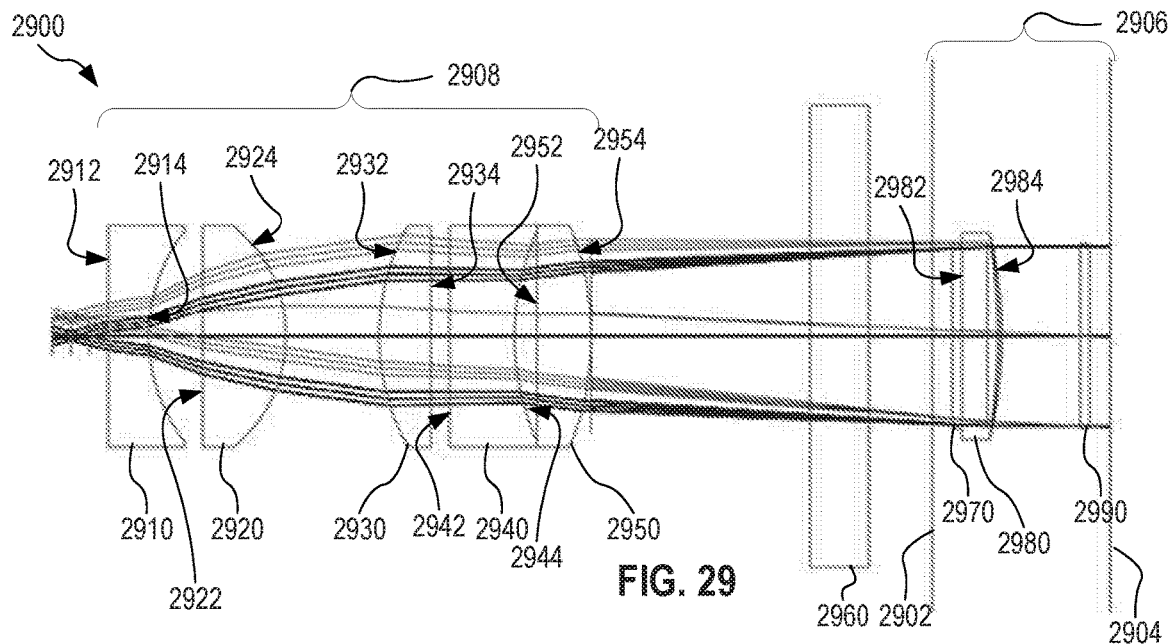
FIG. 29
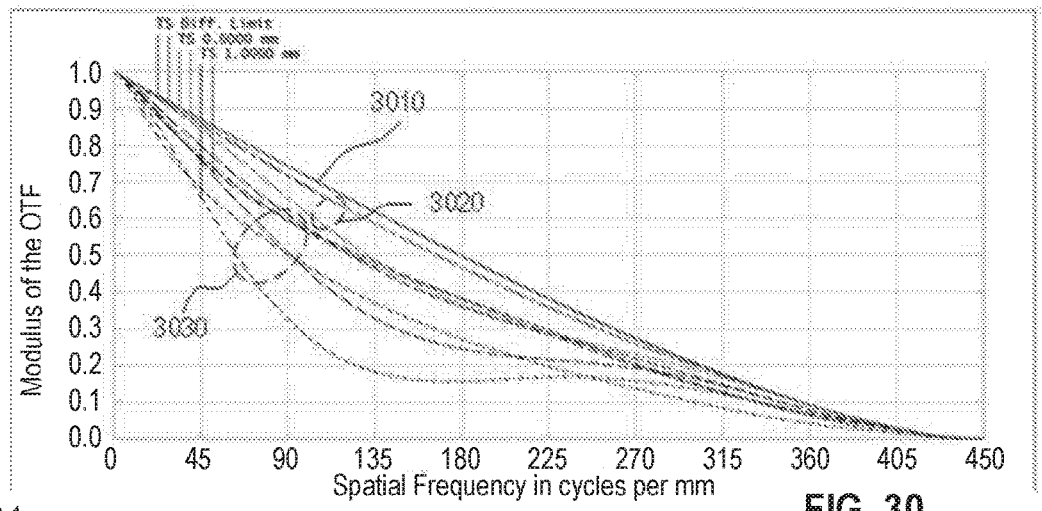
FIG. 30
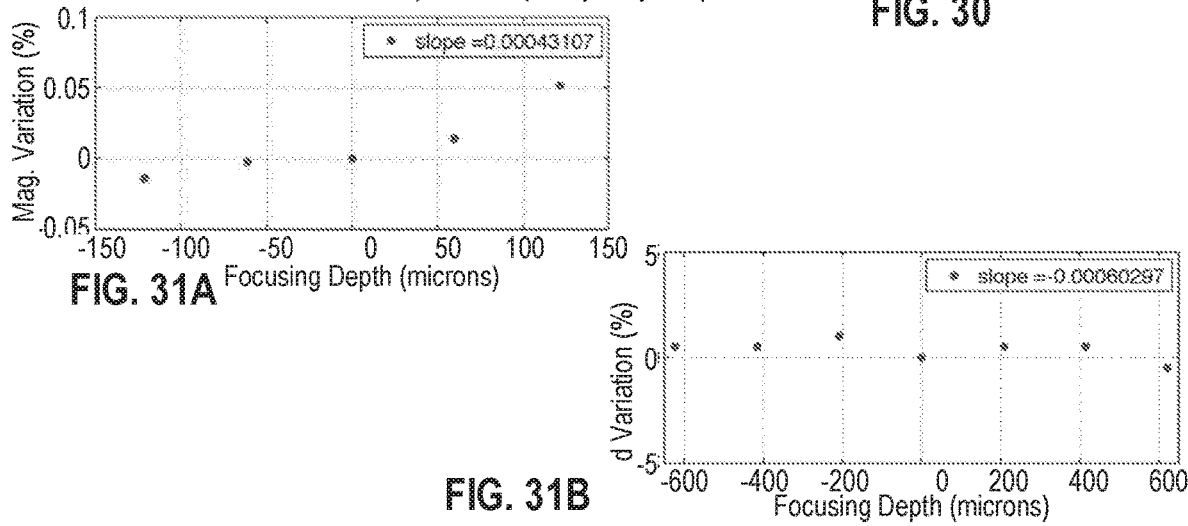
FIG. 31A
FIG. 31B

SYSTEMS AND METHODS FOR EXTENDED DEPTH-OF-FIELD MICROSCOPY

CROSS-REFERENCE TO RELATED APPLICATIONS

The present application is a national phase entry under 35 U.S.C. § 371 of PCT/US2017/026678 filed on Apr. 7, 2017, which claims the benefit of priority from U.S. Provisional Application Ser. No. 62/320,275 filed Apr. 8, 2016. The contents of each of the aforementioned patent applications are hereby incorporated by reference in their entirety.

BACKGROUND

Three-dimensional (3D) microscopy has a broad range of applications from biomedical imaging to high-precision metrology. A wide range of optical methods offer the capability of imaging the 3D shape of a testing sample. For instance, microdeflectometry is a powerful noncontact tool modified from phase measuring deflectometry (PMD) for measuring nanometer defects on a freeform surface with large shape variation. A typical PMD system projects a fringe pattern in front of the surface under test and uses a camera to observe the fringe displacement reflected from the local surface. With the knowledge of the system geometry obtained from a rigorous process of calibration, surface gradient data are quantitatively measured and can be converted into surface shape via numerical integration. Microdeflectometry modifies the typical PMD system and uses a setup similar to the reflective light microscope, where the illumination module shares the optical path with the camera detection through the microscope objective and projects an aerial fringe image in front of the surface. By observing the fringe displacement, microdeflectometry measures small surface slope variation within a large angular range equivalent to the system numerical aperture with micron-level lateral resolution, which enables inspection of nanometer-sized defects within hundreds of microns of freeform surface height variation.

Structured illumination microscopy (SIM) is a widefield imaging technique in which structured illumination, e.g., a fringe pattern, is superimposed on the sample while capturing images. The fringe pattern is often shifted or rotated in steps between the capture of each image set. Though SIM has been used as an independent metrology tool, SIM has lower measuring stability for local variation than microdeflectometry.

Conventional 3D imaging techniques, such as microdeflectometry and SIM, are subject to the limit of a generally small depth of field (DOF) of standard microscopy systems. For instance, a microscope objective with a numerical aperture (NA) of 0.25 and a working wavelength of 0.5 μm has about ±8 μm DOF given by $n\lambda/NA^2$, which theoretically is the half-width of the full DOF. (Here, $\lambda$ is the wavelength of light imaged by the microscope objective and n is the index of refraction of the medium between the microscope objective and the sample.) Such a shallow DOF limits the capability of imaging a thick target or a surface with substantial height variation. Conventional extended depth-of-field (EDOF) microscopy extends the DOF by mounting the microscope objective or sample on a z-axis translation stage and taking measurements at different depths, with subsequent combination of focused data from the stack of images captured along the z-axis. However, the speed of z-axis translation must be kept low to prevent inertial vibration, which makes image capture a time-consuming process.

Researchers have developed a wide variety of techniques to accelerate the process of obtaining EDOF measurements. For instance, several non-scanning methods, including wavefront coding, chromatic methods, and volume holographic microscopy, have been demonstrated to obtain EDOF images in one single shot. These methods, however, either diminish depth information or provide very limited axial sampling, which is not applicable to high resolution three-dimensional measurements. Alternatively, another group of techniques improves scanning speed by integrating additional scanning devices that do not require mechanically moving the microscope objective or sample. One such example is a relay system with a scanning mirror for achieving remote scanning. Another example of non-mechanical scanning utilizes a commercially available focus-tunable lens for performing optical depth scanning. Among the commercial choices of focus-tunable lenses, the acoustic tunable lens (from, e.g., TAG Optics) provides a highest speed at 140 kHz. The electrically tunable lens (from, e.g., Optotune) provides only up to 400 Hz scanning rate but, on the other hand, supports stepwise scanning, retains system flexibility, and has the largest aperture for high power microscopic application. Successful implementations of an electrically tunable lens include multi-photon excitation microscopy, confocal microscopy, optical coherence tomography, photoacoustic microscopy, selective plane illumination microscopy, oblique back-illumination microscopy, and optical projection tomography.

SUMMARY

In an embodiment, an extended depth-of field microscope includes a microdisplay having an array of emitters capable of illuminating a sample with structured illumination, and an image sensor for capturing an image of the sample. The microscope also includes a microscope objective configured to direct the structured illumination toward the sample and direct light from the sample toward the image sensor. The microscope objective has tunable focal length and is object-space telecentric such that tuning of the focal length does not substantially affect magnification of either one of the image formed on the image sensor and the structured illumination projected into object space.

In an embodiment, an extended depth-of-field microdeflectometry method includes projecting structured illumination onto a sample surface through a microscope objective, and imaging the sample surface through the microscope objective. The method further includes steps of (a) with the structured illumination in focus of the imaging, scanning focal length of the microscope objective, while maintaining constant magnification, to generate a first image series indicating height profile of the sample surface, and (b) with the structured illumination defocused from focus of the imaging, scanning the focal length over one or more depth ranges while maintaining the constant magnification, to generate a second image series indicating slope of the sample surface across the one or more depth ranges. The method also includes utilizing that each image of the second image series has same magnification and based upon the height profile to combine the images of the second image series to produce an extended depth-of-field microdeflectometry image of the sample surface.

In an embodiment, a deconvolution-free extended depth-of-field microscopy method includes projecting structured illumination onto a sample through a microscope objective, and tuning focal length of the microscope objective while maintaining constant magnification, to scan, across a depth range in object space, a common focal plane associated with (a) the structured illumination and (b) an image sensor for capturing an image of the sample through the microscope objective. The method further includes acquiring the image while scanning the focal plane across the depth range. The method includes performing the steps of projecting, tuning, and acquiring for at least three different modulation patterns of the structured illumination to integrate at least three images. The modulation patterns are phase shifted from each other. In addition, the method includes combining the at least three images to generate a single extended depth-of-field image of the sample.

In an embodiment, an extended depth-of-field structured illumination microscopy method includes projecting structured illumination onto a sample through a microscope objective, and imaging the sample through the microscope objective. The method further also a step of, with the structured illumination in focus of the imaging, electrically tuning focal length of the microscope objective, while maintaining constant magnification, to generate a plurality of images respectively focused at a plurality of depths across a depth range in object space of the microscope objective.

In an embodiment, an object-space telecentric varifocal microscope objective includes a lens assembly having fixed focus properties, and a lens positioned on an image side of the lens assembly. The lens serves as exit pupil of the object-space telecentric varifocal microscope objective, and the focal length of the lens is electrically tunable. The lens assembly and the electrically tunable lens are cooperatively configured such that the microscope objective is infinity corrected.

BRIEF DESCRIPTION OF THE DRAWINGS

FIG. 14 shows an example of translation of a structured illumination pattern.

FIGS. 15A and 15B show an example of focal plane scanning.

FIG. 21 illustrates a method for deconvolution-free EDOF microscopy, according to an embodiment.

FIGS. 22A and 22B show exemplary operation of an EDOF microscope to perform steps of the method of FIG. 21.

FIG. 23 shows an example of image combination performed in an optional step of the method of FIG. 21 to generate an EDOF image.

FIG. 29 shows an infinity-corrected object-space telecentric varifocal microscope objective, according to an embodiment.

FIG. 30 shows exemplary modulation transfer functions for the microscope objective of FIG. 29.

FIGS. 31A and 31B show exemplary percentile variation of the system magnification and distance between illumination and imaging planes, in relation to the relative focusing depth, for an embodiment of the EDOF microscope of FIG. 28.

DETAILED DESCRIPTION OF THE EMBODIMENTS

Disclosed herein are systems and methods for extended depth-of-field (EDOF) microscopy, which overcome disadvantages and limitations of conventional EDOF microscopy, such as those discussed in the following.

Several disadvantages limit the use of conventional microdeflectrometry as an independent metrology tool. First, due to the limited depth of field (DOF) of a standard microscope objective, testing of a sample surface with a large height variation requires multiple measurements at different depths and extraction of the focused data for an extended DOF. This is a time-consuming process. Second, for some samples, such as a polished optic, it is difficult to determine whether the surface is in focus during image capture. Focusing error in the captured data not only lowers the lateral resolution but also leads to reconstruction error of the surface shape. Third, application of a phase-shifting algorithm to a microdeflectrometry image yields the relative slope variation but not the absolute slope values. When numerically integrating the slope values to reconstruct the surface, lack of knowledge of the absolute slope values may lead to scaling errors and eventually inaccurate determination of the reconstructed surface. A conventional microdeflectometry system therefore implements a supplementary tool, such as a laser tracker or stereophotogrammetry, to determine the absolute slope at least at a reference point to aid more accurate integration of surface slope values.

While an electrically tunable lens (ETL), having electrically tunable focal length, does not suffer from the slow scanning speed of mechanical scanning systems, the microscope objectives of conventional ETL-based EDOF microscopes are not telecentric in object space, and the optical magnification therefore varies with focusing depth. This variable magnification creates a need for computationally intensive image post-processing to properly scale and interpolate the captured images prior to image combination to generate an EDOF image. In addition, the EDOF image is affected by mixture of parallax error caused by the variable magnification. Strictly speaking, achieving object-space telecentricity requires the system stop to be at the back focus of the microscope objective and the ETL to be placed at the system stop, to ensure that the direction of the chief rays in object space are independent of the target depth such that the transverse optical magnification is invariant to the variable optical power of the ETL. For typical off-the-shelf microscope objectives and commercially available ETLs, the limited back focal distance of the microscope objective and the thickness of the ETL prohibits positioning of the ETL at the back focus of the microscope objective, thus prohibiting object-space telecentricity.

Figure 1:
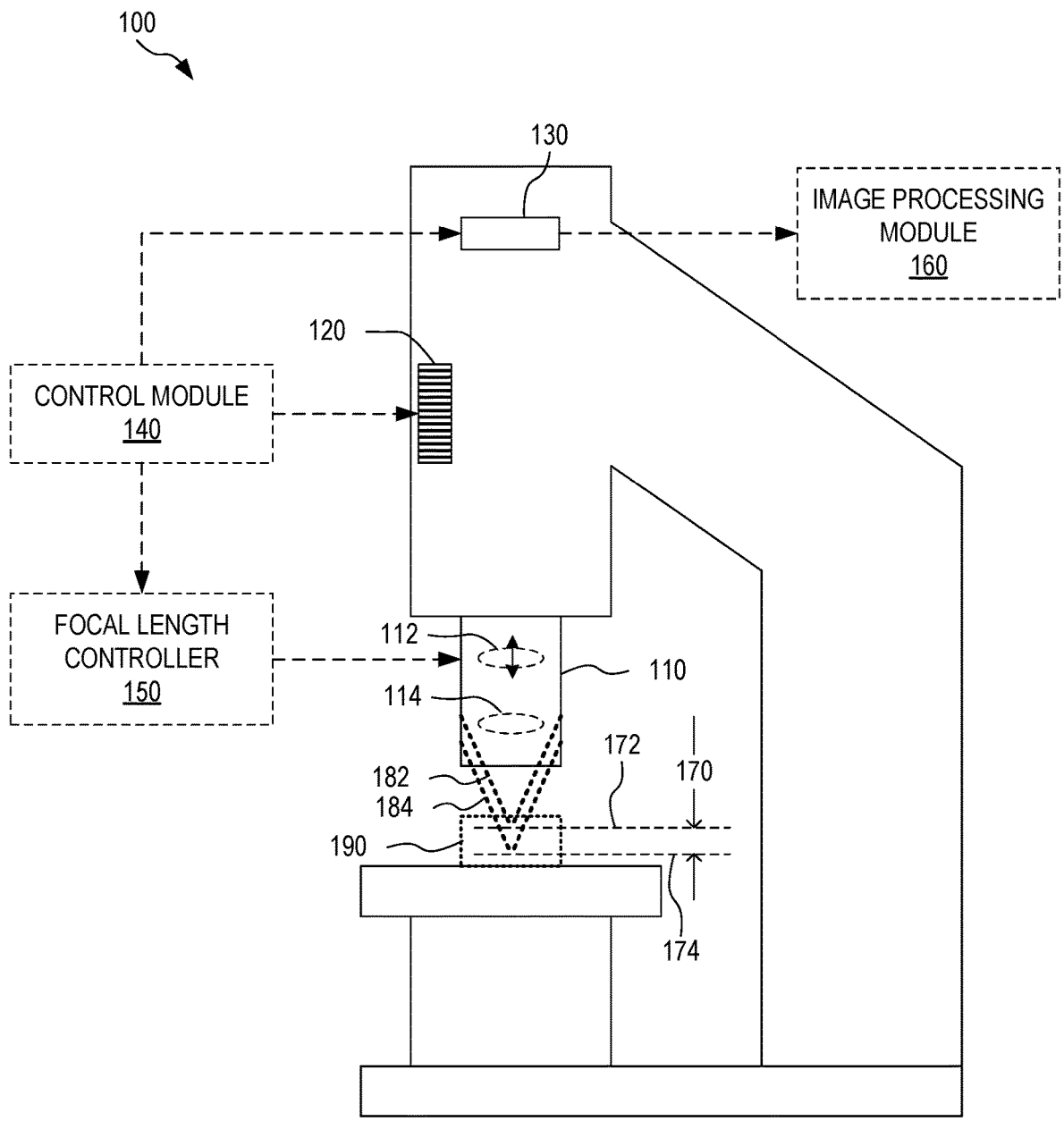
FIG. 1 illustrates an extended depth-of-field (EDOF) microscope, according to an embodiment.

FIG. 1 illustrates one exemplary EDOF microscope 100. EDOF microscope 100 includes an object-space telecentric varifocal microscope objective 110, a structured illumination source 120, and an image sensor 130. Structured illumination source 120 generates illumination to illuminate a sample 190 through microscope objective 110. Structured illumination source 120 is configured to generate structured illumination, such as a fringe pattern, but may also be capable of generating smooth and/or uniform illumination. Image sensor 130 captures an image of sample 190 through microscope objective 110. Microscope objective 110 has tunable focal length and is capable of scanning through a depth range 170 in the object space of microscope objective 110. Depth range 170 exceeds the diffraction limited DOF of microscope objective 110. In one embodiment, depth range 170 exceeds the diffraction limited DOF of microscope objective 110 by a factor of ten. In another embodiment, depth range 170 exceeds the diffraction limited DOF of microscope objective 110 by a factor of one hundred.

Since microscope objective 110 is object-space telecentric, the magnification of microscope objective 110 is substantially constant across depth range 170. As a result, the transverse scale of an image of sample 190 captured by image sensor 130 is uniform across depth range 170. The object-space telecentric nature of microscope objective 110 also ensures that the scale(s) of the structure of structured illumination generated by structured illumination source 120 and delivered to sample 190 by microscope objective 110 is the same, at the object-space focal plane of microscope objective 110, regardless of to which depth within depth range 170 the object-space focal plane of microscope objective 110 is tuned.

In one exemplary use scenario, the focal length of microscope objective 110 is scanned across at least a portion of depth range 170 during acquisition of a single image by image sensor 130. In this scenario, the image captured by image sensor 130 may include contributions from several different depths within depth range 170. The image depicts each of those contributions at the same magnification, thus greatly simplifying the interpretation of the image, as compared to a similar image captured with a microscope objective that is not object-space telecentric. In another exemplary use scenario, image sensor 130 captures a series of images at a respective focused on a respective series of depths within depth range 170. Each of these images are characterized by the same magnification, thus simplifying interpretation and any subsequent combination of the images to form a single EDOF image. In contrast, when using a microscope objective that is not object-space telecentric, each of these images would be characterized by a different magnification, and post-capture scaling to a common magnification would therefore be required to properly combine data from the different images.

Cones 182 and 184 schematically represent cones of light propagating from microscope objective 110 to respective object-space focal planes 172 and 174 of microscope objective 110, or from respective object-space focal planes 172 and 174 to microscope objective 110. Object-space focal planes 172 and 174 indicate the near and far limits, respectively, of depth range 170. These limits may be imposed by one or more of a variety of factors, such as the maximum varifocal range of microscope objective 110 or the maximum range of microscope objective 110 over which one or more imaging quality metrics of microscope objective 110 is maintained within a certain tolerance. These imaging quality metrics may include the degree of object-space telecentricity, the degree of sharpness of images captured by image sensor 130, or the degree of one or more optical aberrations of microscope objective 110. When the limit associated with object-space focal plane 172 (or object-space focal plane 174) is defined by the maximum range of microscope objective 110 over which one or more imaging quality metrics of microscope objective 110 is maintained within a certain tolerance, the limit may represent a suitable cut-off value for required value(s) of the imaging quality metric(s).

In an embodiment, microscope objective 110 includes a tunable lens 112, having tunable focal length, and a fixed focal-length lens 114. Tunable lens 112 is positioned at the back focus of fixed focal-length lens 114 to obtain object-space telecentricity of microscope objective 110. One or both of tunable lens 112 and fixed focal-length lens 114 may be a lens assembly, such as a compound lens including multiple elements bonded to each other and/or an assembly of lenses optically coupled in series. In certain embodiments, tunable lens 112 is electrically tunable. For example, tunable lens 112 is a liquid-filled lens with at least one surface having shape sensitive to a voltage applied thereto. In an alternative embodiment, tunable lens 112 is mechanically tunable and the focal length of tunable lens 112 is tuned by mechanically actuating (e.g., translating or deforming) at least a portion of tunable lens 112. Embodiments wherein tunable lens 112 is electrically tunable may enable faster scanning of the focal length of microscope objective 110 than embodiments relying on mechanical actuation.

Structured illumination source 120 may be a microdisplay that displays a structured light pattern. Alternatively, structured illumination source 120 forms a structured light pattern by illuminating grating or a spatial light modulator.

In an embodiment, EDOF microscope 100 is configured for operation in a broadband spectral range, such as the visible spectrum, the ultraviolet spectrum, the near-infrared spectrum, or a combination thereof. In another embodiment, EDOF microscope 100 is optimized for operation in a narrow spectral range, such as a portion of the visible spectrum, or in a narrow band around a specific frequency, wherein this narrow band may be as narrow as 100 nanometers (nm), 50 nanometers, or 10 nanometers. In one such example, structured illumination source 120 is a narrow-band light source, such that the optical elements of EDOF microscope 100, e.g., microscope objective 110, do not need to be optimized for low chromatic aberration. This narrow-band light source may include one or more light-emitting diodes (LEDs) that emit light of a particular color, for example one or more green LEDs.

EDOF microscope 100 may include, or be coupled with, a control module 140 and a focal length controller 150. Focal length controller 150 controls tuning of the focal length of microscope objective 110 based on a signal received from control module 140. In one example, focal length controller 150 applies a voltage, or a series of voltages, to a liquid-filled lens (implementing tunable lens 112) in accordance with a control signal received from control module 140. Control module 140 may further be configured to control structured illumination source 120, for example to generate structured illumination having a certain fringe pattern, or to shift the position of an object-space projection of a fringe pattern created by structured illumination source 120 to be focused on the imaging plane of image sensor 130 or defocused from the imaging plane of image sensor 130. Additionally, control module 140 may control image capture by image sensor 130. Optionally, EDOF microscope 100 includes, or is coupled with, an image processing module 160 that processes images captured by image sensor 130.

Although not shown in FIG. 1, image processing module 160 may be communicatively coupled with control module 140, without departing from the scope hereof. For example, control module 140 may control operation of focal length controller 150, structured illumination source 120, and/or image sensor 130 according to data obtained by image processing module 160 from images captured by image sensor 130, and/or control module 140 may supply image processing module 160 with information about the conditions under which images are captured by image sensor 130.

The combination of object-space telecentric varifocal microscope objective 110 and structured illumination source 120 enables several different imaging modalities utilizing relatively rapid scanning of the imaging plane and, in certain embodiments, also the illumination plane. Herein, the "imaging plane" denotes the plane in object space of a microscope objective (such as microscope objective 110) that is in focus of image capture (such as by image sensor 130). The imaging plane is a conjugate plane of the image sensor. "Illumination plane" denotes the focal plane of the structured illumination in object space. The illumination plane is a conjugate plane of a plane at the structured light source where the structured light source forms a structured light pattern. In some scenarios, the illumination and imaging planes substantially coincide. It is understood that, in these scenarios, some deviation from perfect coincidence may exist, for example due to differences in field curvature associated with the illumination and imaging planes. In one embodiment, EDOF microscope 100 is configured for EDOF structured illumination microscopy (SIM) to, for example, perform EDOF surface profiling or EDOF microdeflectometry. In another embodiment, EDOF microscope 100 is configured for deconvolution-free, single-shot focus scanning (SSFS) EDOF microscopy. In certain embodiments, EDOF microscope 100 is sufficiently small to be portable.

Figure 2:
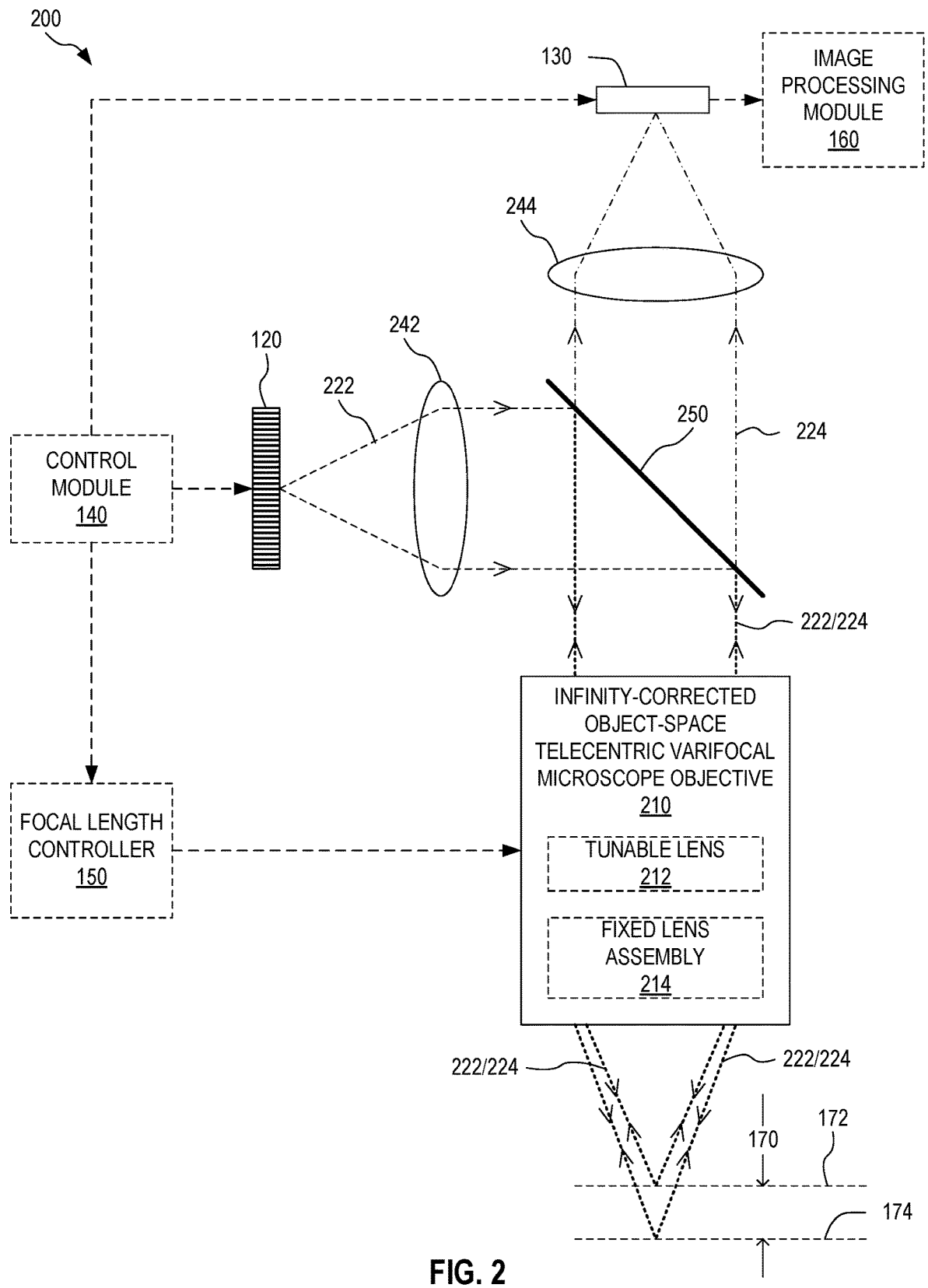
FIG. 2 is a schematic diagram of an optical configuration of an EDOF microscope, according to an embodiment.
Figure 3:
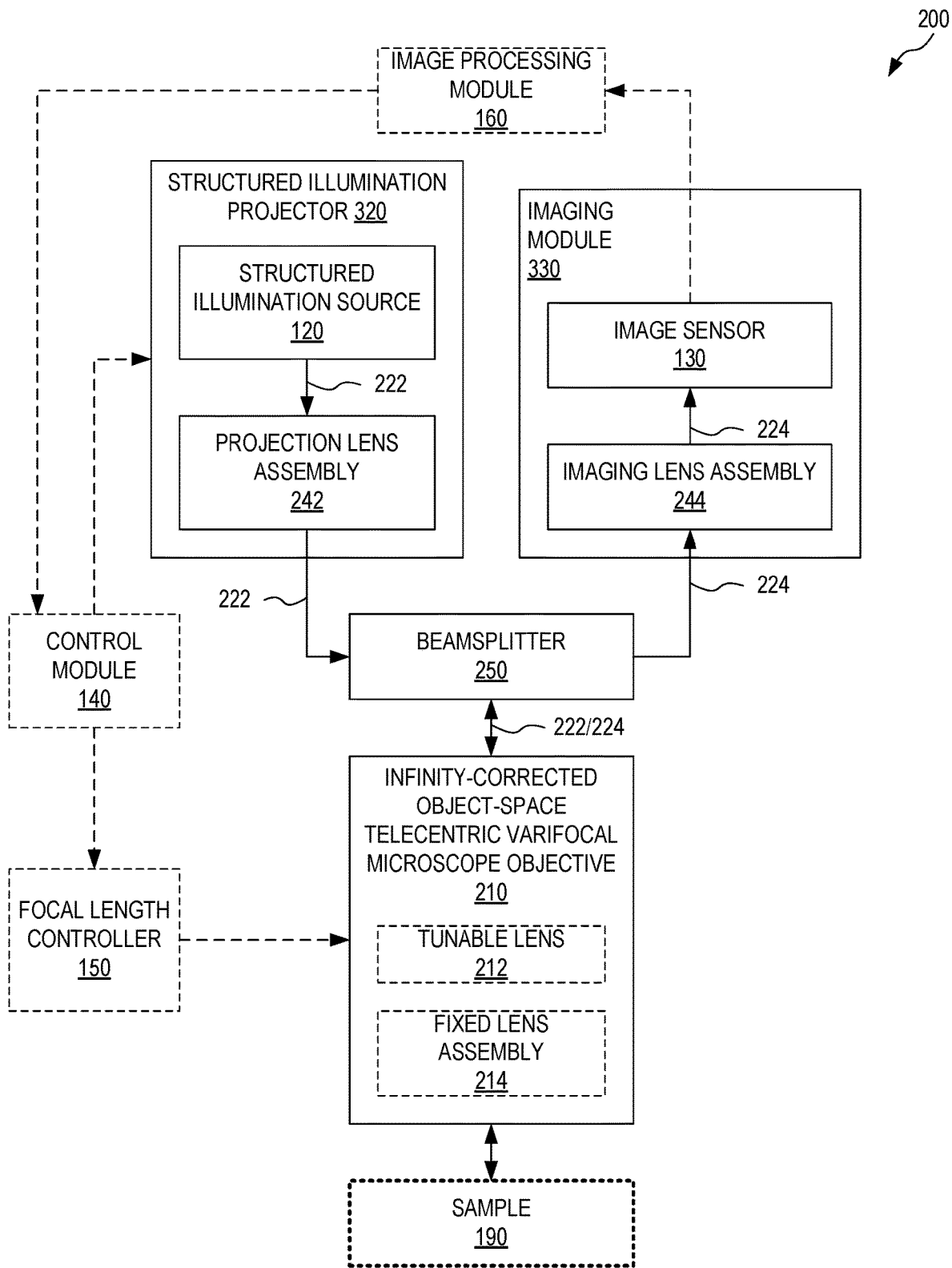
FIG. 3 is a block diagram of an EDOF microscope, according to an embodiment.

FIGS. 2 and 3 illustrate one exemplary EDOF microscope 200 that implements an infinity-corrected object-space telecentric varifocal microscope objective 210. EDOF microscope 200 is an embodiment of EDOF microscope 100. FIG.

2 is a schematic diagram of an exemplary optical configuration of EDOF microscope 200. FIG. 3 is a block diagram of a more general embodiment of EDOF microscope 200. FIGS. 2 and 3 are best viewed together.

In an embodiment, microscope objective 210 includes a tunable lens 212, having tunable focal length, and a fixed focal-length lens 214. Tunable lens 212 is positioned at the back focus of fixed focal-length lens 214 to obtain object-space telecentricity of microscope objective 210. Tunable lens 212 is an embodiment of tunable lens 112, and fixed focal-length lens 214 is an embodiment of fixed focal-length lens 114.

EDOF microscope 200 includes microscope objective 210, a projection lens assembly 242, an imaging lens assembly 244, and a beamsplitter 250. Projection lens assembly 242 collects structured illumination 222, generated by structured illumination source 120, and cooperates with microscope objective 210 to project structured illumination 222 into object space of microscope objective 210. Together, structured illumination source 120 and projection lens assembly 242 form a structured illumination projector 320. Imaging lens assembly 244 focuses light collected by microscope objective 210, from the object space of microscope objective 210, onto image sensor 130. Together, image sensor 130 and imaging lens assembly 244 form an imaging module 330.

Each of projection lens assembly 242 and imaging lens assembly 244 is infinity-corrected. Consequently, the distance between microscope objective 210 and either one of projection lens assembly 242 and imaging lens assembly 244 may be set according to practical consideration with little or no impact on the optical performance of EDOF microscope 200. Projection lens assembly 242 and microscope objective 210 cooperate to form an infinity-corrected projection system that projects structured illumination from structured illumination source 120 into the object space of microscope objective 210. Imaging lens assembly 244 and microscope objective 210 cooperate to form an infinity-corrected imaging system that images light 224 from the object space of microscope objective 210 onto image sensor 130 to form an image of sample 190 (for clarity not shown in FIG. 2) on image sensor 130.

Beamsplitter 250 is positioned on the image side of microscope objective 210, in the infinity space of EDOF microscope 200. In the embodiment shown in FIG. 2, beamsplitter 250 (a) receives structured illumination 222 from projection lens assembly 242 and reflects structured illumination 222 in the direction toward microscope objective 210, and (b) receives light 224 from microscope objective 210 and transmits light 224 toward imaging lens assembly 244. In an alternative embodiment (not shown in FIG. 2), beamsplitter 250 (a) receives structured illumination 222 from projection lens assembly 242 and transmits structured illumination 222 toward microscope objective 210, and (b) receives light 224 from microscope objective 210 and reflects light 224 in the direction toward imaging lens assembly 244. In one embodiment, beamsplitter 250 is a polarizing beamsplitter, for example implemented as a polarizing beamsplitter cube. In another embodiment, beamsplitter 250 is a polarization-insensitive beamsplitter, such as a 50/50 beamsplitter or a polarization-insensitive beamsplitter with a transmission/reflection ratio configured according to the needs of a particular use of EDOF microscope 200, optionally implemented as a polarization-insensitive beamsplitter cube.

Without departing from the scope hereof, one or both of projection lens assembly 242 and imaging lens assembly 244 may be a single lens. Although shown in FIG. 2 as coinciding, the illumination plane associated with structured illumination 222 may be displaced from the imaging plane associated with light 224. Although not shown in FIG. 2, image processing module 160 may, as discussed above in reference to FIG. 1 and as shown in FIG. 3, be communicatively coupled with control module 140, without departing from the scope hereof.

In an embodiment, projection lens assembly 242 and imaging lens assembly 244 are substantially identical in order to prevent or at least minimize mismatch of field curvatures associated with the illumination and imaging planes.

Figure 4:
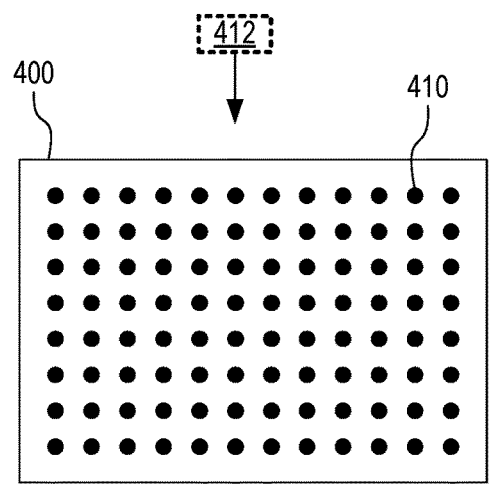
FIG. 4 illustrates a microdisplay for generating structured illumination, according to an embodiment.

FIG. 4 illustrates one exemplary microdisplay 400 for generating structured illumination 222. Microdisplay 400 is an embodiment of structured illumination source 120 that includes an array of emitters 410. Microdisplay 400 may be implemented in either one of EDOF microscopes 100 and 200. Microdisplay 400 receives a control signal 412 indicating a desired structured light pattern, and operates emitters 410 to produce the desired structured light pattern. In one implementation, microdisplay 400 receives control signal 412 from control module 140.

Microdisplay 400 may be configured to operate emitters 410 in a binary mode, wherein each emitter 410 is either on or off. Alternatively, microdisplay 400 may be configured to operate emitters 410 at a variety of different power settings to produce structured light patterns with a more complex variety of brightnesses.

In an embodiment, each emitter 410 is configured to emit broadband illumination, for example white light. In another embodiment, each emitter 410 includes a plurality of individually controllable narrow-band emitters. In one example of this embodiment, each emitter 410 includes a red LED, a green LED, and a blue LED. In this embodiment, microdisplay 400 may be operated to (a) use all narrow-band emitters of each emitter 410, when turned on, to generate broadband illumination or (b) use only one type of the narrow-band emitters (e.g., the green LEDs) to generate narrow-band illumination.

It is understood that microdisplay 400 is capable of generating substantially smooth illumination when all emitters 410 are turned on.

Figure 5:
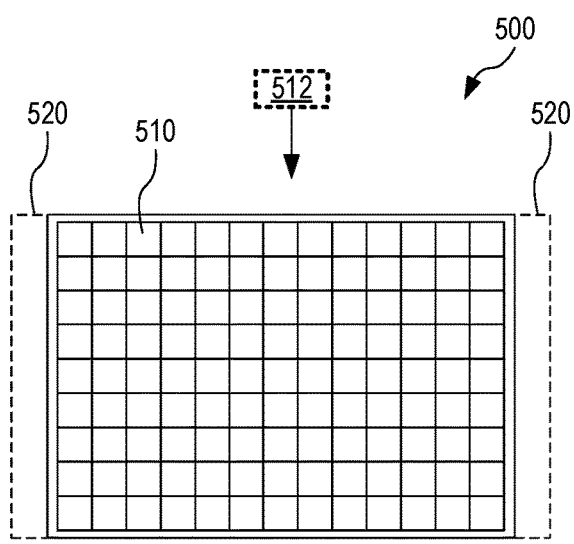
FIG. 5 illustrates another microdisplay for generating structured illumination, according to an embodiment.

FIG. 5 illustrates another exemplary microdisplay 500 for generating structured illumination 222. Microdisplay 500 includes an array of liquid-crystal pixels 510 that are illuminated by one or more light sources 520. Microdisplay 500 may be implemented in either one of EDOF microscopes 100 and 200. Microdisplay 500 receives a control signal 512 indicating a desired structured light pattern, and liquid-crystal pixels 510 to produce the desired structured light pattern. In one implementation, microdisplay 500 receives control signal 512 from control module 140. Light source(s) 520 may be positioned on the side(s) of the array of liquid-crystal pixels 510 (as shown in FIG. 5), or positioned behind the array of liquid-crystal pixels 510.

In an embodiment, each liquid-crystal pixel 510 is configured to emit broadband illumination, for example white light. In another embodiment, each liquid-crystal pixel 510 includes a plurality of individually controllable narrow-band liquid-crystal pixel. In one example of this embodiment, each liquid-crystal pixel 510 includes a red pixel, a green pixel, and a blue pixel. In this embodiment, microdisplay 500 may be operated to (a) use all narrow-band pixels of each liquid-crystal pixel 510, when turned on, to generate broadband illumination or (b) use only one type of the narrow-band pixels (e.g., the green pixels) to generate narrow-band illumination.

Figure 6:
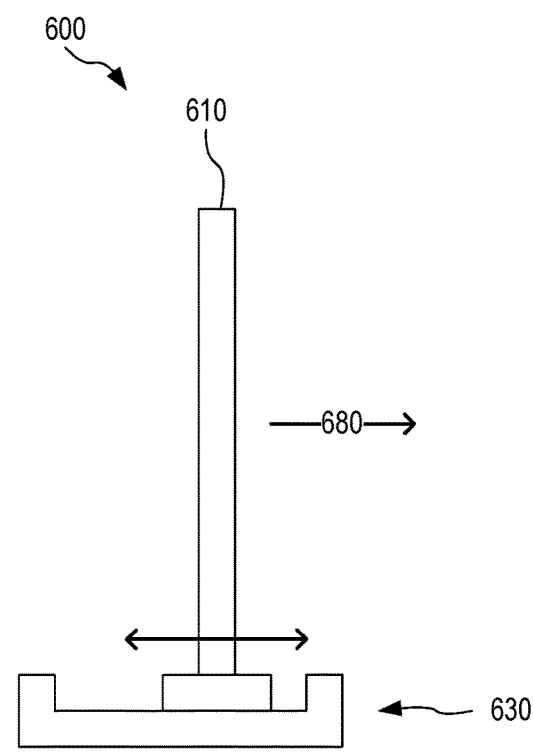
FIG. 6 schematically shows a physical configuration of a microdisplay-based structured illumination source, according to an embodiment.
Figure 7:
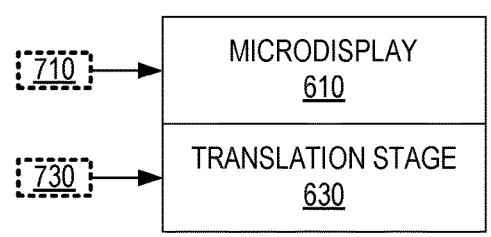
FIG. 7 is a block diagram of a microdisplay-based structured illumination source, according to an embodiment.

FIGS. 6 and 7 illustrate one exemplary microdisplay-based structured illumination source 600 with translation capability. Structured illumination source 600 is an embodiment of structured illumination source 120, and may be implemented in either one of EDOF microscopes 100 and 200. FIG. 6 schematically shows an exemplary physical configuration of structured illumination source 600, and FIG. 7 is a block diagram of a more general embodiment of structured illumination source 600. FIGS. 6 and 7 are best viewed together.

Structured illumination source 600 includes a microdisplay 610 and a translation stage 630 coupled with microdisplay 610. Translation stage 630 is configured to translate microdisplay 610 back and forth along a direction 680. Direction 680 is the general propagation direction of structured illumination 222 from microdisplay 610 toward microscope objective 110 or 210, optionally via beamsplitter 250.

In operation, translation stage 630 translates microdisplay 610 in accordance with a control signal 730, and the generation of structured illumination by microdisplay 610 is governed by a control signal 710. Control signals 710 and 730 may be received from control module 140. In an embodiment, microdisplay 610 is one of microdisplays 400 and 500, and control signal 710 is a corresponding one of control signals 412 and 512.

Translation stage 630 is used to adjust the position of the illumination plane of the structured illumination generated by microdisplay 610. In one example of use, translation stage 630 adjusts the position of microdisplay 610 to properly focus the projection of structured illumination, generated by microdisplay 610, on a desired plane in the object space of microscope objective 110. In this example, the desired plane in the object space of microscope objective 110 may be the imaging plane associated with imaging by image sensor 130. In another example of use, translation stage 630 adjusts the position of microdisplay 610 to defocus the projection of structured illumination, generated by microdisplay 610, by a desired amount from the illumination plane associated with imaging by image sensor 130.

FIG. 6 shows translation stage 630 being coupled with a side of microdisplay 610. However, without departing from the scope hereof, translation stage 630 may be mounted to other portions of microdisplay 610, such as the back of microdisplay 610 facing opposite direction 680, two or more sides of microdisplay 610, or a combination of the back and one or more sides of microdisplay 610.

While electrical tuning of the focal length of microscope objective 110 presents a significant advantage in terms of scanning speed and, thus, overall image acquisition time, it is less important to be able to rapidly change the position of microdisplay 610. Nevertheless, translation stage 630 may utilize piezoelectric actuation and microelectromechanical (MEMS) based actuation to achieve relatively fast translation. Alternatively, translation stage 630 may include a mechanical motor to actuate translation of microdisplay 610.

Figure 8:
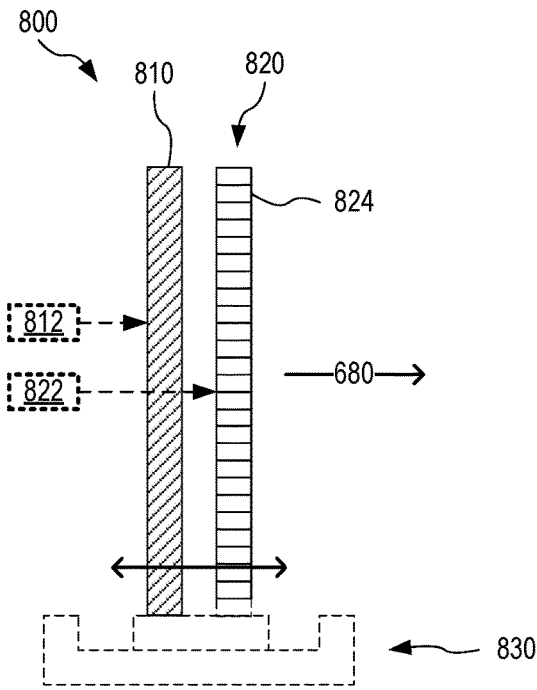
FIG. 8 schematically shows a physical configuration of a modulator-based structured illumination source, according to an embodiment.
Figure 9:
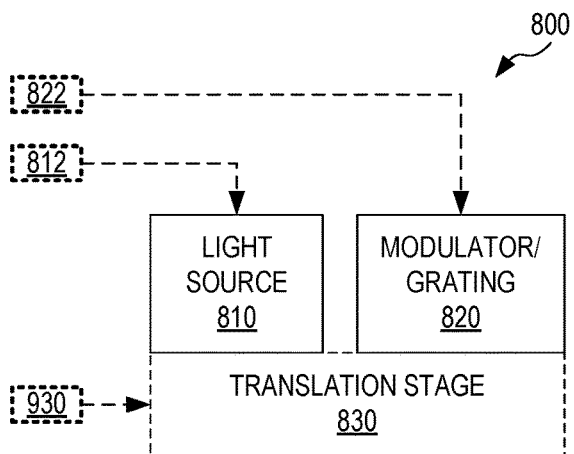
FIG. 9 is a block diagram of a modulator-based structured illumination source, according to an embodiment.

FIGS. 8 and 9 illustrate one exemplary modulator-based structured illumination source 800. Structured illumination source 800 is an embodiment of structured illumination source 120 and may be implemented in either one of EDOF microscopes 100 and 200. FIG. 8 schematically shows an exemplary physical configuration of structured illumination source 800, and FIG. 9 is a block diagram of a more general embodiment of structured illumination source 800. FIGS. 8 and 9 are best viewed together.

Structured illumination source 800 includes a light source 810 and a modulator 820 that modulates light generated by light source 810 to produce a structured illumination pattern. Modulator 820 may be configured to spatially modulate (a) the transmission of light received from light source 810 (as shown in FIG. 8) of (b) the reflection of light received from light source 810. Modulator 820 includes a plurality of regions 824 to spatially modulate light received from light source 810. In one example, modulator 820 is a grating and regions 824 indicate features of the grating. In another example, modulator 820 is a spatial light modulator and regions 824 indicate pixels of the spatial light modulator. In operation, light source 810 and modulator 820 are controlled by respective control signals 812 and 822, for example received from control module 140.

In certain embodiments, structured illumination source 800 further includes a translation stage 830 for moving the position of the structured illumination pattern generated by structured illumination source 800 for purposes similar to those discussed above in reference to FIGS. 6 and 7. Translation stage 830 may be similar to translation stage 630. Translation stage 830 is configured to simultaneously translate light source 810 and modulator 820 together without changing the relative positioning of light source 810 and modulator 820. In operation, translation stage 830 positions modulator 820 (where the structured illumination pattern is generated) according to a control signal 930. Control signal 930 is for example received from control module 140.

Figure 10:
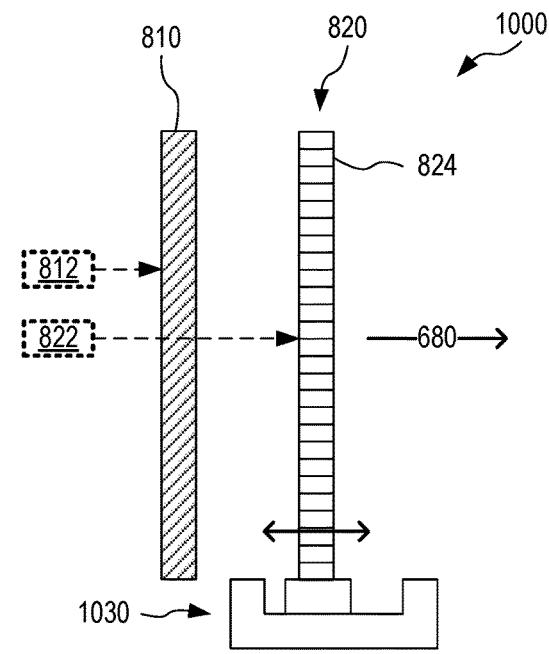
FIG. 10 schematically shows a physical configuration of another modulator-based structured illumination source, according to an embodiment.
Figure 11:
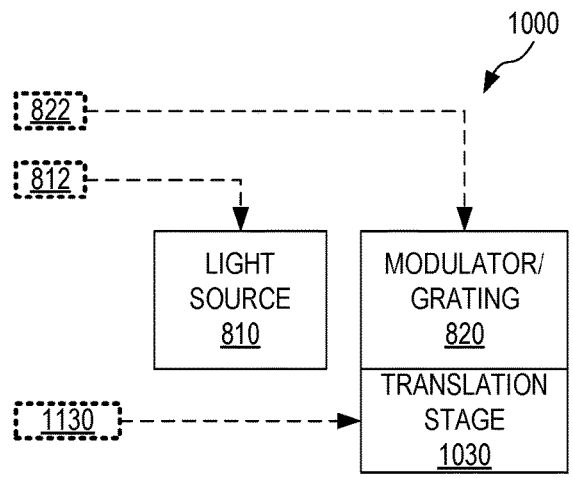
FIG. 11 is a block diagram of another modulator-based structured illumination source, according to an embodiment.

FIGS. 10 and 11 illustrate another exemplary modulator-based structured illumination source 1000. Structured illumination source 1000 is an embodiment of structured illumination source 120 and may be implemented in either one of EDOF microscopes 100 and 200. FIG. 10 schematically shows an exemplary physical configuration of structured illumination source 1000, and FIG. 11 is a block diagram of a more general embodiment of structured illumination source 1000. FIGS. 10 and 11 are best viewed together.

Structured illumination source is similar to the embodiment of structured illumination source 800 that includes translation stage 830, except that translation stage 830 is replaced by a translation stage 1030. Translation stage 1030 translates modulator 820 but leaves the position of light source 810 unaffected. Translation stage 1030 may be similar to translation stage 630. Translation stage 1030 is configured to translate modulator 820 to move the position of the structured illumination pattern generated by structured illumination source 1000 for purposes similar to those discussed above in reference to FIGS. 6 and 7. In operation, translation stage 1030 positions modulator 820 (where the structured illumination pattern is generated) according to a control signal 1130. Control signal 1130 is for example received from control module 140.

Figure 12:
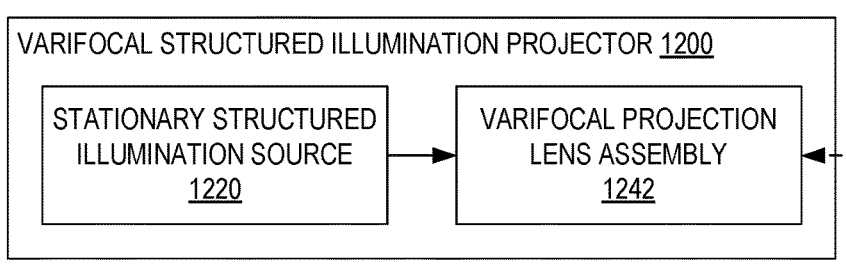
FIG. 12 illustrates one exemplary varifocal structured illumination projector, according to an embodiment.

FIG. 12 illustrates one exemplary varifocal structured illumination projector 1200. Varifocal structured illumination projector 1200 is an embodiment of structured illumination projector 320. Varifocal structured illumination projector 1200 is capable of shifting the illumination plane associated with structured illumination 222.

Varifocal structured illumination projector 1200 includes a stationary structured illumination source 1220 and a varifocal projection lens assembly 1242. The focal length of varifocal projection lens assembly 1242 may be tuned, for example electrically or mechanically, to shift the position of the illumination plane associated with structured illumination 222. In operation, varifocal projection lens assembly 1242 adjusts its focal length based upon a signal 1230. Signal 1230 is for example received from control module 140.

Figure 13:
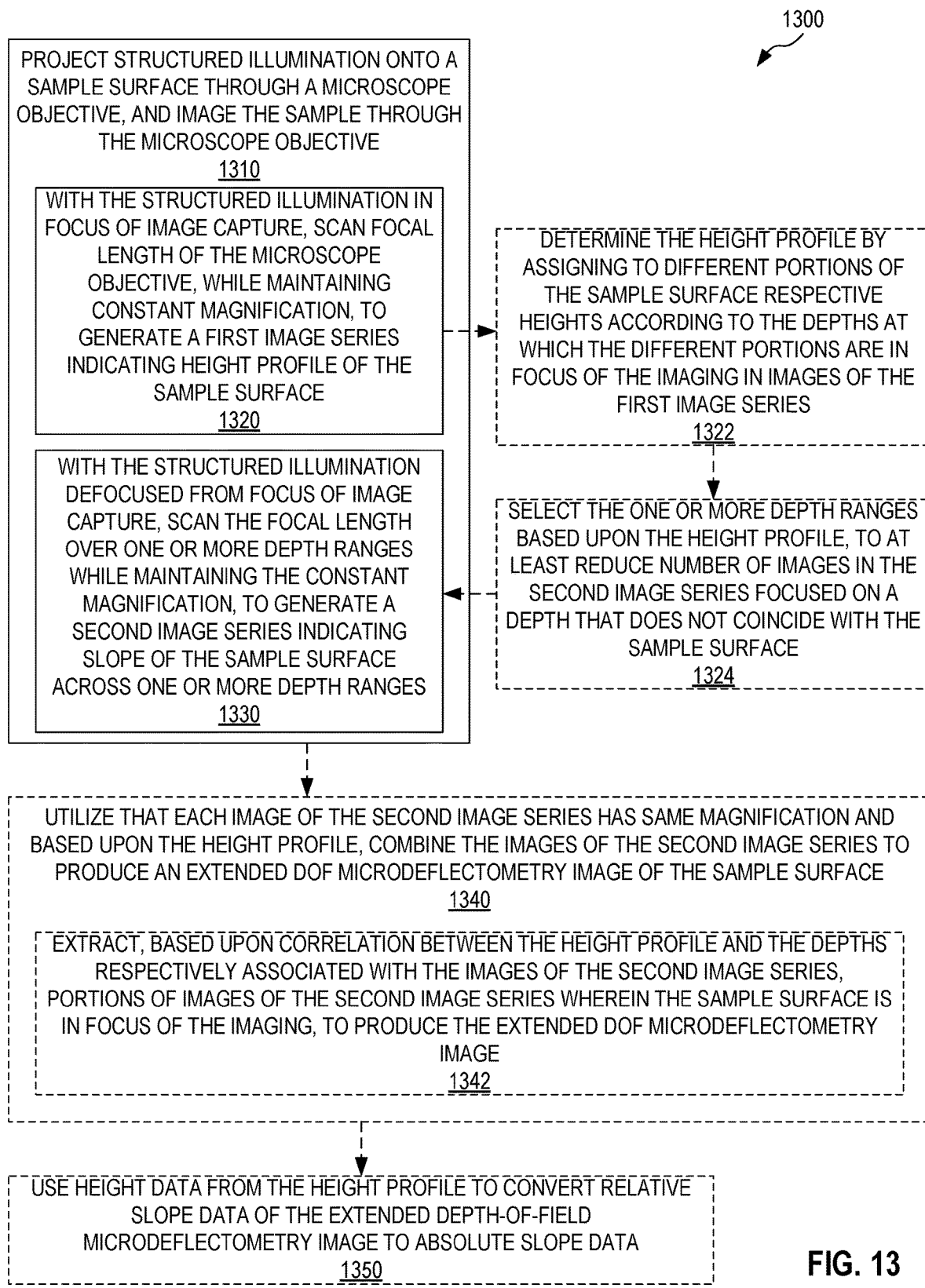
FIG. 13 illustrates one exemplary method for EDOF microdeflectometry of a sample surface, according to an embodiment.

FIG. 13 illustrates one exemplary method 1300 for EDOF microdeflectometry of a sample surface. Method 1300 may be performed by embodiments of EDOF microscopes 100 or 200 capable of moving the illumination plane independently of the imaging plane. For example, method 1300 may be performed by either one of EDOF microscopes 100 and 200 implementing any one of structured illumination sources 600, 800 (with translation stage 830), and 1000. Alternatively, method 1300 may be performed by either one of EDOF microscopes 100 and 200 implementing varifocal structured illumination projector 1200.

A step 1310 projects structured illumination onto a sample surface and images the sample. Step 1310 projects the illumination onto the sample surface through a microscope objective, and step 1310 images the sample through the same microscope objective. In one example of step 1310, structured illumination source 600, 800 (with translation stage 830), or 1000 subjects a surface of sample 190 to structured illumination through microscope objective 110 (optionally implemented as microscope objective 210), and image sensor 130 images sample 190 through microscope objective 110 (optionally implemented as microscope objective 210). In another example of step 1310, varifocal structured illumination projector 1200 subjects a surface of sample 190 to structured illumination through microscope objective 110 (optionally implemented as microscope objective 210), and image sensor 130 images sample 190 through microscope objective 110 (optionally implemented as microscope objective 210).

Step 1310 includes steps 1320 and 1330. Step 1320 is performed with substantially coinciding illumination and imaging planes, such that the structured illumination is in focus in the captured images for portions of the sample surface that are in focus in the captured images. In contrast, step 1330 is performed with the illumination plane offset from the imaging plane, such that the structured illumination, as projected onto the sample surface, is defocused from the focal plane of the imaging.

FIG. 14 shows an example of translation of a structured illumination pattern in step 1310 to achieve the illumination plane conditions needed in steps 1320 and 1330. The example of FIG. 14 is based upon an embodiment of EDOF microscope 200 that implements a translation stage for at least a part of structured illumination source 120, for example in manner similar to that discussed for structured illumination sources 600, 800, and 1000. The example of FIG. 14 is readily extendable to other embodiments of EDOF microscope 100 implementing a translation stage for at least a part of structured illumination source 120. Structured illumination source produces a structured illumination pattern 1410 at the structured illumination source, for example at microdisplay 610 or at modulator 820. Structured illumination 222 emanating from structured illumination pattern 1410 is collected by projection lens assembly 242. Translation of structured illumination pattern 1410 toward projection lens assembly 242 (e.g., from 1410(1) to 1410(2)), causes the focused projection of structured illumination pattern 1410 into the object space of microscope objective 210 to shift further away from microscope objective 210 (see FIGS. 2 and 3). Likewise, translation of structured illumination pattern 1410 away from projection lens assembly 242 (e.g., from 1410(2) to 1410(1)), causes the focused projection of structured illumination pattern 1410 into the object space of microscope objective 210 to shift toward microscope objective 210.

Referring again to FIG. 13, with the structured illumination focused on the imaging plane, step 1320 scans the focal length of the microscope objective, while maintaining substantially constant magnification, to generate a first series of images indicative of the height profile of the sample surface. When scanning the focal length of the microscope objective, step 1320 simultaneously scans the position of the illumination and imaging plans by the same amount such that the structured illumination stays focused on the imaging plane. Each image of the first image series corresponds to a different depth in object space of the microscope objective. For any one of the images, if a portion of the image shows in-focus structured illumination, this portion necessarily corresponds to a portion of the sample surface located in the imaging plane, and the height of this portion of the sample surface (at least on a relative scale) is readily deduced from the depth associated with the image. Step 1320 may evaluate sharpness of the structured illumination as projected onto the sample surface to determine the depths at which the different portions are in focus. Since step 1320 maintains a substantially constant magnification of the microscope objective while scanning the focal length, no scaling or interpolation is needed when comparing or combining different images captured in step 1320. In one example of step 1320, translation stage 630, 830, or 1030 positions a corresponding one of structured illumination source 600, structured illumination source 800, and modulator 820 to focus the structured illumination on the imaging plane associated with image sensor 130. Next, in this example of step 1320, focal length controller 150 scans the focal length of microscope objective 110 or 210 through at least a portion of depth range 170. In another example of step 1320, varifocal projection lens assembly 1242 adjusts its focal length to focus the structured illumination on the focal plane of the imaging performed by image sensor 130. Next, also in this example of step 1320, focal length controller 150 scans the focal length of microscope objective 110 or 210 through at least a portion of depth range 170.

With the structured illumination defocused from the imaging plane, step 1330 scans the focal length of the microscope objective to scan the imaging plane over one or more depth ranges, while maintaining constant magnification of the microscope objective, to generate a second image series. This second image series is a series of microdeflectometry images, each corresponding to a different depth in the object space of the microscope objective. The second image series indicates slope of the sample surface across the one or more depth ranges. In one example of step 1330, translation stage 630, 830, or 1030 positions a corresponding one of structured illumination source 600, structured illumination source 800, and modulator 820 to defocus the structured illumination from the imaging plane associated with image sensor 130. Next, in this example of step 1320, focal length controller 150 scans the focal length of microscope objective 110 or 210 through at least a portion of depth range 170. In another example of step 1320, varifocal projection lens assembly 1242 adjusts its focal length to defocus the structured illumination from the focal plane of the imaging performed by image sensor 130. Next, also in this example of step 1320, focal length controller 150 scans the focal length of microscope objective 110 or 210 through at least a portion of depth range 170.

In certain embodiments, steps 1320 and 1330 scan the focal length by electrically tuning focal length of a lens of the microscope objective. In one example of such embodiments, the microscope objective includes tunable lens 112 and a fixed focal-length lens 114, and focal length controller 150 tunes the focal length of tunable lens 112 to scan the focal length of the microscope objective. For example, tunable lens 112 may be a liquid-filled lens and focal length controller 150 scans the focal length of this liquid-filled lens by scanning a voltage applied to the liquid-filled lens.

All imaging, illumination, and focal length scanning of step 1310 may be controlled by control module 140.

FIGS. 15A and 15B show an example of focal plane scanning in steps 1320 and 1330. The example of FIGS. 15A and 15B is based upon EDOF microscope 200 implementing microscope objective 210 with tunable lens 212 and fixed focal-length lens 214. However, the example of FIGS. 15A and 15B is readily extendable to other embodiments of EDOF microscope 100 capable of translating the illumination plane independently of the imaging plane. FIG. 15A is an overall view of the optical system. FIG. 15B is a close-up of microscope objective 210 and the object space thereof. FIGS. 15A and 15B are best viewed together.

The offset between the imaging plane (shown as "camera focus" or imaging plane 1520) and the focused projection of structured illumination pattern 1410 into the object space (shown as "fringe image" or pattern 1590) is indicated by a distance 1510 (also shown as "d"). In step 1320, distance 1510 is zero. In step 1330, distance 1510 is non-zero. When scanning the focal length of microscope objective 210 in either one of steps 1320 and 1330, for example by electrically tuning the focal length of tunable lens 212, each of imaging plane 1520 and pattern 1590 are simultaneously scanned by the same amount.

Referring again to FIG. 13, method 1300 may include a step 1340 of producing an EDOF microdeflectometry image of the sample surface. Step 1340 combines the images of the second series to produce the EDOF microdeflectometry image based upon the height profile indicated by the first image series. Step 1340 utilizes that all images of the second image series has the same magnification, such that scaling and interpolation is unnecessary. In one example, image processing module 160 performs step 1340. In an embodiment, step 1340 includes a step 1342 that produces the EDOF microdeflectometry image by extracting, based upon correlation between the height profile indicated by the first image series and the depths respectively associated with the images of the second image series, portions of images of the second image series wherein the sample surface is in the imaging plane. In one implementation of this embodiment, step 1342 uses sample surface height data obtained from the first image series to determine, for each image in the second image series, which portion (if any) of the sample surface is in the imaging plane. Step 1342 then (a) extracts, from each of the images of the second image series, the slope data for that particular portion of the sample surface found to be in the imaging plane (if any), and (b) combines all slope data extracted from the second image series to produce a single EDOF microdeflectometry image.

An optional step 1350 uses height data from the height profile indicated by the first image series to convert relative slope data of the EDOF microdeflectometry image produced in step 1340 to absolute slope data. In a simple example, the relative slope along a path between two points on the sample surface may be converted to absolute slope by integrating the relative slope along the path and scaling the relative slope to match the height difference between the two points. Determination of absolute slope may be achieved from one or more absolute height differences. It is not necessary to know the absolute height of any single point of the sample surface, and it is therefore also not necessary to have absolute knowledge of the position of the sample surface or the absolute knowledge of the depth at which the first and second image series are recorded. In the simple example concerned with the path between two points, it is sufficient to know the absolute height difference between the two points. Step 1350 may be performed by image processing module 160.

In an embodiment, method 1300 performs step 1320 prior to step 1330, and method 1300 further includes steps 1322 and 1324. This embodiment of method 1300 utilizes the height information indicated by the first image series to select the depth ranges probed in step 1330, so as to avoid excessive image capture at irrelevant depths such as depths not associated with any portion of the sample surface. Step 1322 determines the height profile of the sample surface by assigning to different portions of the sample surface respective heights according to the depths at which the different portions are in focus in images of the first image series, as discussed above in reference to step 1320. Step 1322 may be performed by image processing module 160. Based upon the height profiled determined in step 1322, step 1324 selects the one or more depth ranges to be used in step 1330, to at least reduce number of images in the second image series focused on a depth that does not coincide with the sample surface. In one example of step 1324, image processing module 160 determines the one or more depth ranges and communicates this depth range (or ranges) to control module 140.

Method 1300 may be useful even for relatively flat surfaces if the microscope used to image the surface exhibits significant field curvature.

Figure 16:
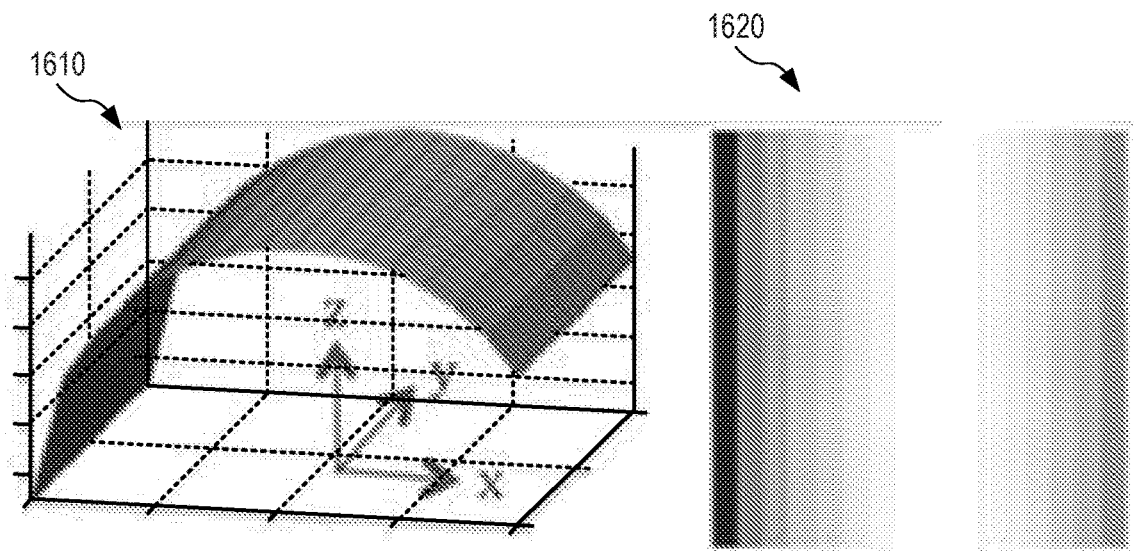
FIG. 16 shows an exemplary height profile of a sample surface.

FIG. 16 shows an exemplary height profile of a sample surface, as determined by step 1322 of method 1300. Plot 1610 is the height profile shown in three dimensions, and plot 1620 is a two-dimensional map of the height profile.

Figure 17:
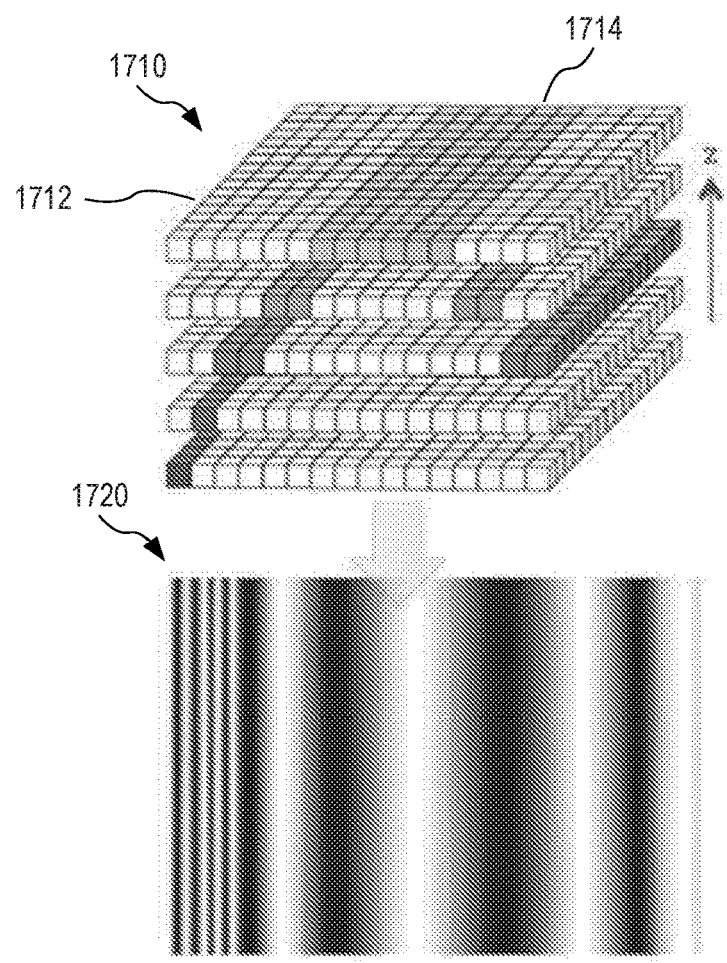
FIG. 17 shows exemplary generation of an EDOF microdeflectrometry image of the sample surface.

FIG. 17 shows exemplary generation of an EDOF microdeflectrometry image of the sample surface, as performed by step 1342 of method 1300. Diagram 1710 shows a series of microdeflectometry images 1712 captured in step 1330. Each image 1712 includes a portion 1714 that, based upon the height profile of FIG. 16, is determined to be associated with a portion of the sample surface in focus in image 1712. Step 1340 extracts portions 1714 and combines portions 1714 in a single EDOF microdeflectometry image 1720.

Figure 18:
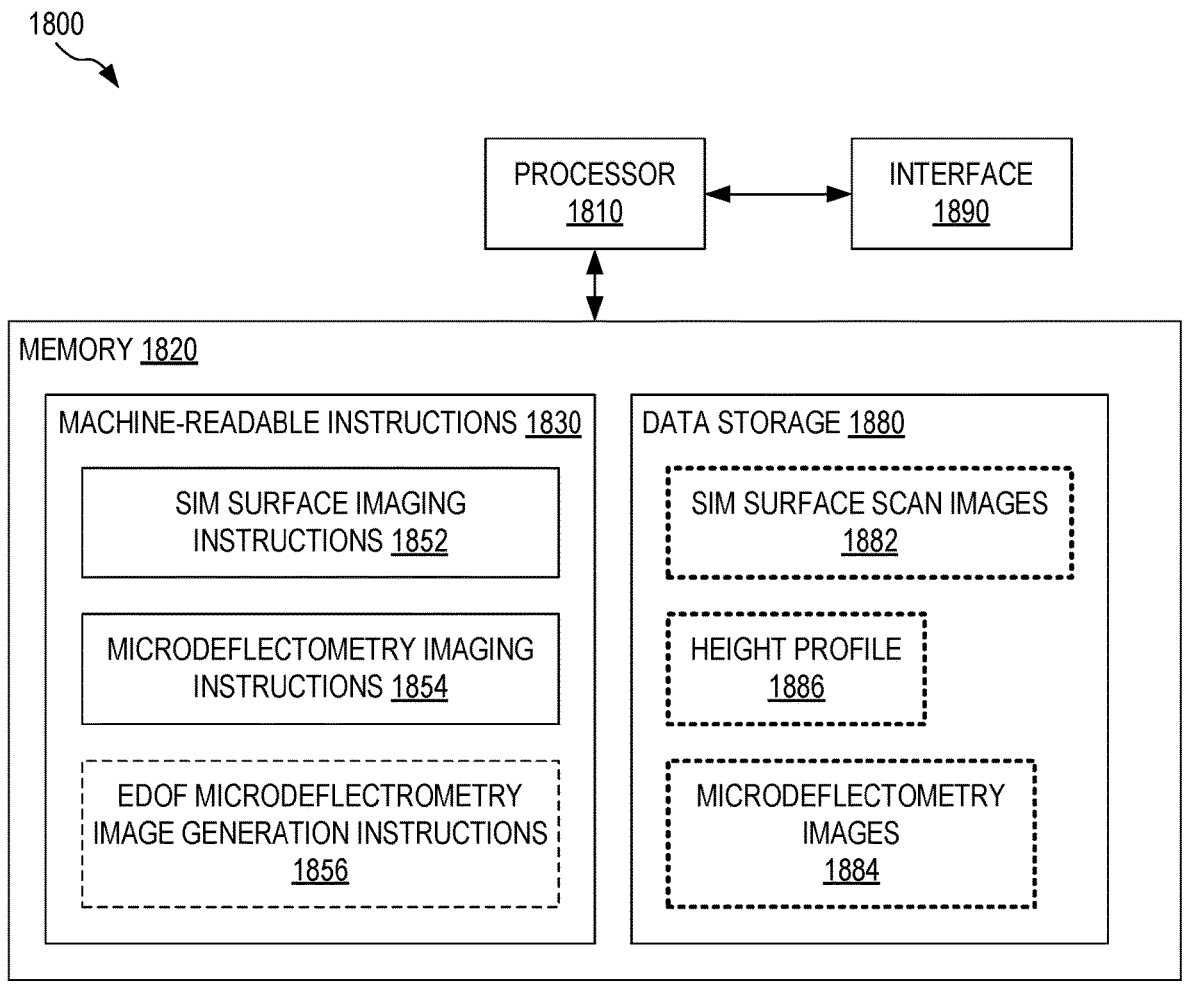
FIG. 18 illustrates a computer for, in cooperation with an EDOF microscope, performing EDOF microdeflectrometry of a sample surface, according to an embodiment.

FIG. 18 illustrates one exemplary computer 1800 for, in cooperation with an embodiment of EDOF microscope 100, performing EDOF microdeflectometry of a sample surface. Computer 1800 is an embodiment of control module 140, and optionally also embodies at least a portion of image processing module 160. Computer 1800 is configured to cooperate with an embodiment of EDOF microscope 100, capable of moving the illumination plane independently of the imaging plane, to perform method 1300.

Computer 1800 includes a processor 1810, a non-transitory memory 1820, and an interface 1890. Memory 1820 includes machine-readable instructions 1830 and a data storage 1880. Instructions 1830 may be encoded in a non-volatile portion of memory 1820. Instructions 1830 includes SIM surface imaging instructions 1852 that, upon execution by processor 1810, command EDOF microscope 100 to perform step 1320 of method 1300 as discussed above in reference to FIG. 13. Instructions 1830 also include microdeflectometry imaging instructions 1854 that, upon execution by processor 1810, command EDOF microscope 100 to perform step 1330 of method 1300 as discussed above in reference to FIG. 13. In certain embodiments, instructions

1830 further include EDOF microdeflectrometry image generation instructions 1856 that, upon execution by processor 1810, perform step 1340 of method 1300 as discussed above in reference to FIG. 13.

In operation, processor 1810 executes SIM surface imaging instructions 1852 to, via interface 1890, command image sensor 130, structured illumination source 120, and microscope objective 110 to perform step 1310 of method 1300, as discussed above in reference to FIG. 13, to generate SIM surface scan images 1882. Processor 1810 receives SIM surface scan images 1882 from image sensor 130 via interface 1890 and stores SIM surface scan images 1882 to data storage 1880. Processor 1810 also executes microdeflectometry imaging instructions 1854, for example after execution of SIM surface imaging instructions 1852, to command (via interface 1890) image sensor 130, structured illumination source 120, and microscope objective 110 to perform step 1310 of method 1300, as discussed above in reference to FIG. 13, to generate microdeflectometry images 1884. Processor 1810 receives microdeflectometry images 1884 from image sensor 130 via interface 1890 and stores microdeflectometry images 1884 to data storage 1880. In one scenario, processor 1810 subsequently executes EDOF microdeflectrometry image generation instructions 1856 to perform step 1340 of method 1300 so as to generate an EDOF microdeflectometry image based upon SIM surface scan images 1882 and microdeflectometry images 1884. Processor 1810 may store this EDOF microdeflectometry image to data storage 1880 or output the EDOF microdeflectometry image via interface 1890.

Figure 19:
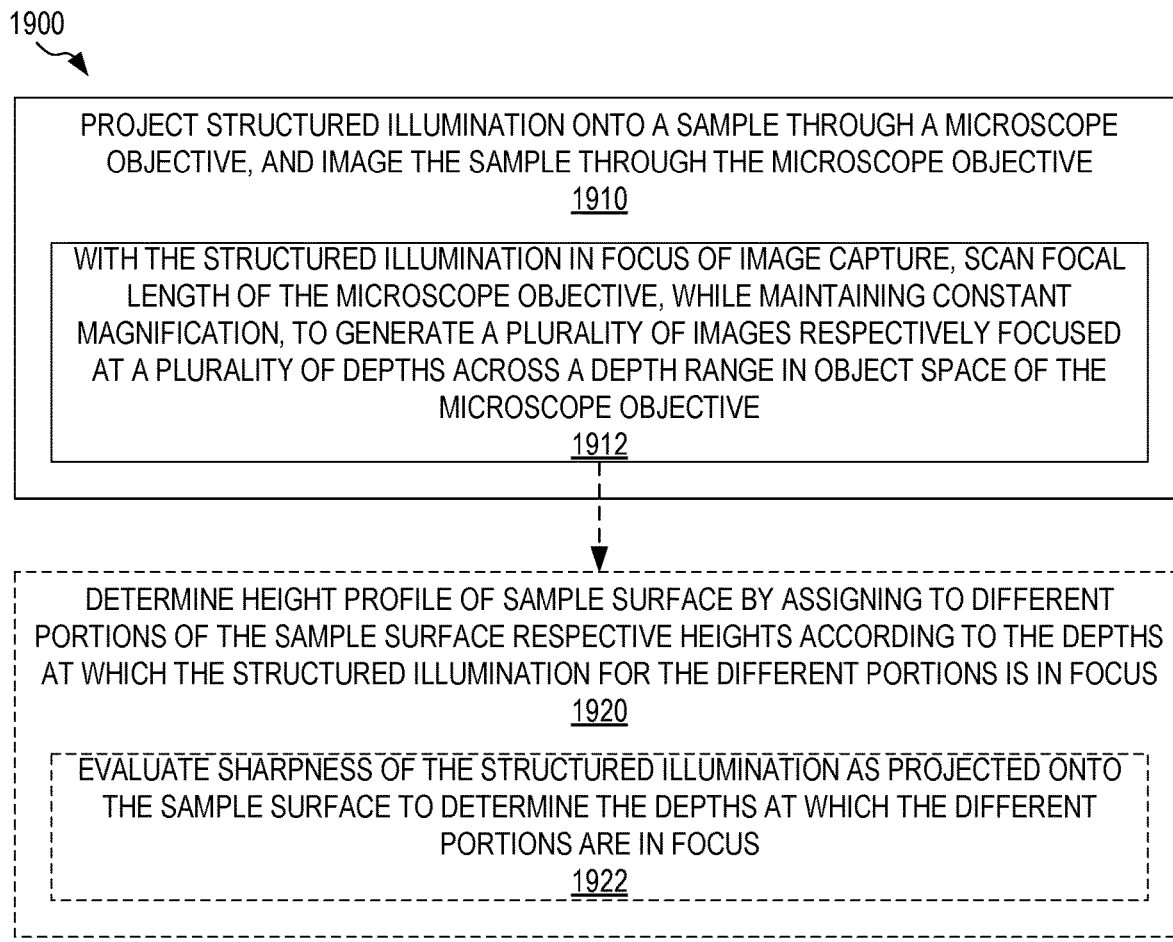
FIG. 19 illustrates a method for EDOF structured illumination microscopy (SIM), according to an embodiment.

FIG. 19 illustrates one exemplary method 1900 for EDOF structured illumination microscopy (SIM). Method 1900 may be performed by EDOF microscope 100. In certain use scenarios, method 1900 is performed by an embodiment of EDOF microscope 100, wherein structured illumination source 120 is positioned to coincide the illumination plane with the imaging plane, with little or no freedom to adjust the position of either one of structured illumination source 120 and the focused projection of the structured illumination into the object space of microscope objective 110.

A step 1910 projects structured illumination onto a sample through a microscope objective and images the sample through the same microscope objective. In one example of step 1910, structured illumination source 120 subjects sample 190 to structured illumination through microscope objective 110, and image sensor 130 images sample 190 through microscope objective 110.

Step 1910 includes a step 1912 performed with the structured illumination in focus of image capture, that is, with substantially coinciding illumination and imaging planes. Step 1912 scans the focal length of the microscope objective, while maintaining constant magnification, to generate a plurality of images respectively focused at a plurality of depths across a depth range in object space of the microscope objective. In certain embodiments, step 1912 scans the focal length of the microscope objective by electrically tuning the focal length of a lens of the microscope objective, such as a liquid-filled lens. When scanning the focal length of the microscope objective, step 1910 simultaneously scans the position of the illumination and imaging plans by the same amount such that the structured illumination stays in focus image capture. Since step 1910 maintains a substantially constant magnification of the microscope objective while scanning the focal length, no scaling or interpolation is needed when comparing or combining different images captured in step 1910. In one example of step 1912, focal length controller 150 scans the focal length of microscope objective 110 or 210 through at least a portion of depth range 170.

Method 1900 may include a step 1920 of determining the height profile of a surface of the sample by assigning to different portions of the sample surface respective heights according to the depths at which the structured illumination for the different portions is in focus. Step 1920 is similar to step 1322 of method 1300, and may include a step 1922 of evaluating the sharpness of the structured illumination as projected onto the sample surface to determine the depths at which the different portions are in focus, as discussed above in reference to FIG. 13.

Figure 20:
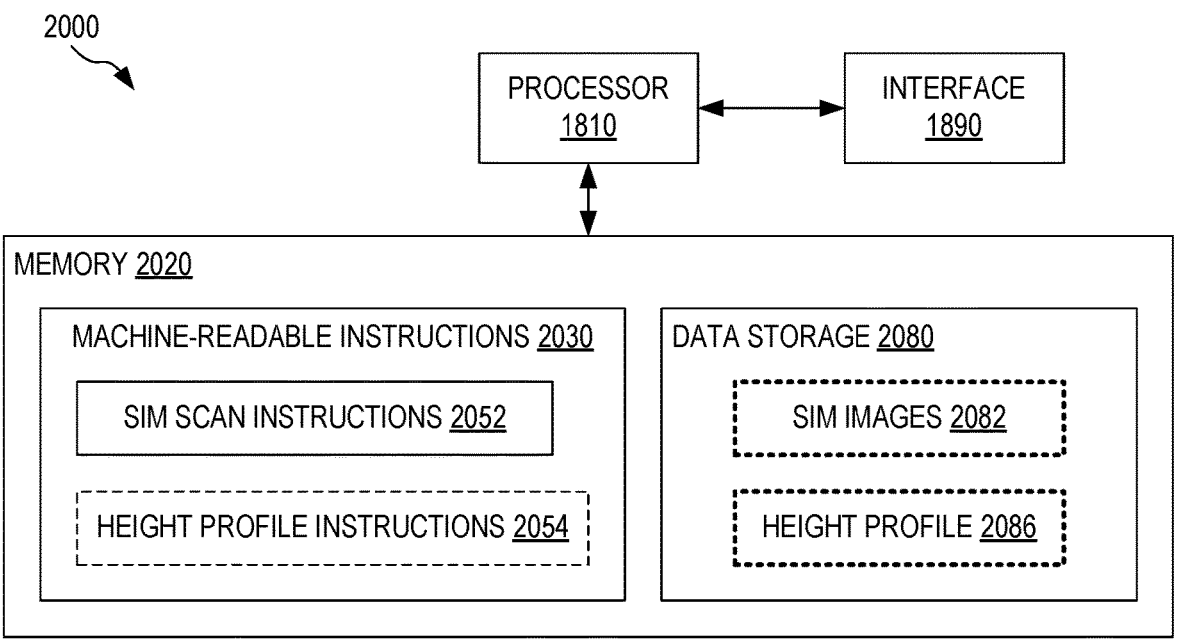
FIG. 20 illustrates another computer for, in cooperation with an EDOF microscope, performing EDOF structured illumination microscopy (SIM) of a sample, according to an embodiment.

FIG. 20 illustrates one exemplary computer 2000 for, in cooperation with EDOF microscope 100, performing EDOF SIM of a sample. Computer 2000 is an embodiment of control module 140, and optionally also embodies at least a portion of image processing module 160. Computer 2000 includes processor 1810, interface 1890, and a memory 2020.

Memory 2020 includes machine-readable instructions 2030 and a data storage 2080. Instructions 2030 may be encoded in a non-volatile portion of memory 2020. Instructions 2030 includes SIM scan instructions 2052 that, upon execution by processor 1810, command EDOF microscope 100 to perform step 1910 of method 1900 as discussed above in reference to FIG. 19. In certain embodiments, instructions 2030 also include height profile instructions 2054 that, upon execution by processor 1810, perform step 1920 of method 1900 as discussed above in reference to FIG. 19.

In operation, processor 1810 executes SIM scan instructions 1952 to, via interface 1890, command image sensor 130, structured illumination source 120, and microscope objective 110 to perform step 1910 of method 1900, as discussed above in reference to FIG. 19, to generate SIM images 2082. Processor 1810 receives SIM images 2082 from image sensor 130 via interface 1890 and stores SIM images 2082 to data storage 2080. In one scenario, processor 1810 subsequently executes height profile instructions 2054 to perform step 1920 of method 1900 so as to determine a height profile 2086 of the sample surface based upon SIM images 2082. Processor 1810 may store height profile 2086 to data storage 2080 or output the height profile 2086 via interface 1890.

FIG. 21 illustrates one exemplary method 2100 for deconvolution-free EDOF microscopy. Method 2100 may be performed by EDOF microscope 100. In certain use scenarios, method 2100 is performed by an embodiment of EDOF microscope 100, wherein structured illumination source 120 is positioned to coincide the illumination plane with the imaging plane, with little or no freedom to adjust the position of either one of structured illumination source 120 and the focused projection of the structured illumination into the object space of microscope objective 110. Method 2100 is an example of single-shot focus-scanning (SSFS) EDOF microscopy and benefits from structured illumination and an object-space telecentric illumination and imaging scheme to allow generation of an EDOF image without the need for image deconvolution.

Method 2100 includes steps 2110, 2120, and 2130 performed in parallel. Method 2100 repeats the performance of steps 2110, 2120, and 2130 for at least three different periodic structured illumination patterns phase shifted from each other. In one example, the structured illumination patterns are fringe patterns characterized by the same period but phase shifted from each other. The fringe pattern is, for example, alternating dim and bright stripes, or an approximately sinusoidal pattern.

Step 2110 projects structured illumination onto a sample through a microscope objective. In one example of step 2110, structured illumination source 120 projects structured illumination onto sample 190 via microscope objective 110. In one embodiment, step 2110 utilizes a microdisplay, such as microdisplay 400 or 500, to facilitate simple modification of the structured illumination pattern when performing the at least three different repetitions of step 2110.

Step 2120 tunes the focal length of the microscope objective, while maintaining constant magnification, to scan a common focal plane associated with (a) the structured illumination and (b) an image sensor that captures an image of the sample through the microscope objective. Step 2120 scans this common focal plane across a depth range in object space of the microscope objective. In one example of step 2120, EDOF microscope 100 is configured such that the illumination plane associated with structured illumination source 120 and the imaging plane associated with image sensor 130 are substantially located in a common plane. In this example, focal length controller 150 scans the focal length of microscope objective 110 to scan the location of this common plane within at least a portion of depth range 170. In an embodiment, step 2120 electrically tunes a lens of the microscope objective, for example a liquid-filled lens, to scan the focal length of the microscope objective. This embodiment may utilize tunable lens 112. Step 2120 may include a step 2122 of repeatedly scanning the common focal plane back and forth across a depth range at a constant speed.

Step 2130 acquires an image of the sample illuminated by the structured illumination while step 2120 scans the focal length of the microscope objective. For most samples, the image therefore contains contributions from different locations of the common focal plane. In one example of step 2130, image sensor 130 acquires an image while focal length controller 150 is scanning the focal length of microscope objective 110. The exposure time for image capture by image sensor 130 is sufficiently long to allow scanning of the focal length of microscope objective 110 across a desired depth range during the exposure time.

In embodiments of method 2100 including step 2122, step 2130 may implement a step 2132 of exposing the image sensor for an exposure time that equals an integer number of periods of the depth scanning performed in step 2122, for example a single period of the back-and-forth depth scanning. In this embodiment, image capture in step 2130 and focal length scanning in step 2120 may be unsynchronized. The relationship between the exposure time and the scanning period ensure that the image captured in step 2130 samples each depth of the depth range with equal weight.

Method 2100 may include a step 2140 that combines the images captured in the at least three repetitions of step 2130 to generate a single EDOF image of the sample. Since all captured images show sample 190 with the same magnification, no scaling or interpolation is required to generate the single EDOF image. In one example of step 2140, image processing module 160 combines images captured by image sensor 130 to produce the EDOF image. Step 2140 may implement a step 2142. Step 2142 cooperatively demodulates the images captured in the at least three repetitions of step 2130 through square-law demodulation to generate the single EDOF image. For example, when performing three repetitions of 2130 to capture three images $I_1$, $I_2$, and $I_3$, the three illumination patterns of the parallel repetitions of step 2110 are phase shifted from each other by at least approximately $2\pi/3$, and step 2142 calculates the EDOF image as $I=[(I_1-I_2)^2+(I_1-I_3)^2+(I_2-I_3)^2]^{1/2}$.

FIG. 22A shows exemplary operation of an EDOF microscope to perform steps 2110, 2120, and 2130 of method 2100. The example of FIG. 22A is based upon EDOF microscope 200 implementing microscope objective 210 with tunable lens 212 and fixed focal-length lens 214. However, the example of FIG. 20 is readily extendable to other embodiments of EDOF microscope 100. In step 2110, structured illumination source 120 generates a periodic pattern 2212 which is projected into object space of microscope objective 210, such that the illumination plane associated with structured illumination source 120 substantially coincides, in a common focal plane 2290, with the imaging plane associated with image capture by image sensor 130. Step 2120 scans the focal length of microscope objective 210, by tuning the focal length of tunable lens 212, to scan the position of common focal plane 2290 across at least a portion of depth range 170 during image capture by image sensor 130.

FIG. 22B shows exemplary focal length scanning and image capture performed by steps 2120 and 2130 of method 2100 in an embodiment of method 2100 that implements steps 2122 and 2132. FIG. 22B shows the location 2250 of common focal plane 2290 as a function of time. FIG. 22B also shows exposure 2260 of image sensor 130 as a function of time. Depth scanning is characterized by a period 2252. Exposure of image sensor 130 is characterized by a period 2262. Period 2262 equals period 2252 but may be offset therefrom. Between each image exposure, there is a delay 2264, for example associated with readout of the captured image from image sensor 130 and resetting of image sensor 130. Since period 2262 equals period 2252, delay 2264 may take on any value without adversely affecting the data acquisition process or an EDOF image generated therefrom.

FIG. 23 shows an example of image combination performed in step 2140 of method 2100 to generate an EDOF image. This example is based upon capture of three images 2160(1), 2160(2), and 2160(3). Each of images 2160(1), 2160(2), and 2160(3) represents a depth-integration of the sample as illuminated by structured illumination, and the brightness of the sample is modulated by the illumination pattern. Step 2140 combines images 2160(1), 2160(2), and 2160(3), for example using square-law demodulation, to generate a single EDOF image 2370. The combination process removes the modulation caused by the illumination pattern.

Figure 24:
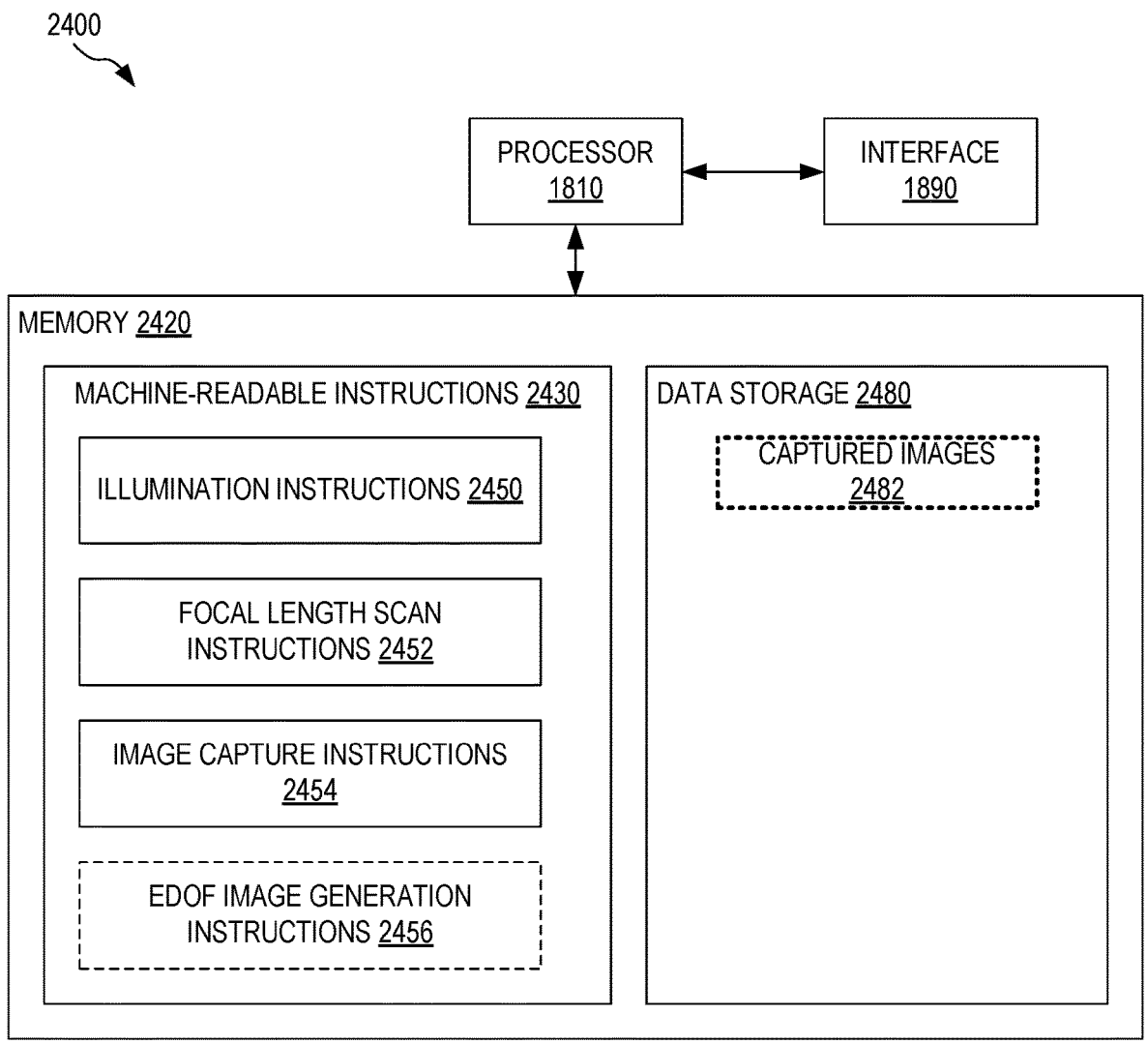
FIG. 24 illustrates an exemplary computer for, in cooperation with an EDOF microscope, performing an embodiment of the method of FIG. 21.

FIG. 24 illustrates one exemplary computer 2400 for, in cooperation with EDOF microscope 100, performing EDOF SSFS microscopy of a sample. Computer 2400 is an embodiment of control module 140, and optionally also embodies at least a portion of image processing module 160. Computer 2400 includes processor 1810, interface 1890, and a memory 2420.

Memory 2420 includes machine-readable instructions 2430 and a data storage 2480. Instructions 2430 may be encoded in a non-volatile portion of memory 2420. Instructions 2430 includes illumination instructions 2450, focal length scanning instructions 2452, and image capture instructions 2454. Upon execution by processor 1810, illumination instructions 2450 command structured illumination source 120 to perform a desired number of repetitions of step 2110 of method 2100, focal length scanning instructions 2452 command focal length controller 150 to perform a corresponding set of repetitions of step 2120 of method 2100, and image capture instructions 2454 command image sensor 130 to perform a corresponding set of repetitions of step 2130 of method 2100, as discussed above in reference to FIG. 21. Processor 1810 communicates control signals to focal length controller 150, structured illumination source 120, and image sensor 130 via interface 1890. Also, processor 1810 and receives images 2482 captured by image sensor 130 during execution of image capture instructions 2454 via interface 1890. Processor 1810 stores images 2482 to data storage 2480.

Instructions 2430 may further include EDOF image generation instructions 2456 that, upon execution by processor 1810, retrieve images 2482 from data storage 2480 and perform step 2140 of method 2100 to generate a single EDOF image from images 2482.

Example I: Theoretical Analysis of
Deconvolution-Free EDOF Microscopy

Without being bound by theory, the following is a theoretical discussion of the deconvolution-free EDOF microscopy of method 2100. To theoretically characterize the imaging properties of method 2100 and compare its performance with that of the conventional SSFS technique using uniform illumination, we analyzed the optical transfer functions (OTF) in both systems. For imaging a 3D object with a fixed focus under the uniform incoherent light illumination, the defocused OTF was simulated by using Stockseth approximation, which is a rotationally symmetric function of spatial frequencies m and n, given by $$(m, n = 0; u) = \Lambda(m)\left\{\frac{2J_1\left[um\left(1 - \frac{|m|}{2}\right)\right]}{um\left(1 - \frac{|m|}{2}\right)}\right\},$$

wherein $$\Lambda(m) = \frac{2}{\pi}\left[\cos^{-1}\left(\frac{|m|}{2}\right) - \frac{|m|}{2}\left(1 - \frac{|m|}{2}\right)^{1/2}\right],$$

and wherein u is the normalized defocus proportional to the defocus distance δz and for a given optical system it is expressed as $u=(8\pi/\lambda)\cdot N\cdot\delta z\cdot\sin^2(\alpha/2)$, λ is the working wavelength, N is the refractive index in object space which is assumed to be unity in the paper for simplicity, α is the half cone angle calculated from numerical aperture (NA), $J_1$ is the first order Bessel function of the first kind, and m and n are normalized by NA/λ. For SIM with projecting fringe frequency of v, we adapted an effective OTF under incoherent fringe projection condition with assumption of imaging a weak object, which is $$C_{eff}(m,n=0;u;v)=C(v,0;u)[C(m+v,0;u)+C(m-v,0;u)].$$

It shows for a given projecting fringe frequency, the effective OTF of a SIM system is the superposition of two shifted OTFs, which is further scaled by the defocused dependent scalar in front of the bracket due to the fringe projection.

Figure 25A:
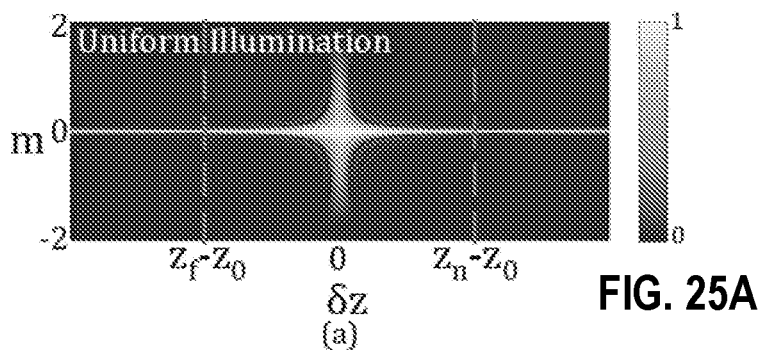
FIGS. 25A-C show exemplary simulated 3D modulation transfer functions for fixed focus imaging under (a) uniform and (b) structured illumination as in an embodiment of the method of FIG. 21.
Figure 25B:
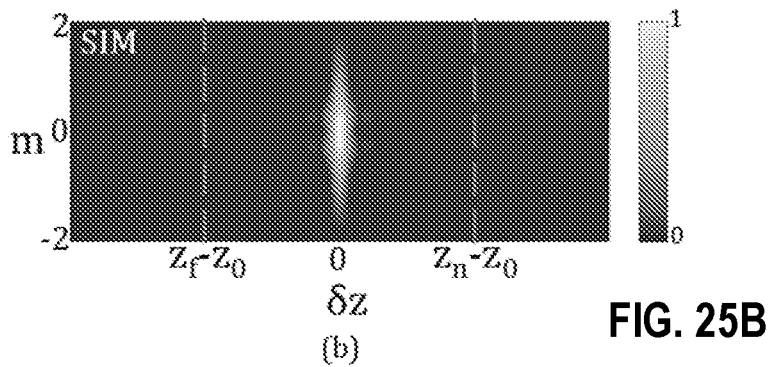
Figure 25C:
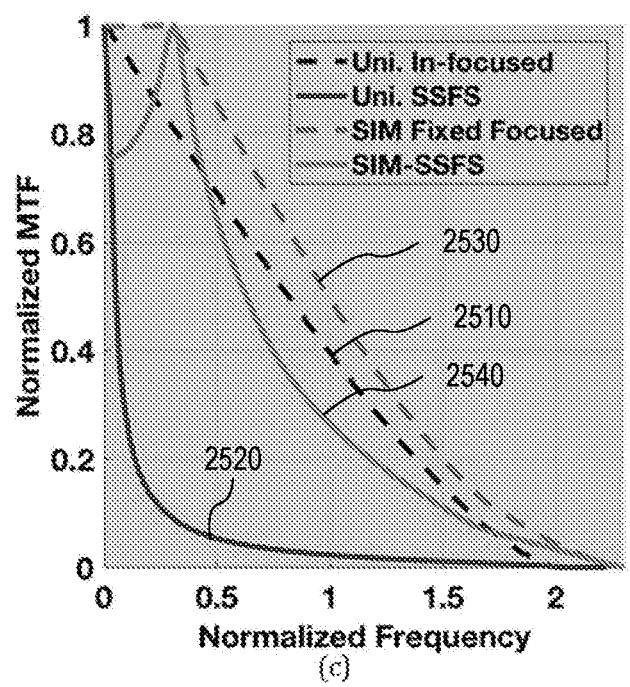

FIGS. 25A and 25B show exemplary simulated 3D MTFs for fixed focus imaging under (a) uniform and (b) structured illumination. Dashed vertical lines indicate the scanning edges for the object placed at the mid-plane through the SSFS technique. FIG. 25C shows exemplary simulated MTFs through fixed focus imaging (dashed lines, 2510 and 2530) and SSFS (solid lines, 2520 and 2540) under uniform (2510 and 2510) and SIM illumination (2530 and 2540). The example scanning range is 300 µm, and the normalized frequency of the projecting fringe for SIM is 0.3. FIGS. 25A-C are best viewed together.

FIGS. 25A and 25B show the axial distributions of the normalized modulation transfer functions (MTF), which are the absolute value of the OTFs, under uniform illumination and SIM with the fringe frequency of 0.3, respectively. The x-axis represents the relative defocus distance δz and y-axis represents the normalized spatial frequency m between the diffraction-limited cutoff frequencies of ±2. Each x-slice indicates the MTF at the corresponding defocus. For example, the x slices at δz=0 in FIGS. 25A and 25B correspond to the in-focused MTFs of the uniformly illuminated and SIM systems, which were plotted as the dark dashed and red dashed lines shown in FIG. 25C, respectively. The major difference between FIGS. 25A and 25B is the MTF value at zero frequency. As defocus increases, the MTF value at zero frequency remains to be unity under uniform illumination but drops rapidly under SIM. This defocus-dependent property is the reason that SIM provides sectioning ability that rejects out-of-focus light contamination.

During the SSFS imaging acquisition process, assuming the temporal focus z is scanned from the far focus $z_f$ to the near focus $z_n$ during the camera exposure, the corresponding OTF of the acquired image for an arbitrary axial position $z_0$, referred as the accumulated OTF, can be written as the average of the involved defocused OTFs, denoted as $C_{acc}$, given by $$C_{acc}(m, n; z_0) = \frac{1}{|z_n - z_f|}\int_{z_f}^{z_n} C(m, n; z - z_0)dz.$$

If we simplify the SIM imaging formation as a linear response, $C_{eff}$ can also be directly applied into the expression for $C_{acc}$ to replace C in the integral, which obtains the accumulated OTF of the SIM-SSFS system. The linear assumption is valid as the nonlinear terms corresponding to out-of-focus signals represent the bare contributions of the integration.

Consider an example of the SSFS image acquisition process for an object located at the mid-plane of a 300 µm scanning range. The scanning edges are indicated by the red dashed lines in FIGS. 25A and 25B and symmetric about the object position that is δz=0. The resulting accumulated MTFs, denoted as $MTF_{acc}$, of the uniform illuminated SSFS and SIM-SSFS systems at the mid-plane of the scanning range were simulated by the above expression for $C_{acc}$ and plotted as the blue solid and magenta solid curves, respectively, as shown in FIG. 25C, where the MTF curves presented were further normalized to a range between zero and unity for comparison. The $MTF_{acc}$ of the uniformly illuminated SSFS system has low values and requires post-deconvolution processing for restoring the image contrast, whereas the $MTF_{acc}$ of the SIM-SSFS system naturally approaches to the in-focused MTF curve (diffraction-limited performance) with further contrast enhancement at the projecting fringe frequency, which demonstrated the sufficient contrast performance of the deconvolution free method.

FIG. 25C demonstrates the $MTF_{acc}$ for an object located at the mid-plane of the scanning range for both the conventional SSFS and SIM-SSFS. To further analyze the $MTF_{acc}$ at other axial positions, the scanning edges indicated by the dashed vertical lines in FIGS. 25A and 25B are no longer symmetric about the axial position at δz=0 but shifted relatively. When the scanning range, $S=|z_f-z_n|$, is large, displacing the relative scanning region generally would not significantly vary the $MTF_{acc}$ described in the above expression for $C_{acc}$ because the change of the involved MTFs due to focus scanning contribute very little in the integral unless the in-focused position is near one of the scanning edges. When the scanning range S is much larger than four times of the DOF of the objective, which is equivalent to the full width of the central bright region of the MTF distribution shown in FIG. 25A, the corresponding $MTF_{acc}$ through conventional SSFS imaging acquisition process is nearly invariant for the most axial positions within the depth scanning range except for the axial positions approaching the scanning edges, which is the reason the post-processing can be successfully applied for all scenes from different focusing depths simultaneously. When the axial location of the object is close to one of the scanning edges, the $MTF_{acc}$ values start to drop and the $MTF_{acc}$ for objects located at the scanning edges is approximately half of that at the mid-plane of the scanning range.

The $MTF_{acc}$ of the SIM-SSFS method shares similar invariant properties to that of conventional SSFS under uniform illumination, except that it stays invariant for a longer range and drops more rapidly near the scanning edges since the axial distribution of the MTFs under SIM shown in FIG. 25B is narrower.

Figure 26:
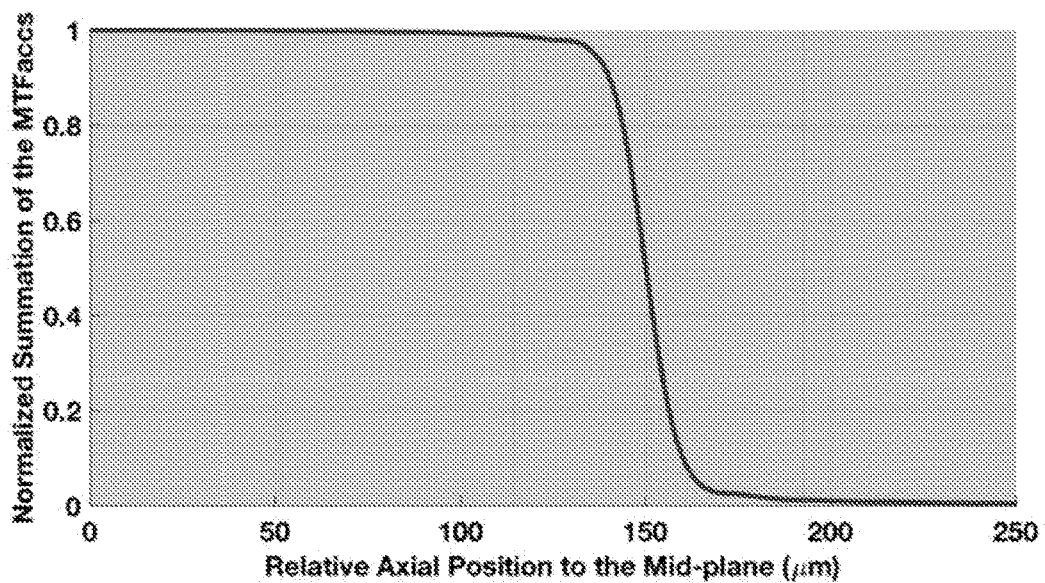
FIG. 26 shows simulated axial variation of the normalized summation of accumulated modulation transfer function values over the spatial frequency in an embodiment of the EDOF microscope of FIG. 1 configured to perform an embodiment of the method of FIG. 21.

FIG. 26 shows the axial variation of the normalized summation of the $MTF_{acc}$ values over the spatial frequency m in the SIM-SSFS system. The $MTF_{acc}$s were simulated by the above expression for $C_{acc}$ with the chosen focus scanning range of 300 μm, and the axial positions were defined by their relative distances to the mid-plane of the focus scanning range. The summation values of the $MTF_{acc}$ values from zero through cutoff frequency at different axial positions were normalized by their maximum, which is that at the mid-plane of the scanning range, for showing the change of the imaging performance with the axial position. It confirmed the shared axial imaging properties with the conventional SSFS system, where the summation of the $MTF_{acc}$ value, which represents imaging quality, remains nearly invariant until the relative axial position near 150 μm and drops rapidly to 0.5 at the relative distance of 150 μm to the mid-plane, which is exactly one of the edges of the chosen focus scanning range. The major difference of the $MTF_{acc}$ between the two illuminating conditions occurs at the zero frequency as the 3D MTFs of the two methods have major difference illustrated in FIGS. 25A and 25B. The $MTF_{acc}$ of the conventional SSFS system at zero frequency remains at unity regardless the axial position, but that of the SIM-SSFS system varies as the other frequencies and drops to half of its maximum at the scanning edges. The effect in the spatial domain results a significant intensity drop on the SIM-SSFS image for the scene that is close to the scanning edges, and the captured signals from the axial positions of the scanning edges only have the magnitude up to half of the maximum strength.

The theoretical achievable EDOF range of the SIM-SSFS method can then be defined by considering the width at the half maximum signal. As the conventional criterion of DOF is given by the half width of the full depth of field range, $\pm n\lambda/NA^2$, we adapted similar criterion for the achievable EDOF range here, which is equivalent to half of the scanning range, $$\pm \frac{|z_n - z_f|}{2},$$

and shares the same criterion with the conventional SSFS technique. Practically, the conventional SSFS EDOF image using uniform illumination may perceive information within a wider axial range than the scanning range since its $MTF_{acc}$ values drop slower and signals are retained in the captured image for scenes outside of the scanning region.

For the conventional SSFS technique using uniform illumination, the $MTF_{acc}$, normalized to a range from zero to unity, becomes lower as the EDOF range increases except for the value at zero frequency. The reason is the consistency of the involved defocused MTF at zero frequency shown in FIG. 25A forces the $MTF_{acc}$ values at the other frequencies being scaled down after normalization as the scanning range increases. Although the corresponding system response function would be used in the deconvolution processing to further enhance the contrast according to the lower profile of the acquired $MTF_{acc}$, it implies the EDOF range cannot be infinitely extended as the contrast of high spatial frequency structure may become lower than environmental noise or camera sensitivity that will result the loss of information.

On the other hand, for the SIM-SSFS method using structured illumination, the normalized $MTF_{acc}$ does not scale down but remains a consistent shape as the scanning range increases because the additional involved defocused MTFs between the two dashed vertical lines shown in FIG. 25B would contribute almost nothing for any of spatial frequency in the integration given in the above expression for $C_{acc}$.

Figure 27A:
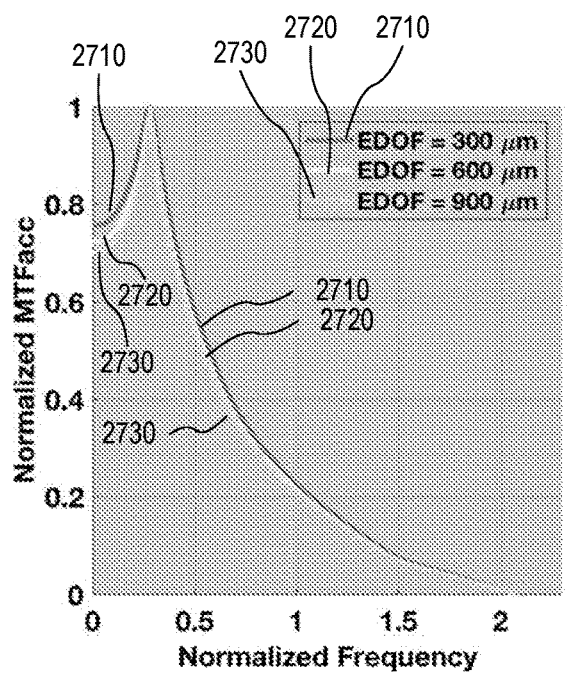
FIGS. 27A and 27B show additional accumulated modulation transfer function data associated with an embodiment of the EDOF microscope of FIG. 1 configured to perform an embodiment of the method of FIG. 21.

FIG. 27A demonstrates the $MTF_{acc}$s of the SIM-SSFS system at the mid-plane of different focus scanning ranges of 300, 600, and 900 μm, respectively. The $MTF_{acc}$s were normalized by their maximum values, which occur at the normalized frequency equivalent to the projecting fringe frequency of 0.3, for comparing the filtering performance in the frequency domain under different operating conditions. As shown in FIG. 27A, despite the $MTF_{acc}$ curve for the large scanning range of 900 μm is slightly lower than the others at low spatial frequencies, the $MTF_{acc}$s from different scanning ranges are generally comparable to each other. It implies that a SIM-SSFS image does not suffer the potential resolution limit for a largely extended EDOF range.

However, there is still a tradeoff between the SIM-SSFS image quality and the increased EDOF range. Although the normalized shape of the $MTF_{acc}$ in the SIM-SSFS system is nearly invariant, the unnormalized $MTF_{acc}$ values, especially at zero frequency that corresponds to the captured intensity in the spatial domain, become lower with the increased scanning range.

Figure 27B:
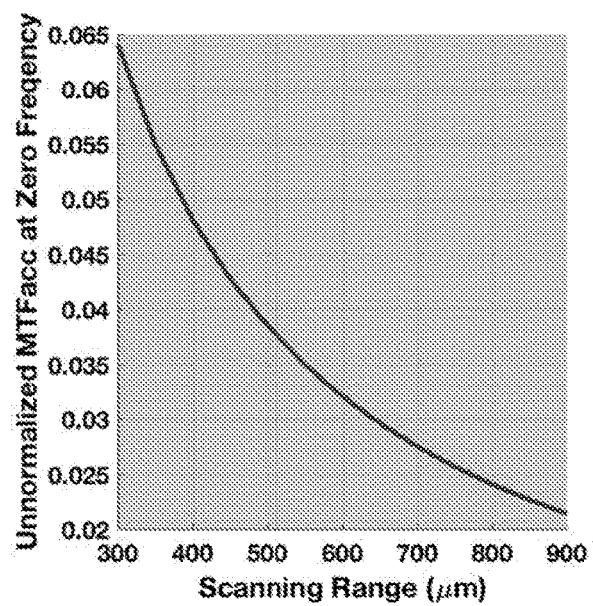

FIG. 27B shows the unnormalized $MTF_{acc}$ value of the SIM-SSFS system at the zero frequency as a function of the operated focus scanning range. The $MTF_{acc}$ values were directly calculated from the above expression for $C_{acc}$ with the normalized $C_{eff}(m,n=0,z)$ illustrated in FIG. 25B in the integral without further normalized. As shown in FIG. 27B, the zero frequency $MTF_{acc}$ value is generally inversely proportional to the scanning range. It results in lower capturable signals along with more artifacts in order to maintain high contrast on the SIM-SSFS image with a larger EDOF range. The increase of photon noise under low light condition would also affect the resulting image quality. Although the decrease of signal-to-noise ratio (SNR) fundamentally limits the extension of the EDOF range in the SIM-SSFS system, it still provides higher resolving ability comparing to the conventional SSFS technique for observing a largely extended depth range.

We experimentally verified the properties of an embodiment of method 2100 via an embodiment of EDOF microscope 200. This prototype system has a constant 2-mm diameter field of view with 0.25 NA. The illumination path utilizes an organic light-emitting diode (OLED) microdisplay with a pixel size of 8 μm to create a narrow-band illumination pattern with a working wavelength centered at 530 nm by only turning on the green pixels of the microdisplay. By displaying either a uniform grey scale image or fringe patterns on the microdisplay of the setup, the system configuration can readily adapted to perform both conventional uniform illumination and SIM for comparisons. Furthermore, the system can also be readily configured to switch between the modes of conventional microscopic imaging and SSFS by simply fixing the focus or turning on focus scanning. By projecting fringe patterns with the equivalent frequency of 73 lp/mm in the object space and taking the captured images through the simple demodulation processing given in Eq. (1), our system obtained optimal SIM imaging quality balanced between contrast and periodic errors coming from the nonlinearity of sinusoidal intensity distribution. Experimental results presented in this section were obtained under the described conditions. The experimental demonstrations mainly contain high spatial frequency structures, which were particularly required to be observed within an EDOF as well as retain imaging quality. As those high spatial frequency structures generally have low contrast, they were satisfied with the assumption of the weak object in the derivation of the above expression for $C_{eff}$ and thus can be used for validating the above theoretical analysis.

Example II: Infinity-Corrected EDOF Microscope

Figure 28:
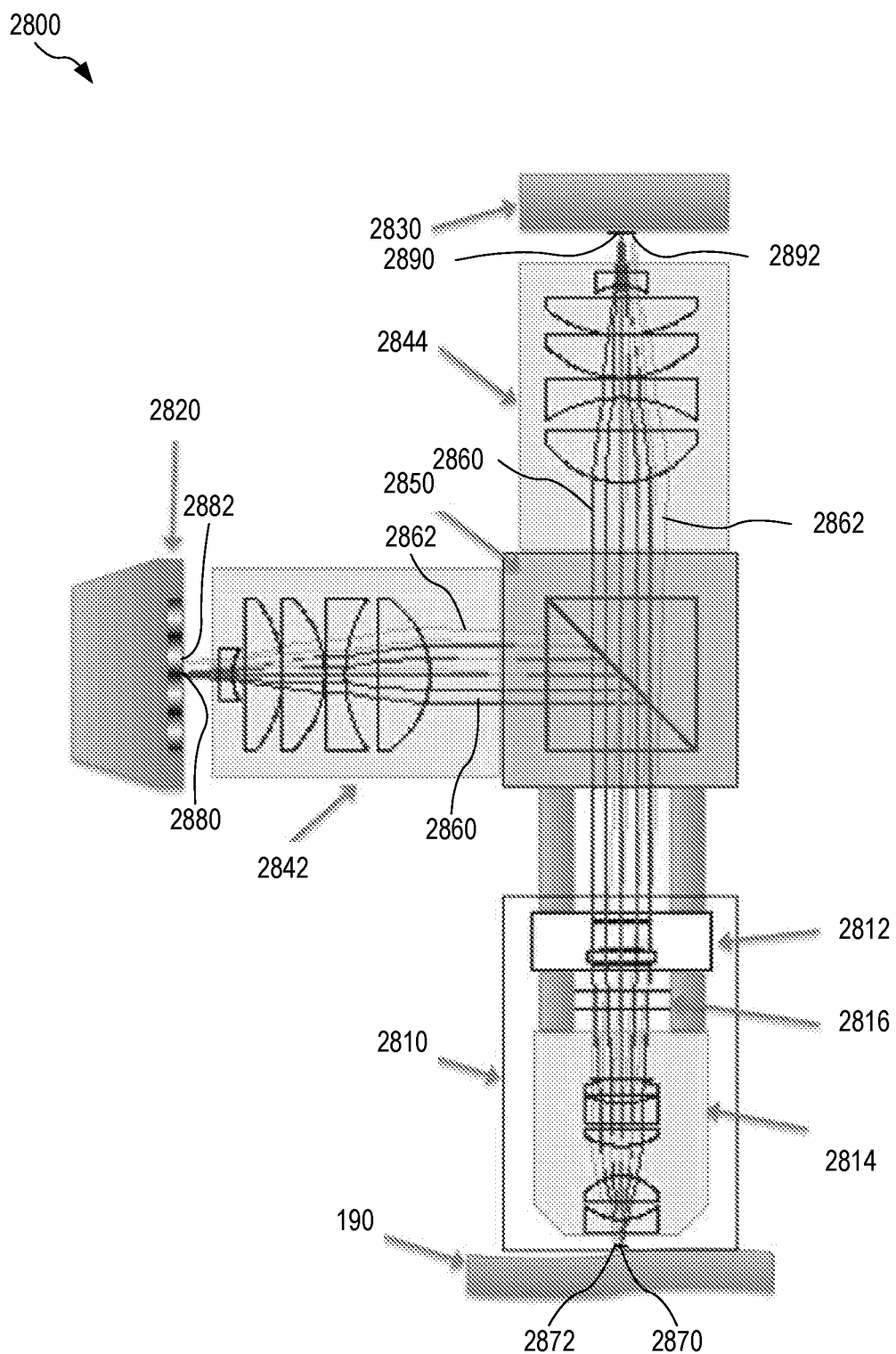
FIG. 28 shows an infinity-corrected EDOF microscope, according to an embodiment.

FIG. 28 shows one exemplary infinity-corrected EDOF microscope 2800. EDOF microscope 2800 is an embodiment of EDOF microscope 200 and implements an embodiment of each of tunable lens 212 and fixed focal-length lens 214. EDOF microscope 2800 includes an infinity-corrected object-space telecentric varifocal microscope objective 2810, a microdisplay 2820, an image sensor 2830, a polarizing beamsplitter cube 2850, an infinity-corrected projection lens assembly 2842, and an infinity-corrected imaging lens assembly 2844.

Microscope objective 2810 is an embodiment of microscope objective 210 and includes an electrically tunable liquid-filled lens 2812 (an embodiment of tunable lens 212) and a custom designed fixed focal-length lens assembly 2814 (an embodiment of focal-length lens assembly 214). The custom design of lens assembly 2814 allows for placement of lens 2812 approximately at the back focus of lens assembly 2814, which is generally not possible using off-the-shelf lens assemblies. Microscope objective 2810 also includes a quarter-wave plate 2816 positioned between lens 2812 and lens assembly 2814. As light passes through quarter-wave plate 2816 twice, first toward sample 190 and then away from sample 190, quarter-wave plate 2816 rotates the polarization of the light by 90 degrees. Consequently, polarizing beamsplitter cube 2850 (an embodiment of beamsplitter 250) transmits light from sample 190 toward image sensor 130, rather than reflecting such light back toward microdisplay 2820 (an embodiment of structured illumination source 120). In addition, polarizing beamsplitter cube 2850 and quarter-wave plate 2816 cooperate to suppress detection by image sensor 130 of structured illumination reflected directly off of surfaces of tunable lens 2812 or a housing associated therewith. It is understood that imperfections may exist, which may cause some light from sample 190 to escape detection by image sensor 130, for example if sample 190 itself imposes a polarization rotation.

Although not shown in FIG. 28, microdisplay 2820 may be moveable, for example as discussed in reference to FIGS. 6 and 7.

Projection lens assembly 2842 is an embodiment of projection lens assembly 242. Imaging lens assembly 2844 is an embodiment of imaging lens assembly 244. Projection lens assembly 2842 and imaging lens assembly 2844 are identical for the same reasons as discussed above in reference to FIG. 2.

FIG. 28 further illustrates light propagation through EDOF microscope 2800. A bundle of rays 2860 propagate from an on-axis position 2880 of microdisplay 2820 to an on-axis position 2870 of sample 190 and then to an on-axis position 2890 on image sensor 2830. A bundle of rays 2862 propagate from an off-axis position 2882 of microdisplay 2822 to an off-axis position 2872 of sample 190 and then to an off-axis position 2892 on image sensor 2830.

In one implementation of EDOF microscope 2800, suitable for EDOF microdeflectometro according to method 1300 to determine the slope variation of mini-aperture optics such as a cellphone lens, the diameter of the object-space field of view is 2 mm and the numerical aperture is 0.24 NA. In this implementation, image sensor 2830 is a ⅓" CCD sensor (DR2-13S2C-CS, Point Grey Research) with resolution of 1280×960 pixels and a pixel size of 3.75 μm, which affords a spatial resolution of 2.12 μm in object space. Also in this implementation, microdisplay 2820 is an organic light-emitting diode (OLED) microdisplay (SVGA OLED-XL, eMagin), with resolution of 800×600 pixels and a pixel pitch of 15 μm. To minimize the potential effect of chromatic aberration as lens 2812 changes its shape, microdisplay 2820 may be operated at a monochromatic working wavelength at 550 nm by lighting only the green pixels of microdisplay 2820.

To achieve system requirement as well as the strict telecentricity through the focus scanning range, the compact system was designed through a serious of consideration described in the following paragraphs.

Example III: Infinity-Corrected Object-Space Telecentric Varifocal Microscope Objective with Electrically Tunable Liquid-Filled Lens FIG. 29 shows one exemplary infinity-corrected object-space telecentric varifocal microscope objective 2900. Microscope objective 2900 is an embodiment of microscope objective 2810. Microscope objective 2900 includes an electrically tunable liquid-filled lens (ETL) 2906, a custom designed fixed-focal length objective (FFLO) 2908 based on stock lenses, and a quarter-wave plate (QWP) 2960. ETL 2906 is an embodiment of lens 2812, FFLO 2908 is an embodiment of lens assembly 2814, and QWP 2960 is an embodiment of quarter-wave plate 2816. Microscope objective 2900 has been designed based upon a series of considerations discussed in the following. It is understood that microscope objectives and EDOF microscopes and methods discussed in the present disclosure are not limited by the theoretical aspects discussed in this Example.

For retaining system magnifications while performing depth scanning, ETL 2908 is required to be placed at the system stop, so that system chief rays would not be refracted by ETL 2908 as it changes its focus and would remain parallel to the optical axis. That is, the clear aperture of ETL 2908 serves as the exit pupil of microscope objective 2900, which diameter limits the numerical aperture given by NA=sin(tan$^{-1}$(0.5*D$_{ETL}$/F$_{obj}$)), wherein F$_{obj}$ is the effective focal length of FFLO 2908, and D$_{ETL}$ is the diameter of the clear aperture of ETL 2908, which is 10 mm, the largest aperture among the commercial alternatives. The design goal of this Example is to satisfy system requirement of numerical aperture with an optimized performance while releasing enough back focal distance for placing the thick barrel of ETL 2908 and QWP 2960.

Ideally, the rear nodal point of ETL 2908 should be overlapped with the rear focus of FFLO 2908. However, the cardinal points would be shifted accordingly as the ETL 2908 changed its shape in fact. Therefore practically the distance between FFLO 2908 and ETL 2908 was optimized for minimizing the change of the chief ray angle within the depth scanning range determined by raytracying. The clear aperture of ETL 2908 at the rear surface was chosen to be the system stop since the reverse ray coming from the associated image sensor, (e.g., image sensor 130) confined system field of view in object space.

Because the working distance was compromised with the released back focal distance, the available depth scanning range was then confined by the minimum optical power of ETL 2908 (far focus), and the least thickness for the lens barrel of FFLO 2908. The overall design of FFLO 2908 and ETL 2908 was then strategically optimized for the mid plane within the focus scanning range with the corresponding shape of ETL 2908. Though system resolution may be detector-limited since the corresponding optical cutoff frequency of microscope objective 2900 is typically much greater than the Nyquist frequency of an associated image sensor 130, the optical design is still optimized to be nearly diffraction-limited for obtaining the optimal signal-to-noise ratio that drives highest testing sensitivity in the measurement.

Table 1 (below) lists a design specification of an embodiment of EDOF microscope 200 implementing an example of microscope objective 2900. The design specification of Table 1 utilizes stock lenses and off-the shelf lens barrels and barriers. The available focus scanning range is 2 mm, which is 125 times of the diffraction limited DOF.

TABLE 1

| Surface | Comment | Radius [mm] | Thickness [mm] | Material | Semi-Diameter [mm] |
|---|---|---|---|---|---|
| | Focusing plane | Infinity | 2.5000 | | 1.0000 |
| | Lens barrel | Infinity | 0.0000 | | 1.6457 |
| 2912 | 47905 | Infinity | 2.2000 | N-SF11 | 6.0000 |
| 2914 | | 9.420 | 2.9198 | | 5.7000 |
| 2922 | 47330 | Infinity | 4.5000 | N-BK7 | 6.0000 |
| 2924 | | −7.750 | 5.0446 | | 6.0000 |
| 2932 | 47332 | 12.420 | 2.8000 | N-BK7 | 6.0000 |
| 2934 | | Infinity | 1.0000 | | 6.0000 |
| 2942 | 48343 | Infinity | 3.5000 | N-SF11 | 6.0000 |
| 2944 | | 14.120 | 1.2016 | | 5.7000 |
| 2952 | 47333 | Infinity | 3.0000 | N-BK7 | 6.0000 |
| 2954 | | −15.500 | 11.8000 | | 6.0000 |
| | QWP | Infinity | 3.2000 | N-BK7 | 12.5000 |
| | | Infinity | −15.0000 | | 12.5000 |
| | | Infinity | 21.4000 | | 5.2357 |
| | | Infinity | −2.9885 | | 5.0000 |
| 2902 | ETL housing | Infinity | 1.1000 | | 15.0000 |
| 2970 | Front cover glass | Infinity | 0.5000 | N-BK7 | 5.0000 |
| 2982 | Adaptive surface (EL-10-30, Optotune) | Infinity | 1.9818 | OL1024_UV_VIS_NIR | 5.0000 |
| 2984 | | −32.787 | 4.4182 | | 5.6000 |
| 2990 | Back cover glass | Infinity | 0.5000 | N-BK7 | 5.0000 |
| 2904 | ETL housing | Infinity | 1.1000 | | 5.0000 |
| | Enter beamsplitter cube | Infinity | 26.5000 | | 15.0000 |
| | Beam splitting interface | Infinity | 25.4000 | N-SF1 | 12.7000 |
| | Exit beamsplitter cube | Infinity | 12.7840 | | 12.7000 |
| | LA1805A (start imaging lens assembly 2844) | 15.500 | 8.6000 | N-BK7 | 12.7000 |
| | | Infinity | 5.7460 | | 12.7000 |
| | LC2679A | −23.400 | 3.5000 | N-SF11 | 12.7000 |
| | | Infinity | 0.0000 | | 12.7000 |
| | LA1027A | 18.000 | 7.2000 | N-BK7 | 12.7000 |
| | | Infinity | 0.0000 | | 12.7000 |
| | LA1422A | 20.600 | 6.4000 | N-BK7 | 12.7000 |
| | | Infinity | 2.0340 | | 12.7000 |
| | 48342 | −9.420 | 2.2500 | N-SF11 | 4.2000 |
| | Lens barrel (end imaging lens assembly 2844) | Infinity | 7.2732 | | 4.5000 |
| | Imaging plane | Infinity | 0.0000 | | 2.0769 |

FIG. 30 shows the modulation transfer functions (MTF) corresponding to the far focus (3030), the mid focus (3020), and the near focus (3030) of the optical system. At center fields, optical performances are close to diffraction limit, while at the full fields, the performances are more degraded at the far focus and the near focus than one at the mid focus. The degradations were mainly coming from field curvature, which will be corrected via focus extraction processing determined by SIM.

The strict telecentricity ensures constant optical magnifications of both the fringe image and camera detection during focus scanning. When the focal length of ETL 2906 was changed, both the fringe image and camera focus would be shifted simultaneously. The amount of focus shift, s, is proportional to the optical power change $\Delta\phi_{var}$ of ETL 2906, and is given by $s = n \cdot f_{obj}^2 \cdot \Delta\phi_{var}$, wherein n is the refractive index in the object space and $f_{obj}$ is the effective focal length of FFLO 2908. The focus shift is independent from the marginal ray focus. Thus, in a microdeflectrometry application, such as when performing method 1300, the distance, d, between the fringe image and the camera focus depths is fixed during measurements at different depths.

FIGS. 31A and 31B show the percentile variation of the system magnification and distance d in the microdeflectometric setup, respectively, in relation to the relative focusing depth. To experimentally determine the magnification of system, we captured the image of a bar resolution target and fit intensity cross profile with a sinusoidal function to find the corresponding fringe period with sub-pixel accuracy. By displacing the target axially via a translation stage and finding the highest contrast image via optical depth scanning, the variation of system magnification as a function of focusing depth was measured, and it can be assumed as a linear response with the fitted slope as shown in FIG. 31A. For instance, the amount of magnification change corresponding to a 250 µm depth range was demonstrated to be 0.1%, which is barely perceivable for the image with a dimension of 1000 pixel. To measure the distance d between the aerial fringe image and camera focus depth, we firstly ensured that camera was focusing on a reference mirror placed in front of the objective, and then displaced the mirror toward objective via a translation stage to find the maximum contrast of the displayed fringe. The traveling of the reference mirror was assumed to be half of the distance d. For different focusing depths driven by different applied currents, the variation of d was measured and is shown in FIG. 31B. Due to the limited resolution of our translation stage, our distance measurement has a relatively large uncertainty. Therefore we estimated the slow variation by considering a large depth range over 1200 µm. Again, for a 250 µm depth range, the amount of d variation was estimated to be 0.15%, which corresponds to a maximum slope error of 0.4 milliradian calculated by multiplying the maximum capturable slope of 0.24 that is still smaller than system slope sensitivity. Though the applicable EDOF range may vary depending on the requirement for precision measurement, we demonstrated our prototype system has a least 250 µm depth range with strict system constancy, which is about 15 times of the range comparing to the diffraction limited depth of field. The system slope sensitivity may be as small as 3.4 milliradians, corresponding to a surface height sensitivity of 7.21 mm calculated by multiplying current spatial resolution. Corresponding to the applied current resolution of 0.07 mA, the minimum focus scanning resolution is 1.98 µm, which is sufficiently smaller than the diffraction limited depth of field 8 µm. The response time for re-focusing to another depth could be as fast as 3 ms, which provides rapid focus scanning ability.

Example IV: EDOF Microdeflectometry Results

Figure 32:
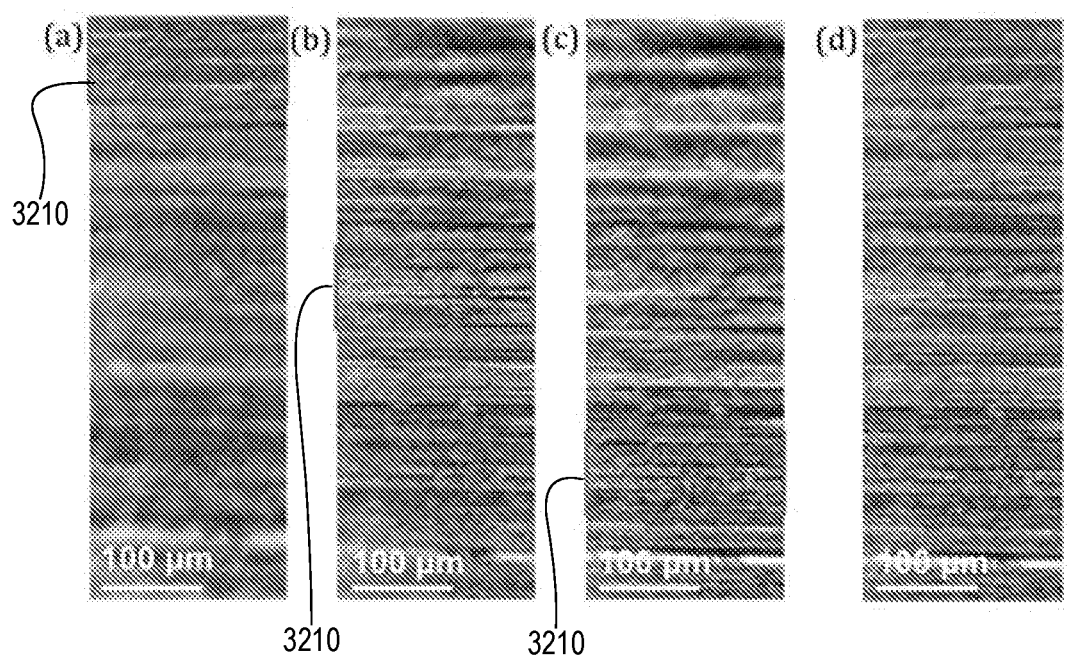
FIG. 32 show exemplary images associated with EDOF microdeflectometry according to an embodiment of the method of FIG. 13 and using an embodiment of the EDOF microscope of FIG. 28 with an embodiment of the microscope objective of FIG. 29.

FIGS. 32A-D show images associated with EDOF microdeflectometry according to an embodiment of method 1300 and using EDOF microscope 2800 with microscope objective 2900. FIGS. 32A-C are microdeflectometry images acquired with the limited depth of field of microscope objective 2900, where the slope maps in the vertical direction was focused on a top, middle, and bottom region, respectively, indicated by windows 3210. The focusing depths between FIGS. 32A and 32C were 150 µm, which is much larger than the diffraction limited DOF of microscope objective 2900. Defocusing blurring was clearly shown in most parts of these slope maps. With the rapid optical depth scanning capability and the assistance of SIM focusing probe, the focused data taken from different depths were efficiently extracted and combined together to form an EDOF slope map in the vertical direction as shown in FIG. 32D. The fine structures on the surface can then be clearly observed across the view in the image of FIG. 32D.

As the phase shifting technique was used to efficiently quantifying the slope variation according to fringe displacement, the absolute slope values were missing in microdeflectometry. Though the provided slope variation data were considered to be sufficient for investigating surface quality, the surface shape and the height of surface defect were also demanded and commonly used for presentation. The absolute slope values were then required for converting surface gradient into height via numerical integration. It is especially essential when the object under test was largely tilt and the heights of surface defects would be scaled improperly if the surface orientations were not considered.

Besides the use of the SIM measurements to obtain EDOF microdeflectometric measurements, the SIM technique provides absolute surface height measurement, which has complimentary information with the surface slopes obtained from micro-deflectometry. For a non-complex object under test such as a planar target or a rotationally symmetric surface, surface orientations could be easily acquired via a fitting, whereas for a complex object such as a largely varied freeform surface, SIM may provide sufficient reference points for accurately reconstructing the surface shape. Because of the limited NA of the objective and the display resolution sharing with the microdeflectometric system, a SIM system generally provides lower surface height sensitivity comparing to micro-deflectometry. For instance, the limited spatial resolution of 15 µm of the microdisplay used in EDOF microscope 2900 with microscope objective 2900 restricts a limited surface height sensitivity of 3.35 µm in SIM, which may be improved by choosing a costly microdisplay such as a Sony panel with a finer spatial resolution. Nevertheless, it still corresponds a minimum global orientation resolution of 1.68 milliradian considering the maximum field of 2 mm that is sufficiently smaller than the local slope measuring uncertainty in the microdeflectometric setup. Therefore, we acquired the fitted trends of the surface shape obtained from the SIM measurements, which were utilized to substitute the slope maps in microdeflectometry as the mean values for reconstructing an unknown surface shape. As we will demonstrate by the examples, the reconstruction is valid for non-complex objects with low global errors.

Figure 33:
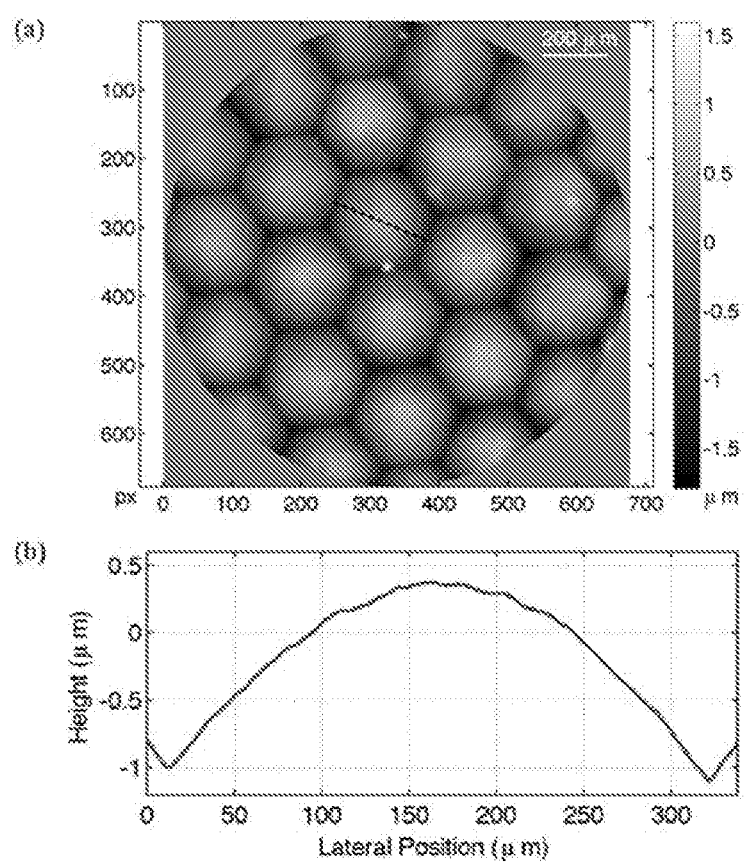
FIGS. 33A and 33B show microdeflectometry results for a microlens array, obtained through EDOF microdeflectometry according to an embodiment of the method of FIG. 13 and using an embodiment of the EDOF microscope of FIG. 28 with an embodiment of the microscope objective of FIG. 29.

FIGS. 33A and 33B show microdeflectometry results for a microlens array, obtained through EDOF microdeflectometry according to an embodiment of method 1300 and using EDOF microscope 2800 with microscope objective 2900. FIG. 33A shows the measured surface height map for a microlens array reconstructed from microdeflectometric data. Though the surface of the microlens array does not have structured details to help the microscope focus, in FIG. 33A the clear hexagonal shapes of the microlenses demonstrated the success of the SIM probe to acquire the focused micro-deflectometric data. FIG. 33B shows the center height profile of a microlens chosen in FIG. 33A. Submicron surface defects can be observed from the non-smooth curve. The measured sag from the edge to top is about 1.4 µm.

From the limited specifications available from the vendor of this microlens array, the microlens has a focal length of 18 mm and a pitch of 300 µm. If assuming the refractive index to be 1.46 (Fused Silica) to 1.51 (BK7), the sag can be calculated to be between 1.25 to 1.5 µm, which is consistent with the measurement. It is also worth to mention the microlens array only has a 500 µm thickness, and the microdeflectometry was sufficient to avoid the influence from back reflection due to the shallow depth of field.

Figure 34:
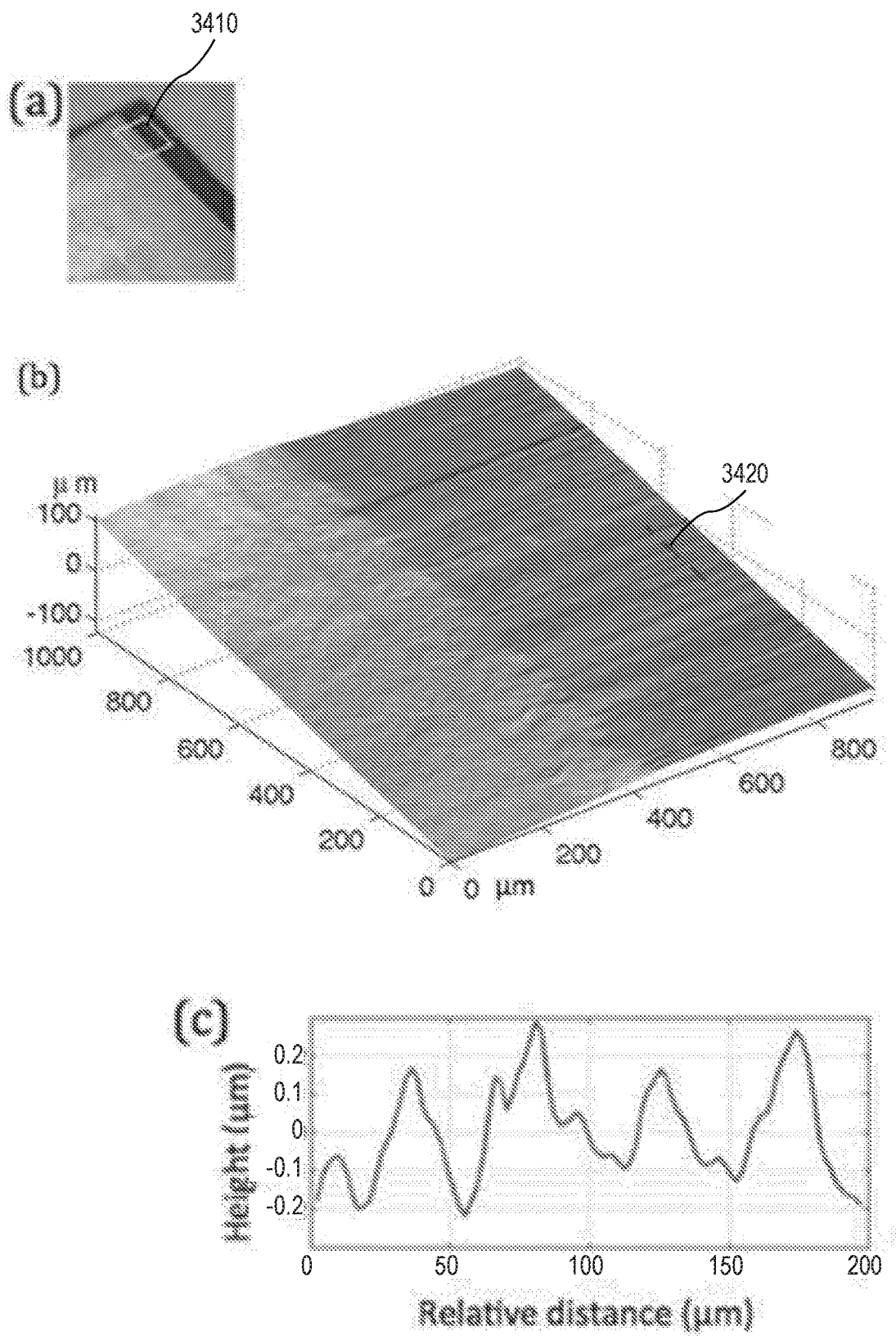
FIGS. 34A-C demonstrate, by example, the capability of surface shape reconstruction from the EDOF microdeflectometric measurement, according to an embodiment of the method of FIG. 13 and using an embodiment of the EDOF microscope of FIG. 28 implementing an embodiment of the microscope objective of FIG. 29, with the surface orientations provided by SIM measurements.

FIGS. 34A-C demonstrate the capability of 3D shape reconstruction from the EDOF microdeflectometric measurement with the surface orientations provided by the SIM measurements. FIGS. 34A-C are based upon EDOF microdeflectometry according to an embodiment of method 1300 and using EDOF microscope 2800 with microscope objective 2900. FIG. 34A shows the picture of a razor blade, which was largely tilted under test. FIG. 34B shows the 3D shaded surface plot of the region indicated by the white box (3410) in FIG. 34A. The observation includes the knife bevel (on the left) and the edge (on the right) separated by the centering grind line. The surface was plotted using lighting effect to express surface quality. FIG. 34B presents the consistent surface roughness measured by microdeflectometry through a depth range close to 250 µm. Within the largely tilted surface, FIG. 34C shows the cross profile of the region marked by the black dash line (3420) in FIG. 34B after removing the linear trend, where the tool marks with an averaged height of 0.4 µm and an approximate period of 50 µm were exposed on the knife edge. It demonstrated the fine surface height resolution over a largely extended depth range. For global shape reconstruction, microdeflectometry measures a 0.05 rad angle between the knife bevel and edge, and the SIM probe measures a 0.2 rad tilt angle for the knife. The maximum global height reconstruction error calculated from the difference of the maximum depth extension within the measured field of view between the results from SIM and microdeflectometry is 8.99 µm, which is below 4% of the observing depth. It demonstrated the sufficient accuracy of shape reconstruction with surface orientations provided from SIM.

Figure 35:
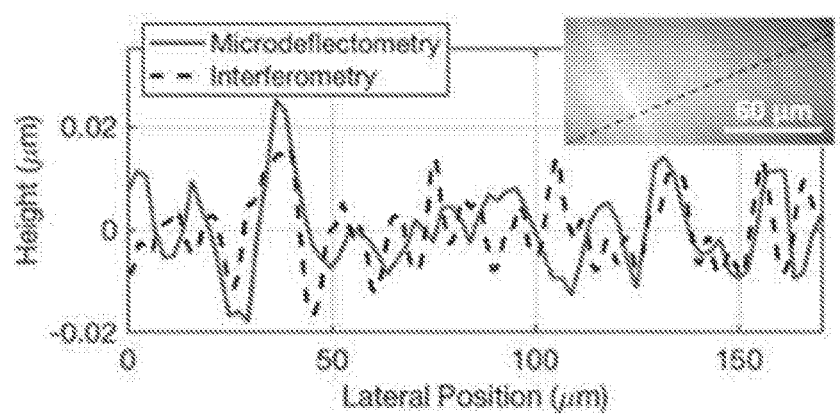
FIG. 35 shows exemplary EDOF microdeflectrometry and conventional interferometry results for a diamond turned microlens, wherein the microdeflectrometry results are obtained via an embodiment of the method of FIG. 13 and using an embodiment of the EDOF microscope of FIG. 28 implementing an embodiment of the microscope objective of FIG. 29.

FIG. 35 shows microdeflectrometry and interferometry results for a diamond turned microlens. FIG. 35 demonstrates the measuring sensitivity of our system by picking up the tool marks on a diamond turned microlens surface. FIG. 35 is based upon EDOF microdeflectometry according to an embodiment of method 1300 and using EDOF microscope 2800 with microscope objective 2900. The cross profile of the region marked by the black dashed line on the surface height map, shown as an inset at the top-right corner of the graph, is comparable with the validatory data measured by interferometry (Zygo Surface Profiler) that determined the tool marks with the magnitude within ±10 nm. The magnification of the microscopic system used in the interferometer is 2.6 times of the microscope system in our system, thus the interferometer resolves finer structures of surface defects but compromises with 0.42 times FOV comparing to our microscope.

Figure 36:
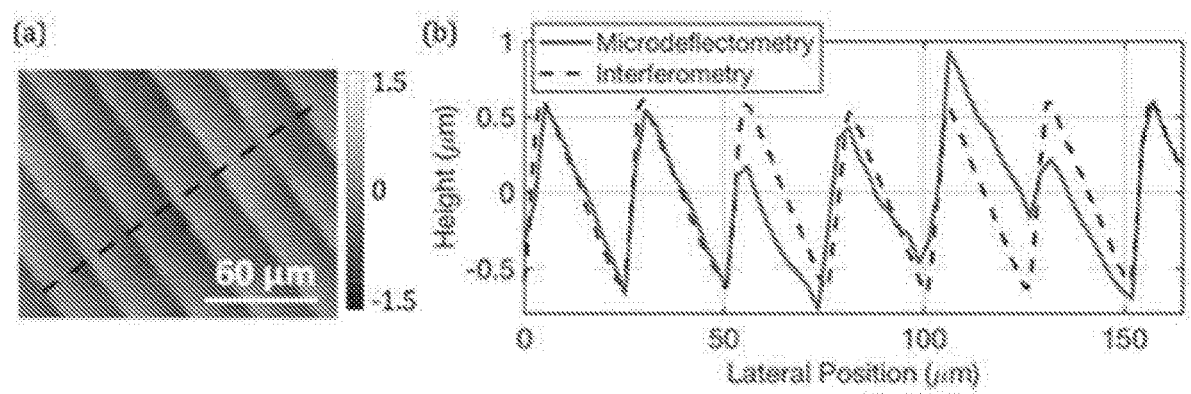
FIGS. 36A and 36B show exemplary microdeflectrometry and conventional interferometry results for a blazed grating on a transparent plastic substrate, wherein the microdeflectrometry results are obtained via an embodiment of the method of FIG. 13 and using an embodiment of the EDOF microscope of FIG. 28 implementing an embodiment of the microscope objective of FIG. 29.

FIGS. 36A and 36B show microdeflectometry and interferometry results for a blazed grating on a transparent plastic substrate. FIGS. 36A and 36B validates the success of the surface reconstruction by the measurement of a blazed grating on a transparent plastic substrate. The SIM probe enforced the microdeflectometric system to focus on the transparent surface and ensured the surface normal of the grating substrate being parallel to the optical axis of the portable microscope. Thus the measured microdeflectometric slope maps should have mean values equivalent to zeros, which determines the absolute slopes for reconstructing the surface height map as shown in FIG. 36A via numerical integration. FIG. 36B shows the cross profile of the measured blazed grating marked in FIG. 36A as well as the validatory profile of the same grating taken from interferometry, where the heights and angles of the reconstructed structures were confirmed with the direct surface height measurement. The central structures were slowly departed from the average due to the periodic errors occurring on the slope maps. Carefully calibrating the sinusoidal profile of the illuminating fringe pattern or averaging the slope maps from a set of measurements with different rotated fringe angles should effectively reduce this periodic error that was resulted from the inaccurate phase shift in the phase stepping process.

Example V: Experimental Demonstration of EDOF SIM

We experimentally verified the properties of EDOF SIM according to an embodiment of method 2100 and using a prototype microscope system similar to that used in Example IV. The prototype system has a constant 2-mm diameter field of view with 0.25 NA. The illumination path utilizes an organic light-emitting diode (OLED) microdisplay with a pixel size of 8 µm to create a narrow-band illumination pattern with a working wavelength centered at 530 nm by only turning on the green pixels of the microdisplay. By displaying either a uniform grey scale image or fringe patterns on the microdisplay of the setup, the system configuration can readily adapted to perform both conventional uniform illumination and SIM for comparisons. Furthermore, the system can also be readily configured to switch between the modes of conventional microscopic imaging and SSFS by simply fixing the focus or turning on focus scanning. By projecting fringe patterns with the equivalent frequency of 73 lp/mm in the object space and taking the captured images through the simple demodulation processing discussed above in reference to step 2140 of method 2100, our system obtained optimal SIM imaging quality balanced between contrast and periodic errors coming from the nonlinearity of sinusoidal intensity distribution. Experimental results presented in this section were obtained under the described conditions. The experimental demonstrations mainly contain high spatial frequency structures, which were particularly required to be observed within an EDOF as well as retain imaging quality. As those high spatial frequency structures generally have low contrast, they were satisfied with the assumption of the weak object discussed above in Example I and thus can be used for validating the theoretical analysis of imaging properties presented above in Example I.

Acquisition Speed:

Although the focus-scanning rate of the ETL can be driven over several hundreds of Hz easily, the practical exposure time of the SSFS system is extended in order to capture sufficient amount of light. Because of the limited luminance of the OLED light source (below 200 $cd/m^2$) utilized in our prototype, images were taken with an exposure time depending on the reflectivity of the testing sample. For example, when imaging a high-reflectivity target as shown in FIGS. 38A-F, the shutter speed of 8 Hz and the equivalent focus-scanning rate were chosen, whereas when directly imaging a leaf as shown in FIG. 37A-E, a shutter speed of 2 Hz was required for clearly investigating the bio-structures. We believe a much brighter light source such as laser used in currently available SIM setups may largely improve the image acquisition rate.

Another concern is the additional image acquisition time for the SIM-SSFS method from the conventional SSFS technique, as it requires at least two additional images for demodulation. However, the overall acquisition speed is still comparable between the two methods because of the time-saving through the simpler demodulation post-processing in SIM-SSFS than the deconvolution in SSFS. For example, the post-processing time of the 960×1280 pixels images in our experiments is largely reduced from the calculation time of 369 ms via deconvolution to 13 ms via the simple square-law demodulation calculation, discussed above in reference to step 2140 of method 1400, using a 2.9 Ghz Core i5 CPU and 8 GB Hz RAM. Accounting for the loading time for the acquired images taken with 8 Hz speed, the average image time after all processing of the SIM-SSFS method is 508 ms, whereas that of the conventional SSFS technique is 485 ms. The acquisition speed of the SIM-SSFS could be potentially faster if a brighter light source, such as a laser, was used.

Figure 37:
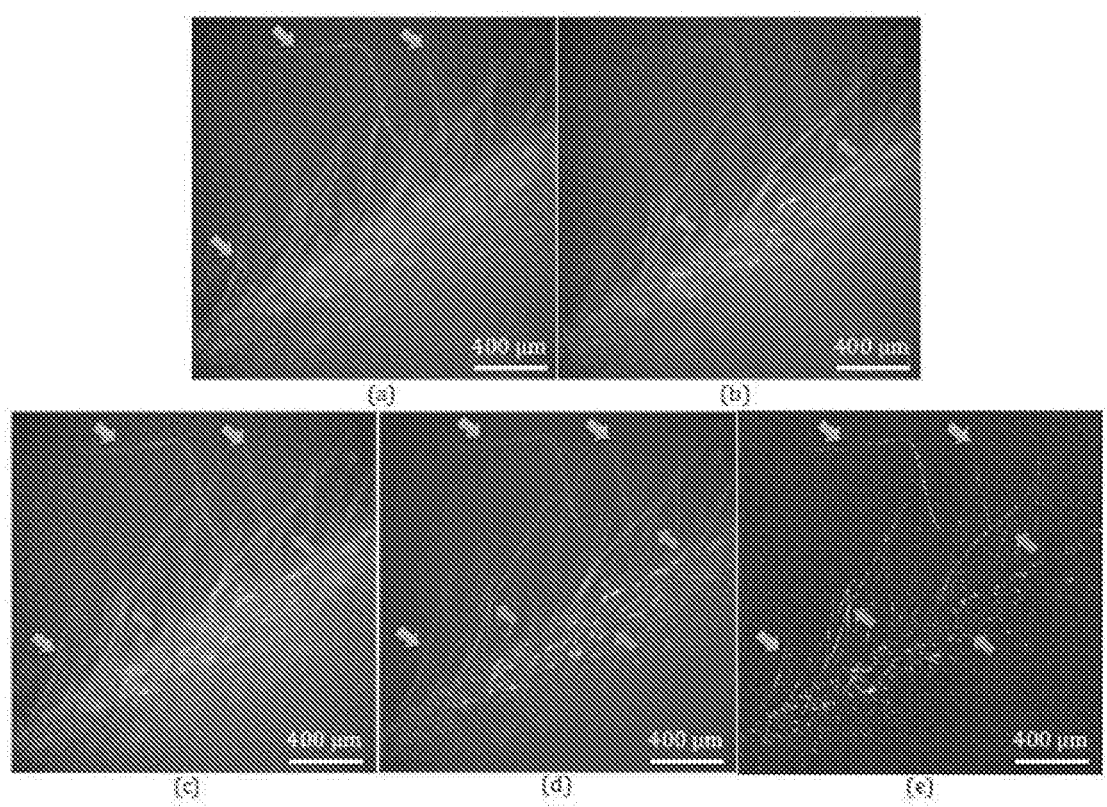
FIGS. 37A-E show exemplary EDOF SIM images and conventional fixed focus images of leaf furs of a leaf, wherein the EDOF SIM images are obtained via an embodiment of the method of FIG. 21 and using an embodiment of the EDOF microscope of FIG. 28 implementing an embodiment of the microscope objective of FIG. 29.

EDOF Capability and Imaging Quality:

FIGS. 37A-E show EDOF SIM images and conventional fixed focus images of leaf furs of a leaf. FIGS. 37A and 37B show the conventional fixed-focus microscopic image obtained under uniform illumination at deeper and closer focusing depths, respectively, where the blue (pointing down and right) and red (pointing up and left) pointers indicated the focused structures corresponding to the two depths. The focusing shift between the two images is about 500 μm. FIGS. 37C-E show the SSFS images with the scanning range of 600 μm. FIG. 37C is the acquired image through the conventional uniformly illuminated SSFS method. Although it looks blurry, the structures indicated by the blue (pointing down and right) and red (pointing up and left) pointers were observable. After applying Wiener deconvolution filter with a representative OTF simulated according to the operated scanning range and a chosen noise-to-signal ratio (NSR), the restored image that removes the blurry effect on FIG. 37C was shown in FIG. 37D. FIG. 37E presented the SIM-SSFS EDOF image, generated by step 2140 of an embodiment of method 2100, that also has all pointed structures clearly shown in the scene, which demonstrated the EDOF capability through the deconvolution-free method. Comparing to the conventional SSFS EDOF image in FIG. 37D that perceives information within a wider depth range because of the observation of the out-of-focus light, the demodulated SIM-SSFS image removes the out-of-focus structures and the haze in the background, which can be considered to perform better quality for in-vivo observation. It is also worth noting that except rejecting the out-of-focus haze, some low frequency structures were missed on the SIM-SSFS image shown in FIG. 37E. For example, the furs appear discrete, while they appear more continuous on the other images under uniform illumination. This is because some conjunction structures have relative lower reflectivity than the discrete cell structures highlighted in FIG. 37E but can still diffract and transmit the lights coming from the adjacent planes. These secondary reflective lights are not well phase-determined by SIM and thus were depressed after demodulation of the set of images illuminated by phase shifted patterns. Any structures that may have over saturated illumination or could not be phase determined will also be missing through SIM, which should be aware in the implementation.

Figure 38:
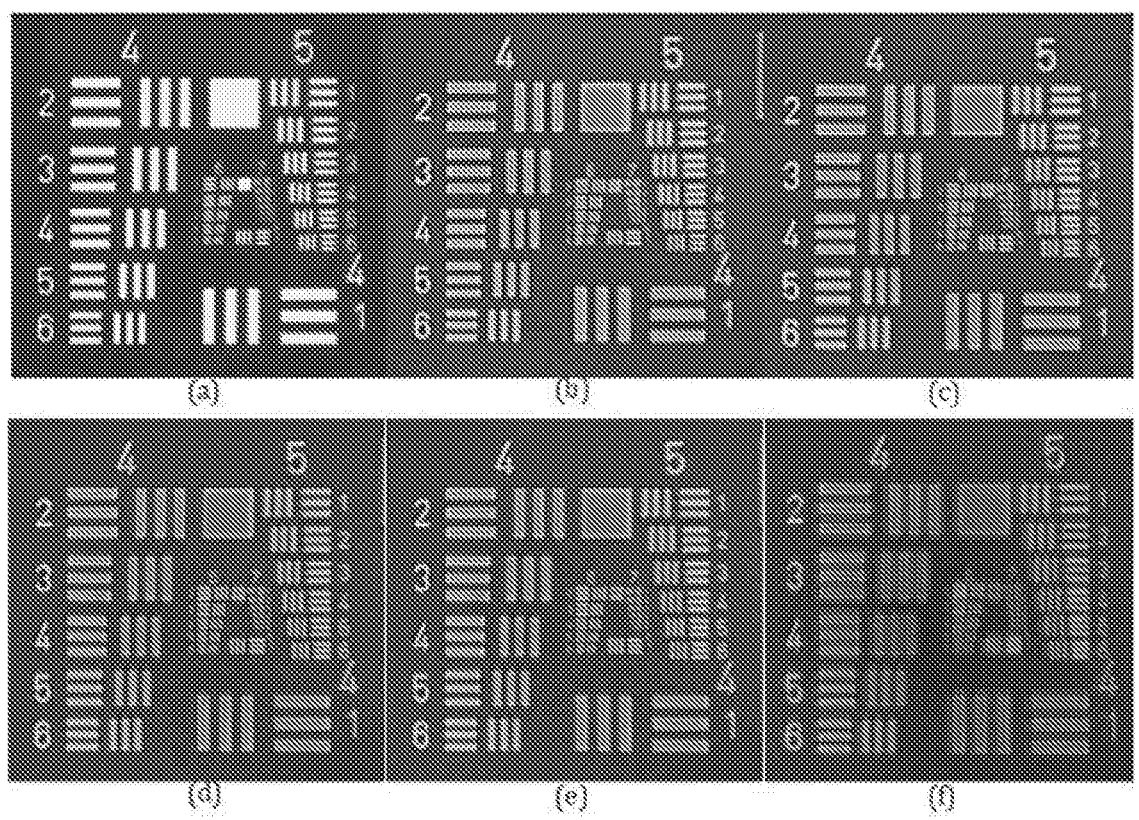
FIGS. 38A-F are exemplary images of a United States Air Force resolution target.

We experimentally demonstrated the quality and the axial imaging properties of the SIM-SSFS method (an embodiment of method 2100) by analyzing the zoom-in images of a USAF resolution target. Although the resolution target is essentially a 2D object, by placing it at different axial positions, the projection imaging performance of a 3D object on the EDOF image can be quantified and compared with the conventional in-focused image and SSFS EDOF images. FIG. 38A shows the uniformly illuminated in-focused image of the target placed at the fixed focusing plane with the best overall image contrast. FIG. 38B-F show the demodulated SIM-SSFS images (generated by an embodiment of step 2142 of method 2100) of the target placed at the mid-plane of the 200 μm scanning range, and the equally spaced axial positions corresponding to ¼, ½, ¾, and 1 of the half-scanning range from the mid-plane, respectively. Since the axial property of the SSFS image is symmetric about the mid-plane of the focus scanning range, the sampled axial positions represented the SIM-SSFS image quality within the half of full EDOF range from mid-plane to one of the scanning edges. The SIM-SSFS images were sharp and visually consistent for the axial positions within at least ±¾ of the scanning range as shown in FIGS. 38B-E, whereas the image at the edge of the scanning range shown in FIG. 38F appeared dimmer than the others, which confirms the predicted axial properties discussed above in Example I in reference to FIG. 26.

Figure 39:
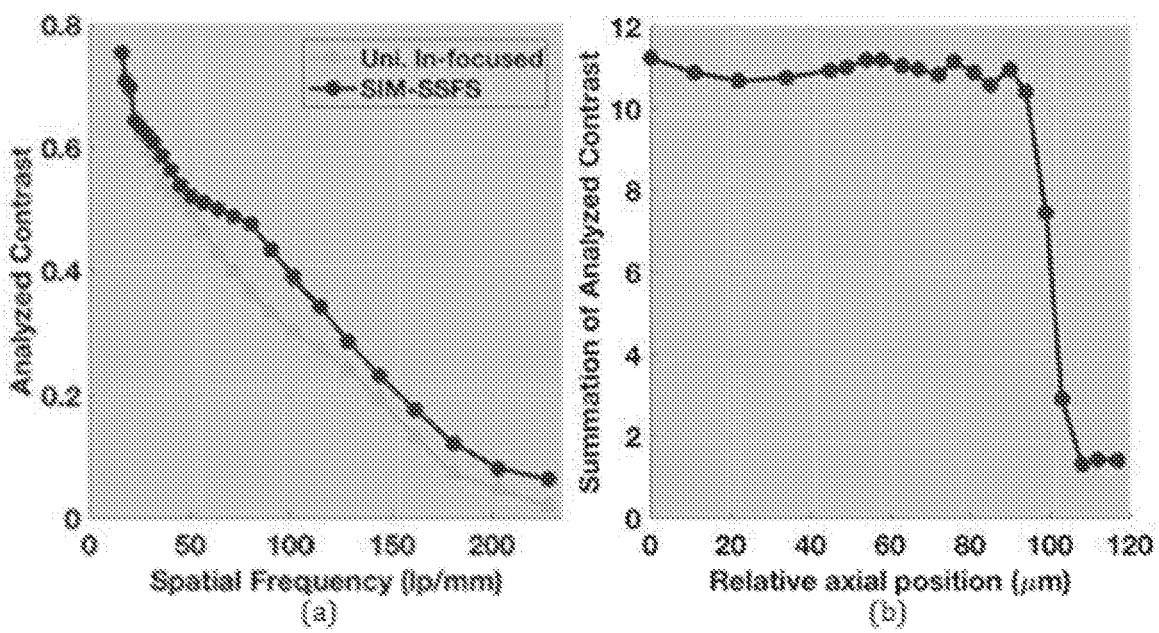
FIGS. 39A and 39B show exemplary contrast data for images of FIGS. 38A-F.
Figure 40:
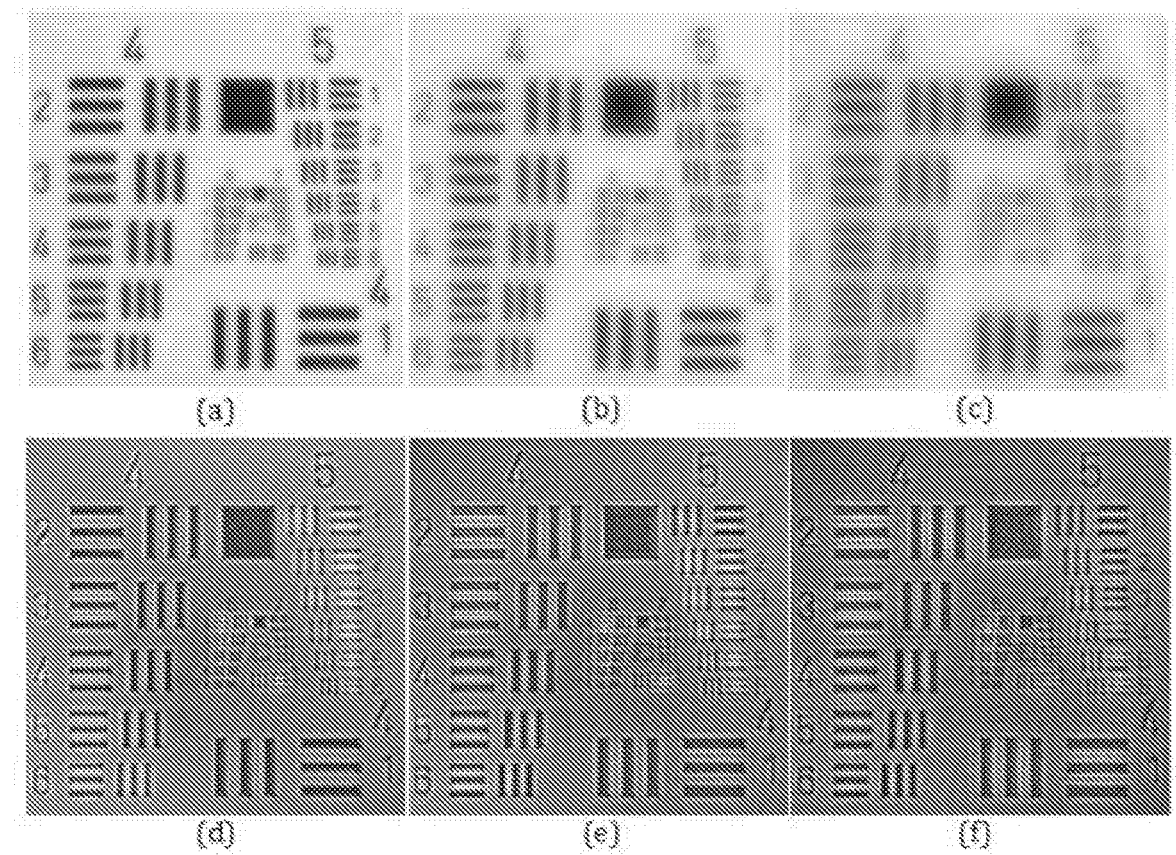
FIGS. 40A-F are exemplary images of a USAF resolution target illustrating the effect of increasing EDOF range in an embodiment of the method of FIG. 21 and using an embodiment of the EDOF microscope of FIG. 28 implementing an embodiment of the microscope objective of FIG. 29.
Figure 41:
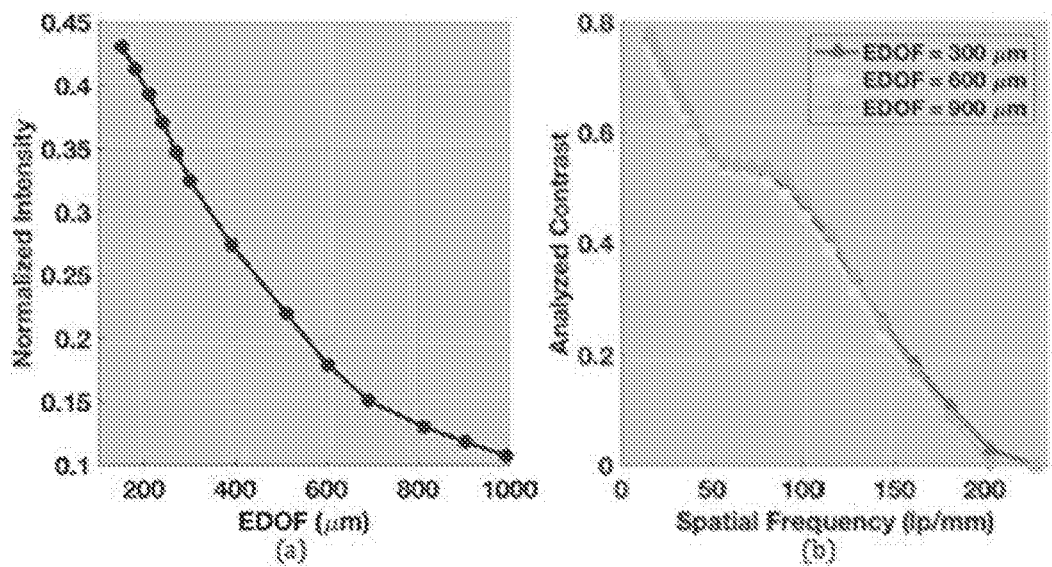
FIGS. 41A and 41B show exemplary intensity and contrast data for images of FIGS. 40A-F.

To quantitatively compare the image quality, we analyzed the contrast value of the imaged resolution target by fitting the central raw profile of each element with a sinusoidal curve. The averaged contrast value from the horizontal and vertical elements was taken for representation at each spatial frequency. FIG. 39A shows the analyzed contrast curves of the in-focused image shown in FIG. 38A and the representative SIM-SSFS image shown in FIG. 38B, respectively. Although the target on the SIM-SSFS image appears dimmer than that on the conventional in-focus image as shown in FIGS. 38A-F, the analyzed contrast values (following the upper curve) are always higher and slightly enhanced near the frequency of the projecting fringe in FIG. 39A. This demonstrates the quality of the SIM-SSFS image is comparable with that of the conventional in-focused image without the need of applying deconvolution processing. By taking the summation of the analyzed contrast values on the image of the target placed at different axial positions with the relative distances from the mid-plane of the scanning range, FIG. 39B demonstrates the axial imaging properties of the SIM-SSFS method. The quality of the SIM-SSFS shown in FIGS. 38A-F were quantified at the relative axial positions of 0, 25, 50, 75, and 100 μm in FIG. 39B, respectively. It shows the comparable quality is nearly invariant at center region of the scanning range until a rapid drop occurs near the scanning edge at the relative axial position of 100 μm, and then the quantified quality drops to its half-maximum at the scanning edge. These results confirm the expected EDOF range, which is equivalent to ±half-scanning range (±100 μm), or its full EDOF range is equivalent to the scanning range Effects of Increasing EDOF Range on Image Quality:

FIGS. 40A-F visually demonstrate the effect of increasing the EDOF range on the quality of the SSFS images that has been described in Example I. FIGS. 40A-C show the acquired images of the conventional SSFS technique for the scanning ranges of 300, 600, and 900 μm, respectively, while FIGS. 40D-F show the demodulated SIM-SSFS images (generated in an embodiment of step 2140 of method 2100) for the scanning ranges of 300, 600, and 900 μm, respectively. The resolution target with white background was used to better demonstrate the effect on the background, which corresponds the $MTF_{acc}$ value at zero frequency. FIGS. 40A-C show that the level of the background intensity is consistent on the conventional SSFS images, whereas it becomes darker along with more visible noise on the SIM-SSFS images as the scanning range increases. By taking the averaged intensities of the SIM-SSFS images of the positive background target with different operated scanning ranges, FIG. 41A shows the quantified signal strength is inversely proportional to the scanning range. As visually observable in FIGS. 40E and 40F, the demodulated SIM-SSFS images present highlighted artifacts adjacent to the edges of high spatial frequency elements in order to maintain the consistent contrast among the darker background. The effect gives bad visual appearance for the SIM-SSFS image with a large EDOF range. We suggest that using the SIM-SSFS method to image bright structures in a dark background is preferred, which can not only effectively remove the haze coming from out-of-focus light but also depress the presence of noise in the background.

Nevertheless, FIG. 41B shows the analyzed contrast curves for the target on the SIM-SSFS images shown in FIGS. 40D-F with the scanning ranges of 300, 600, and 900 μm, respectively, which demonstrates the contrast performance of the SIM-SSFS image is independent from the change of the operated scanning range. It confirmed the consistency of the normalized $MTF_{acc}$ in the SIM-SSFS system described in Example I that retains resolution, while the contrast of the target on the acquired images of the conventional SSFS system from FIGS. 40A and 40B clearly becomes lower as the EDOF range increases. Although most of the low contrast structures on the acquired images of the conventional SSFS system should be restored through deconvolution process, the extremely low contrast of the high spatial frequency structure may not be picked up by camera sensitivity to be distinguished from the environmental noise, or the extremely low signal may be filtered by the noise-to-signal ratio (NSR) chosen in the Wiener filter, which will result unrestorable loss of information.

Comparing the result shown in FIG. 41B to that for a target with the dark background shown in FIG. 39A, the contrast curves in FIG. 41B have lower values at high spatial frequencies above 200 lp/mm, especially for the large scanning ranges of 600 μm (yellow) and 900 μm (cyan), although most of the contrast values are comparable and both contrast values are slightly enhanced near the projecting fringe frequency. It showed the dimmer and noisier background image of the white background target with a large EDOF range would start to affect the fitting results of the intensity cross profiles of the elements at high spatial frequencies. This effect does not occur on the dark background image as will be demonstrated below.

Figure 42:
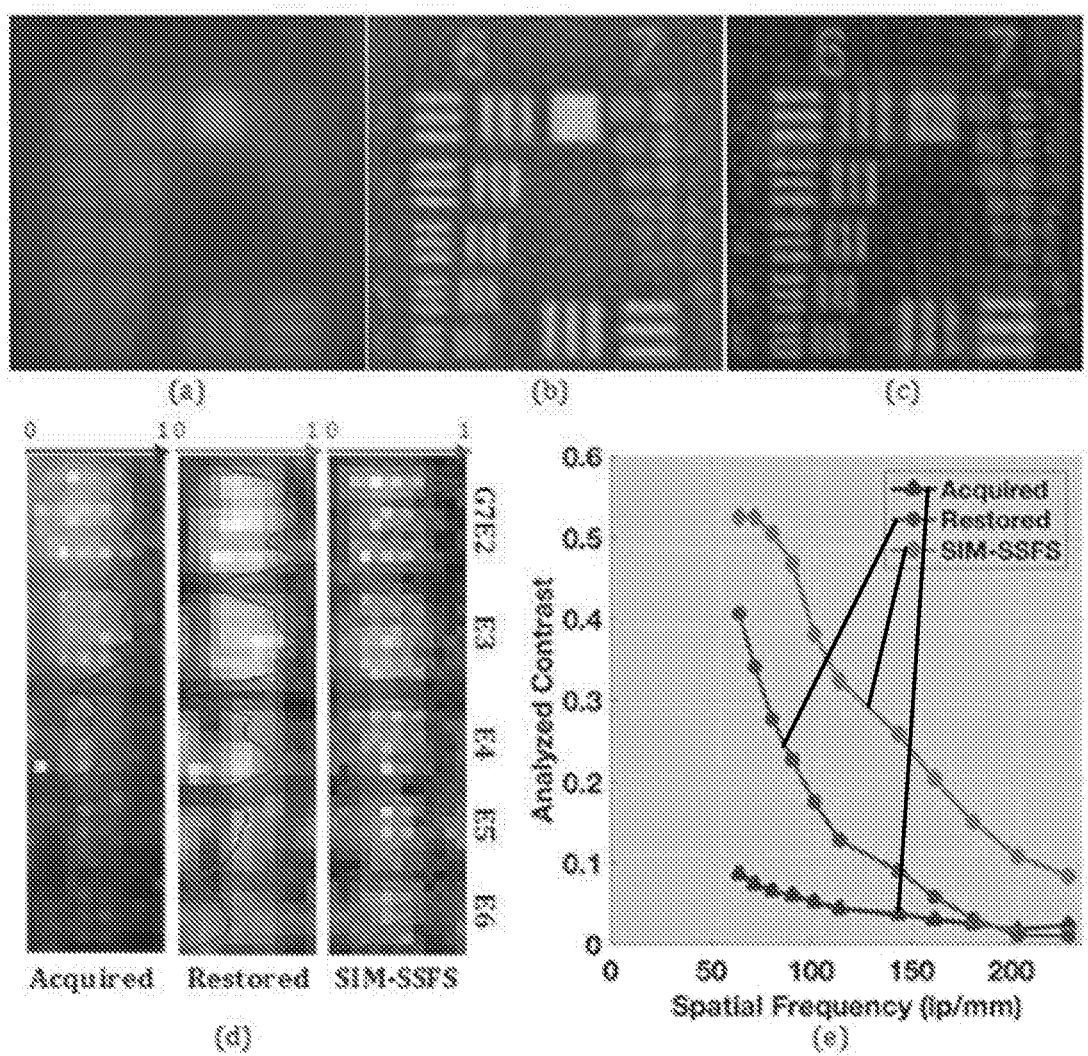
FIGS. 42A-E illustrate, by examples, a performance comparison of conventional single-shot focus-scanning and EDOF SIM according to an embodiment of the method of FIG. 21 and using an embodiment of the EDOF microscope of FIG. 28 implementing an embodiment of the microscope objective of FIG. 29.

FIGS. 42A-E demonstrate the advantage of retaining high resolution in the present SIM-SSFS system with a large scanning range of 900 μm, which corresponds to 56 times diffraction-limited DOF. FIGS. 42A and 42B show the zoom-in acquired and restored images of the high spatial frequency elements through conventional SSFS technique, respectively, and FIG. 42C shows the demodulated SIM-SSFS image of the same scene generated in an embodiment of step 2142. The acquired image of the conventional SSFS system appears to have lowest contrast with the large EDOF range, and the blurry scene was restored by the deconvolution Wiener filter with the chosen NSR that optimized the overall contrast of the scene. The SIM-SSFS image appears to be the dimmest due to the less captured intensity comparing to the conventional uniformly illuminated SSFS images. FIG. 42D shows the cropped images of the 5 highest frequency elements in the vertical direction (G7E2 to G7E6) from FIGS. 42A-C, as well as the intensity cross profiles obtained by taking average of the central 3 vertical profiles and normalizing them to a range between zero to unity. As visually demonstrated, despite that the contrast has been enhanced, the restored image of the conventional SSFS method (mid-column in FIG. 42D) can only distinguish the three bars up to G7E3 that corresponds to a spatial frequency of 161 lp/mm. In contrast, the demodulated image of the SIM-SSFS method can still resolve bars up to G7E6 that corresponds to 228 lp/mm, which is close to the camera Nyquist frequency. By analyzing the contrast of the elements on the images shown in FIGS. 42A-C, imaging performance can be quantified in FIG. 42E. FIG. 42E shows the performance of the acquired (lowermost curve) and restored (middle curve) images through conventional SSFS technique has cross point at G7E4 that corresponds to 181 lp/mm. The acquired signal (lowermost curve) of the higher frequency than 181 lp/mm may be filtered by the chosen NSR in the Wiener filter which results in the loss of resolution. The SIM-SSFS (uppermost curve) provides the highest contrast at all sampled high spatial frequencies among the others, and the performance is comparable with that shown in FIG. 39A with the scanning ranges of 200 μm, which demonstrated the consistent contrast performance regardless the largely increase of the EDOF range.

Combinations of Features

Features described above as well as those claimed below may be combined in various ways without departing from the scope hereof. For example, it will be appreciated that aspects of one EDOF microscope, microscopy method, or associated microscope objective described herein may incorporate or swap features of another EDOF microscope, microscopy method, or associated microscope objective described herein. The following examples illustrate possible, non-limiting combinations of embodiments described above. It should be clear that many other changes and modifications may be made to the systems and methods herein without departing from the spirit and scope of this invention:

(A1) An extended depth-of field microscope may include a microdisplay having an array of emitters capable of illuminating a sample with structured illumination, an image sensor for capturing an image of the sample, and a microscope objective configured to direct the structured illumination toward the sample and direct light from the sample toward the image sensor, wherein the microscope objective has tunable focal length and is object-space telecentric such that tuning of the focal length does not substantially affect magnification of (i) the image formed on the image sensor and (ii) the structured illumination projected into object space.

(A2) In the microscope denoted as (A1), the microscope objective may include an electrically tunable lens to provide the microscope objective with the tunable focal length.

(A3) In the microscope objective denoted as (A2), the electrically tunable lens may include a surface having shape sensitive to a voltage applied to the electrically tunable lens.

(A4) In the microscope denoted as (A3), the electrically tunable lens may be a liquid-filled lens with electrically tunable focal length.

(A5) In any of the microscopes denoted as (A1) through (A4), the numerical aperture of the microscope objective may be at least 0.2.

(A6) Any of the microscopes denoted as (A1) through (A5) may further include a translation stage for translating the microdisplay to shift focal plane of the structured illumination in object space of the microscope objective.

(A7) In any of the microscopes denoted as (A1) through (A6), the microscope objective may be infinity corrected.

(A8) The microscope denoted as (A7) may further include (a) a beamsplitter for directing the structured illumination from the microdisplay toward the microscope objective and directing the light from the microscope objective toward the image sensor, (b) a projection lens assembly for, in cooperation with the microscope objective, projecting an image of a light pattern formed by the array of emitters into object space of the microscope objective, and (c) an imaging lens assembly for, in cooperation with the microscope objective, imaging the sample onto the image sensor, wherein the projection lens assembly is infinity corrected and is positioned between the microdisplay, and wherein the beamsplitter the imaging lens assembly is infinity corrected and is positioned between the beamsplitter and the image sensor.

(A9) The microscope denoted as (A8) may further include a translation stage for adjusting distance between the microdisplay and the beamsplitter to shift focal plane of the structured illumination in object space of the microscope objective.

(A10) In either or both of the microscopes denoted as (A8) and (A9), the projection lens assembly may be identical to the imaging lens assembly to minimize optical aberration.

(A11) In any of the microscopes denoted as (A1) through (A10), the focal length of the microscope objective may be tunable over a range that exceeds the diffraction limited depth of field of the microscope objective by at least a factor of 10, while keeping the magnification constant.

(A12) In any of the microscopes denoted as (A1) through (A10), the focal length of the microscope objective may be tunable over a range that exceeds the diffraction limited depth of field of the microscope objective by at least a factor of 100 while keeping the magnification constant.

(A13) Any of the microscopes denoted as (A1) through (A12) may further include a focal length controller for electrically tuning the focal length, and machine-readable instructions stored in non-transitory memory and configured to, upon execution by a processor, perform steps of (i) commanding generation of the structured illumination via the microdisplay, (ii) in cooperation with the focal length controller, electrically tuning the focal length to scan, across a depth range in object space, a common focal plane of the structured illumination and the image sensor, (iii) while scanning the focal plane across the depth range, commanding the image sensor to acquire the image, and (iv) initiating steps of projecting, electrically tuning, and acquiring for at least three different modulation patterns of the structured illumination, phase shifted from each other, to integrate at least three images, respectively.

(A14) In the microscope denoted as (A13), the machine-readable instructions may further be configured to, upon execution by the processor, combine the at least three images to generate a single extended depth-of-field image of the sample.

(A15) Either or both of the microscopes denoted as (A13) and (A14) may further include a translation stage for translating the microdisplay to align focal plane of the structured illumination in the object space with focal plane of image sensor in the object space, so as to achieve the common focal plane.

(A16) Any of the microscopes denoted as (A1) through (A12) may further include a focal length controller for electrically tuning the focal length, a translation stage for translating the microdisplay to shift focal plane of the structured illumination in object space of the microscope objective, and machine-readable instructions stored in non-transitory memory and configured to, upon execution by a processor, perform steps of (i) positioning the translation stage to bring the structured illumination in focus of the image sensor, and electrically tuning the focal length to generate a first image series indicating height profile of the surface, and (ii) positioning the translation stage to bring the structured illumination out of focus of the image sensor, and electrically tuning the focal length to generate a second image series indicating slope of the sample surface across a depth range.

(A17) In the microscope denoted as (16), the machine-readable instructions may further be configured to, upon execution by the processor, based upon the height profile, extract portions of images of the second image series wherein the surface is in the focus of the image sensor, to produce an extended depth-of-field microdeflectometry image of the sample surface.

(B1) An extended depth-of-field microdeflectometry method may include (a) projecting structured illumination onto a sample surface through a microscope objective, (b) imaging the sample surface through the microscope objective, (c) with the structured illumination in focus of the imaging, scanning focal length of the microscope objective, while maintaining constant magnification, to generate a first image series indicating height profile of the sample surface, (d) with the structured illumination defocused from focus of the imaging, scanning the focal length over one or more depth ranges while maintaining the constant magnification, to generate a second image series indicating slope of the sample surface across the one or more depth ranges, and (d) utilizing that each image of the second image series has same magnification and based upon the height profile, combining the images of the second image series to produce an extended depth-of-field microdeflectometry image of the sample surface.

(B2) In the method denoted as (B1), images of the second image series may be focused at different respective depths within the one or more depth ranges, and the step of combining may include extracting, based upon correlation between the height profile and the depths respectively associated with the images of the second image series, portions of images of the second image series wherein the sample surface is in focus of the imaging, to produce the extended depth-of-field microdeflectometry image.

(B3) In either of both of the methods denoted as (B1) and (B2), images of the first image series may be focused at different respective depths in object space of the imaging, and the method may further include determining the height profile by assigning to different portions of the sample surface respective heights according to the depths at which the different portions are in focus in images of the first image series.

(B4) In the method denoted as (B3), the step of assigning may include evaluating sharpness of the structured illumination as projected onto the sample surface to determine the depths at which the different portions are in focus of the imaging.

(B5) Any of the methods denoted as (B1) through (B4) may include performing the step of scanning the focal length with the structured illumination in focus of the imaging prior to the step of electronically scanning the focal length with the structured illumination defocused from focus of the imaging, and selecting the one or more depth ranges based upon the height profile, to at least reduce number of images in the second image series focused on a depth that does not coincide with the sample surface.

(B6) In any of the methods denoted as (B1) through (B5), the step of scanning the focal length with the structured illumination defocused from focus of the imaging may include simultaneously shifting focal plane of the structured illumination and focus of the imaging to maintain a constant distance between the focal plane of the structured illumination and the focus of the imaging.

(B7) In any of the methods denoted as (B1) through (B6), the step of scanning the focal length with the structured illumination in focus of the imaging may include simultaneously shifting focal plane of the structured illumination and focus of the imaging to keep the structured illumination pattern in focus of the imaging.

(B8) Any of the methods denoted as (B1) through (B7) may further include using height data from the height profile to convert relative slope data of the extended depth-of-field microdeflectometry image to absolute slope data.

(B9) In any of the methods denoted as (B1) through (B8), the microscope objective may be an object-space telecentric varifocal microscope objective.

(B10) In the method denoted as (B9), each of the steps of scanning may include electrically tuning the focal length of the telecentric varifocal microscope objective.

(B11) In the method denoted as (B10), each step of electrically tuning may include changing focal length of a lens within the object-space telecentric varifocal microscope objective.

(B12) In the method denoted as (B11), the lens may be a liquid-filled lens, the step of changing may include adjusting shape of a surface of the liquid-filled lens.

(C1) A deconvolution-free extended depth-of-field microscopy method may include (a) projecting structured illumination onto a sample through a microscope objective, (b) tuning focal length of the microscope objective while maintaining constant magnification, to scan, across a depth range in object space, a common focal plane associated with (i) the structured illumination and (ii) an image sensor for capturing an image of the sample through the microscope objective, (c) while scanning the focal plane across the depth range, acquiring the image, performing the steps of projecting, tuning, and acquiring for at least three different modulation patterns of the structured illumination phase shifted from each other to integrate at least three images, respectively, and (d) combining the at least three images to generate a single extended depth-of-field image of the sample.

(C2) In the method denoted as (C1), the step of combining may include cooperatively demodulating the at least three images through square-law demodulation to generate the single extended depth-of-field image.

(C3) In either or both of the methods denoted as (C1) and (C2), the step of acquiring may include exposing the image sensor while scanning the focal plane across the depth range to integrate the image across the depth range.

(C3) Any of the methods denoted as (C1) through (C3) may include, in the step of tuning, repeatedly scanning back and forth across the depth range at constant scanning speed, and, in the step of acquiring, exposing the image sensor for an exposure time that equals an integer number of periods of said repeatedly scanning.

(C4) In the method denoted as (C3), the step of acquiring may include exposing the image sensor for an exposure time that equals a single period of said repeatedly scanning.

(C5) In either of both of the methods denoted as (C3) and (C4), the steps of repeatedly scanning and exposing may be unsynchronized.

(C6) In any of the methods denoted as (C1) through (C5), in the step of performing, the at least three different modulation patterns may be periodic and, apart from relative phase shifts, being identical to each other.

(C7) In the method denoted as (C6), in the step of performing, the at least three different modulation patterns may be N different modulation patterns, the n'th modulation pattern of the N different modulation patterns having relative phase shift of $2\pi \times ((n-1)/N)$, $n=1 \ldots N$, N being an integer.

(C8) In the method denoted as (C7), N may be 3, and the step of combining may include determining the single extended depth-of-field image as $I=[(I_1-I_2)^2+(I_2-I_3)^2+(I_1-I_3)^2]^{1/2}$, wherein $I_1$, $I_2$, and $I_3$ denote the images acquired.

(C9) Any of the methods denoted as (C1) through (C8) may include, in the step of acquiring, exposing the image sensor for an exposure time to integrate the image with sufficient brightness, the exposure time exceeding minimum time required to scan across the depth range, the minimum time being defined by rate of focal length change capability of the microscope objective, and, in the step of tuning, scanning across the depth range over a duration that exceeds the minimum time.

(C10) Any of the methods denoted as (C1) through (C9) may further include generating the structured illumination using a microdisplay.

(C11) Any of the methods denoted as (C1) through (C9) may further include generating light using a light source and imposing structure on the light using a modulator separate from the light source.

(C12) In the method denoted as (C11), in the step of generating, the light source may be a laser.

(C13) In any of the methods denoted as (C1) through (C12), the microscope objective may be an object-space telecentric varifocal microscope objective.

(C14) In the method denoted as (C13), the step of tuning may include electrically tuning the focal length of the telecentric varifocal microscope objective.

(C15) In either or both of the methods denoted as (C13) and (C14), the step of tuning may include changing focal length of a lens within the object-space telecentric varifocal microscope objective.

(C16) In the method denoted as (C15), the lens may be a liquid-filled lens, and the step of changing may include adjusting shape of surface of the liquid-filled lens.

(D1) An extended depth-of-field structured illumination microscopy method may include (a) projecting structured illumination onto a sample through a microscope objective, (b) imaging the sample through the microscope objective, and (c) with the structured illumination in focus of said imaging, electrically tuning focal length of the microscope objective, while maintaining constant magnification, to generate a plurality of images respectively focused at a plurality of depths across a depth range in object space of the microscope objective.

(D2) The method denoted as (D1) may further include determining a height profile of a surface of the sample by assigning to different portions of the sample surface respective heights according to the respective depths associated with the respective images at which the structured illumination for the different portions is in focus.

(D3) In the method denoted as (D2), the step of determining may include evaluating sharpness of the structured illumination as projected onto the sample surface to determine the depths at which the different portions are in focus of said imaging.

(E1) An object-space telecentric varifocal microscope objective may include a lens assembly having fixed focus properties, and a lens positioned on an image side of the lens assembly and serving as exit pupil of the object-space telecentric varifocal microscope objective, wherein focal length of the lens is electrically tunable, and wherein the lens assembly and the electrically tunable lens are cooperatively configured such that the microscope objective is infinity corrected.

(E2) In the object-space telecentric varifocal microscope objective denoted as (E1), the lens may include a surface having shape sensitive to a voltage applied to the lens.

(E3) In the object-space telecentric varifocal microscope objective denoted as (E2), the lens may be a liquid-filled lens.

(E4) In any of the object-space telecentric varifocal microscope objectives denoted as (E1) through (E4), the numerical aperture of the microscope objective may be at least 0.2.

(E5) In any of the object-space telecentric varifocal microscope objectives denoted as (E1) through (E4), the lens may be positioned at back focus of the lens assembly.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. An extended depth-of-field microscope, comprising:
   a microdisplay having an array of emitters capable of illuminating a sample with structured illumination;
   an image sensor for capturing an image of the sample;
   a microscope objective configured to direct the structured illumination toward the sample and direct light from the sample toward the image sensor, the microscope objective having a tunable focal length and being object-space telecentric such that tuning of the tunable focal length does not affect magnification of (i) the image formed on the image sensor and (ii) the structured illumination projected into an object space,
   a focal length controller for electrically tuning the tunable focal length; and
   machine-readable instructions stored in non-transitory memory and configured to, upon execution by a processor, perform operations including:
   (a) commanding generation of the structured illumination via the microdisplay,
   (b) in cooperation with the focal length controller, electrically tuning the tunable focal length to scan, across a depth range in the object space a common focal plane of the structured illumination and the image sensor,
   (c) while scanning the common focal plane across the depth range, commanding the image sensor to acquire the image,
   (d) repeatedly initiating commanding, electrically tuning, and acquiring for at least three different modulation patterns of the structured illumination, phase shifted from each other, to integrate at least three images, respectively, and
   (e) combining the at least three images to generate a single extended depth-of-field image of the sample.

2. The extended depth-of-field microscope of claim 1, the microscope objective comprising an electrically tunable lens to provide the microscope objective with the tunable focal length.

3. The extended depth-of-field microscope of claim 2, the electrically tunable lens including a surface having a shape sensitive to a voltage applied to the electrically tunable lens.

4. The extended depth-of-field microscope of claim 1, a numerical aperture of the microscope objective being at least 0.2.

5. The extended depth-of-field microscope of claim 1, the microscope objective being infinity corrected.

6. The extended depth-of-field microscope of claim 5, further comprising:
   a beamsplitter for directing the structured illumination from the microdisplay toward the microscope objective and directing the light from the microscope objective toward the image sensor;
   a projection lens assembly for, in cooperation with the microscope objective, projecting an image of a light pattern formed by the array of emitters into the object space of the microscope objective, the projection lens assembly being infinity corrected and being positioned between the microdispiay and the beamsplitter; and
   an imaging lens assembly for, in cooperation with the microscope objective, imaging the sample onto the image sensor, the imaging lens assembly being infinity corrected and being positioned between the beamsplitter and the image sensor.

7. The extended depth-of-field microscope of claim 6, the projection lens assembly being identical to the imaging lens assembly to minimize an optical aberration.

8. The extended depth-of-field microscope of claim 1, the tunable focal length of the microscope objective being tunable over a range that exceeds a diffraction limited depth of field of the microscope objective by at least a factor of 10, while keeping the magnification constant.

9. The extended depth-of-field microscope of claim 1, the tunable local length of the microscope objective being tunable over a range that exceeds a diffraction limited depth of field of the microscope objective by at least a factor of 100 while keeping the magnification constant.

10. The extended depth-of-field microscope of claim 1, further comprising a translation stage for translating the microdisplay to align a focal plane of the structured illumination in the object space with a focal plane of an image sensor in the object space, so as to achieve the common focal plane.

11. A deconvolution-free extended depth-of-field microscopy method, comprising:
    generating structured illumination by (a) using a microdisplay or (b) generating light using a light source, and imposing structure on the tight using a modulator separate from the light source;
    projecting the structured illumination onto a sample through a microscope objective;
    tuning a focal length of the microscope objective while maintaining a constant magnification, to scan across a depth range in an object space, to obtain a common focal plane associated with (a) the structured illumination and (b) an image sensor for capturing an input image of the sample through the microscope objective;
    while scanning the common focal plane across the depth range, acquiring the input image:

repeatedly performing operations of projecting, tuning, and acquiring for at least three different modulation patterns of the structured illumination phase, shifted from each other, to integrate at least three input images, respectively;

combining the at least three input images to generate a single extended depth-of-field image of the sample;

wherein said tuning includes repeatedly scanning back and forth across the depth range at a constant scanning speed, and said acquiring includes exposing the image sensor for an exposure time that equals a single period of said repeatedly scanning.

12. The deconvolution-free extended depth-of-field microscopy method of claim 11, wherein combining comprises cooperatively demodulating the at least three input images through a square-law demodulation to generate the single extended depth-of-field image of the sample.

13. The deconvolution-free extended depth-of-field microscopy method of claim 11, wherein acquiring comprises exposing the image sensor while scanning the common focal plane across the depth range to integrate the input image across the depth range.

14. The deconvolution-free extended depth-of-field microscopy method of claim 11, wherein repeatedly scanning and exposing are unsynchronized.

15. The deconvolution-free extended depth-of-field microscopy method of claim 11, in the performing, the at least three different modulation patterns being periodic and, apart from relative phase shifts, being identical to each other.

16. The deconvolution-free extended depth-of-field microscopy method of claim 11, compriSing:

in the acquiring, exposing the image sensor for an exposure time to integrate the input image with sufficient brightness, the exposure time exceeding a minimum time required to scan across the depth range, the minimum time being defined by a rate of a focal length change capability of the microscope objective; and in the tuning, scanning across the depth range over a duration that exceeds the minimum time.

17. The deconvolution-free extended depth-of-field microscopy method of claim 11, in the generating light, the light source being a laser.

18. The deconvolution-free extended depth-of-field microscopy method of claim 11, the microscope objective being an object-space telecentric varifocal microscope objective.

19. The deconvolution-free extended depth-of-field microscopy method of claim 18, the tuning comprising electrically tuning a focal length of the object-space telecentric varifocal microscope objective.

20. The deconvolution-free extended depth-of-field microscopy method of claim 18, the tuning comprising changing focal length of a lens within the object-space telecentric varifocal microscope objective.

21. The deconvolution-free extended depth-of-field microscopy method of claim 20, the lens being a liquid-filled lens, the changing comprising adjusting a shape of a surface of the liquid-filled lens.

* * * * *